United States Patent [19]
Houlberg

[11] Patent Number: 5,349,685
[45] Date of Patent: Sep. 20, 1994

[54] MULTIPURPOSE BUS INTERFACE UTILIZING A DIGITAL SIGNAL PROCESSOR

[75] Inventor: Christian L. Houlberg, Ventura, Calif.

[73] Assignee: The United States of America as represented by the Secretary of the Navy, Washington, D.C.

[21] Appl. No.: 878,713

[22] Filed: May 5, 1992

[51] Int. Cl.$^5$ ............................................. G06F 3/00
[52] U.S. Cl. ............................... 395/800; 364/240.8; 364/240.7; 364/240.5; 364/259.9; 364/DIG. 1; 395/500
[58] Field of Search .................... 395/325, 800, 500; 370/85.13

[56] References Cited
U.S. PATENT DOCUMENTS
| | | | |
|---|---|---|---|
| 4,979,095 | 12/1990 | Ghaffari | 395/325 |
| 5,001,704 | 3/1991 | Narup | 370/85.13 |
| 5,023,891 | 6/1991 | Johnson | 375/87 |

*Primary Examiner*—Eric Coleman
*Attorney, Agent, or Firm*—David S. Kalmbaugh; Melvin J. Sliwka; John L. Forrest, Jr.

[57] ABSTRACT

A multipurpose bus interface comprising a digital signal processor which receives a clock signal and control signals from a Manchester type encoder/decoder and then processes the clock and control signals allowing for the serial transfer of data to and from the 1553 multiplex data bus, the encoder/decoder and the digital signal processor into an IC memory card for storage in or retrieval from the IC memory card. Software stored in an electrically erasable programmable read only memory controls how the data is transferred and interpreted making it easier to modify the digital signal processor's operation to accommodate its use with different bus standards and data protocols/formats. The encoder/decoder of the present invention formats and protocols data transferred from the electrically erasable programmable read only memory to the 1553 multiplex data bus as well data transferred from the 1553 multiplex data bus to the memory, as appropriate. The multipurpose bus interface of the present invention also includes an RS-232 interface and an RS-422 interface controlled by the digital signal processor which provides for data transfer to and from a host computer or the like into the IC memory card.

5 Claims, 37 Drawing Sheets

| BIT TIMES | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| BIT VALUES | | | | 15 | 14 | 13 | 12 | 11 | 10 | 9 | 8 | 7 | 6 | 5 | 4 | 3 | 2 | 1 | 0 | |

COMMAND WORD:

| SYNC | TERMINAL ADDRESS (5) | TR (1) | SUBADDRESS FIELD (5) | DATA WORD COUNT (5) | P (1) |
|---|---|---|---|---|---|

STATUS WORD:

| SYNC | TERMINAL ADDRESS (5) | ME (1) | PROTOB.C OR PROTOC.C (9) | TF (1) | P (1) |
|---|---|---|---|---|---|

DATA WORD:

| SYNC | MESSAGE DATA (16) | P (1) |
|---|---|---|

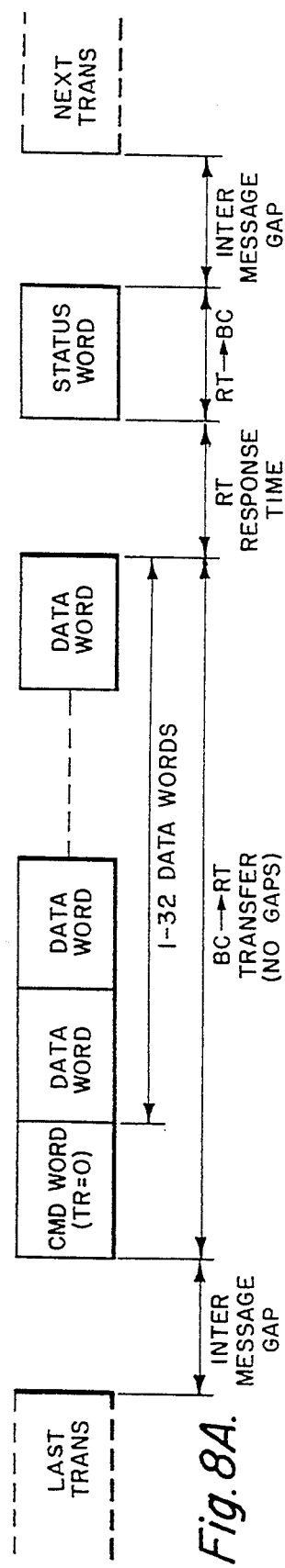
Fig. 8A.
Fig. 8B.
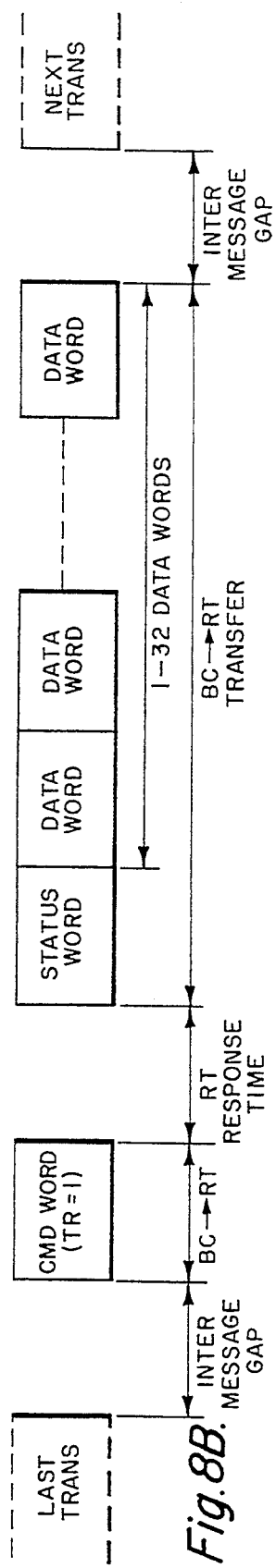
Fig. 9A.
Fig. 9B.

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | ACTIVITY MESSAGE | | | | | | | | | | | | | | | |
| C | Y | Y | Y | Y | Y | 1 | 0 | 0 | 1 | 1 | 1 | 0 | 0 | 0 | 0 | 1 |
| S | Y | Y | Y | Y | Y | X | X | X | X | X | X | X | 0 | X | X | X |
| D | 0 | X | X | X | X | X | X | X | X | X | X | X | X | X | X | X |
| | MEMORY CONFIGURATION MESSAGE | | | | | | | | | | | | | | | |
| C | Y | Y | Y | Y | Y | 1 | 1 | 0 | 0 | 1 | 1 | 0 | 0 | 0 | 1 | 0 |
| S | Y | Y | Y | Y | Y | ME | X | X | X | X | X | X | BSY | X | X | X |
| D1 | MEMORY AREA 1 CONFIGURATION | | | | | | | | | | | | | | | |
| D2 | MEMORY AREA 2 CONFIGURATION | | | | | | | | | | | | | | | |

*Fig. 9C.*

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | ACTIVITY MESSAGE | | | | | | | | | | | | | | | |
| C | Y | Y | Y | Y | Y | 1 | 0 | 0 | 1 | 1 | 1 | 0 | 0 | 0 | 0 | 1 |
| S | Y | Y | Y | Y | Y | X | X | X | X | X | X | X | 0 | X | X | X |
| D | 0 | 0 | 0 | 0 | 0 | 0 | 0 | 0 | 0 | 0 | 0 | 0 | 0 | 0 | 0 | 0 |
| | REPROGRAM CONTROL MESSAGE | | | | | | | | | | | | | | | |
| C | Y | Y | Y | Y | Y | 0 | 1 | 1 | 1 | 0 | 1 | 0 | 0 | 1 | 0 | 0 |
| D1 | TYPE | | | | | | | | TYPE | | | | | | | |
| D2 | NUMBER | | | | | | | | NUMBER | | | | | | | |
| D3 | NUMBER | | | | | | | | NUMBER | | | | | | | |
| D4 | FILL | | | | | L/V | | | CONTROL CODE | | | | | | | |
| S | Y | Y | Y | Y | Y | ME | X | X | X | X | X | X | BSY | X | X | X |

*Fig. 9D.*

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|

ACTIVITY MESSAGE

| C | Y | Y | Y | Y | Y | 1 | 0 | 0 | 1 | 1 | 1 | 0 | 0 | 0 | 0 | 1 |
|---|---|---|---|---|---|---|---|---|---|---|---|---|---|---|---|---|

| S | Y | Y | Y | Y | Y | X | X | X | X | X | X | X | 0 | X | X | X |
|---|---|---|---|---|---|---|---|---|---|---|---|---|---|---|---|---|

| D | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|

HEADER MESSAGE

| C | Y | Y | Y | Y | Y | 0 | 1 | 0 | 1 | 0 | 0 | 0 | 0 | 1 | 0 | 0 |
|---|---|---|---|---|---|---|---|---|---|---|---|---|---|---|---|---|

| D1 | TM | | HT | | BUFFER TRANSFER COUNT | | | | | | | | | | | |
|----|----|--|----|--|------------------------|--|--|--|--|--|--|--|--|--|--|--|

| D2 | INITIAL LOAD ADDRESS |
|----|----------------------|

| D3 | PROGRAM ENTRY ADDRESS |
|----|-----------------------|

| D4 | PAGE NUMBER |
|----|-------------|

| S | Y | Y | Y | Y | Y | ME | X | X | X | X | X | X | BSY | X | X | X |
|---|---|---|---|---|---|----|---|---|---|---|---|---|-----|---|---|---|

*Fig. 9E.*

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|

ACTIVITY MESSAGE

| C | Y | Y | Y | Y | Y | 1 | 0 | 0 | 1 | 1 | 1 | 0 | 0 | 0 | 0 | 1 |
|---|---|---|---|---|---|---|---|---|---|---|---|---|---|---|---|---|

| S | Y | Y | Y | Y | Y | X | X | X | X | X | X | X | 0 | X | X | X |
|---|---|---|---|---|---|---|---|---|---|---|---|---|---|---|---|---|

| D | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|

MEMORY DATA LOAD MESSAGE

| C | Y | Y | Y | Y | Y | 0 | 1 | 0 | 1 | 0 | 1 | WORD COUNT 1-32 | | | |
|---|---|---|---|---|---|---|---|---|---|---|---|-----------------|--|--|--|

| D1 | DATA |
|----|------|

| D2 | DATA |
|----|------|

| DN | DATA |
|----|------|

| S | Y | Y | Y | Y | Y | ME | X | X | X | X | X | X | BSY | X | X | X |
|---|---|---|---|---|---|----|---|---|---|---|---|---|-----|---|---|---|

*Fig. 9F.*

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| ACTIVITY MESSAGE | | | | | | | | | | | | | | | | |
| C | Y | Y | Y | Y | Y | 1 | 0 | 0 | 1 | 1 | 1 | 0 | 0 | 0 | 0 | 1 |
| S | Y | Y | Y | Y | Y | X | X | X | X | X | X | X | 0 | X | X | X |
| D | 0 | 0 | 0 | 0 | 0 | 0 | 0 | 0 | 0 | 0 | 0 | 0 | 0 | 0 | 0 | 0 |

MEMORY DATA VERIFY MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Y | Y | Y | Y | Y | 1 | 1 | 0 | 1 | 0 | 1 | 1 | WORD COUNT 1-32 | | | |
| S | Y | Y | Y | Y | Y | ME | X | X | X | X | X | X | BSY | X | X | X |
| D1 | DATA | | | | | | | | | | | | | | | |
| D2 | DATA | | | | | | | | | | | | | | | |
| { | | | | | | | | | | | | | | | | |
| DN | DATA | | | | | | | | | | | | | | | |

Fig. 9G.

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| ACTIVITY MESSAGE | | | | | | | | | | | | | | | | |
| C | Y | Y | Y | Y | Y | 1 | 0 | 0 | 1 | 1 | 1 | 0 | 0 | 0 | 0 | 1 |
| S | Y | Y | Y | Y | Y | X | X | X | X | X | X | X | 0 | X | X | X |
| D | 0 | 0 | 0 | 0 | 0 | 0 | 0 | 0 | 0 | 0 | 0 | 0 | 0 | 0 | 0 | 0 |

TRAILER MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Y | Y | Y | Y | Y | 0 | 1 | 0 | 1 | 1 | 0 | 0 | 0 | 0 | 1 | 0 |
| D1 | SUB-PAGE/REGISTER COUNT | | | | | | | | FIRST SUB-PAGE/REGISTER | | | | | | | |
| D2 | CHECKSUM | | | | | | | | | | | | | | | |
| S | Y | Y | Y | Y | Y | ME | X | X | X | X | X | X | BSY | X | X | X |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|

ACTIVITY MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Y | Y | Y | Y | Y | 1 | 0 | 0 | 1 | 1 | 1 | 0 | 0 | 0 | 0 | 1 |
| S | Y | Y | Y | Y | Y | X | X | X | X | X | X | X | 0 | X | X | X |
| D | 0 | 0 | 0 | 0 | 0 | 0 | 1 | 1 | 0 | 1 | 1 | 1 | 0 | 0 | 0 | 1 |

REPROGRAM STATUS MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Y | Y | Y | Y | Y | 1 | 1 | 0 | 1 | 1 | 1 | 0 | 0 | 0 | 0 | 1 |
| S | Y | Y | Y | Y | Y | ME | X | X | X | X | X | X | BSY | X | X | X |
| D | SF | SI | | | | | SC (STATUS CODE) | | | | | | | | | |

Fig. 9J.

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|

ACTIVITY MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Y | Y | Y | Y | Y | 1 | 0 | 0 | 1 | 1 | 1 | 0 | 0 | 0 | 0 | 1 |
| S | Y | Y | Y | Y | Y | X | X | X | X | X | X | X | 0 | X | X | X |
| D | 0 | 0 | 0 | 0 | 0 | 0 | 0 | 0 | 0 | 0 | 0 | 0 | 0 | 0 | 0 | 0 |

MLV ERROR MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Y | Y | Y | Y | Y | 0 | 1 | 0 | 1 | 1 | 1 | 0 | 0 | 0 | 0 | 1 |
| D | 0 | 0 | 0 | 0 | 0 | 0 | 0 | 0 | 0 | 0 | 0 | 0 | 0 | A | C | T |
| S | Y | Y | Y | Y | Y | ME | X | X | X | X | X | X | BSY | X | X | X |

Fig. 11A.

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Z | Z | Z | Z | Z | 1 | 0 | 0 | 1 | 1 | 1 | 0 | 0 | 0 | 0 | 1 |
| S | Z | Z | Z | Z | Z | ME | 0 | SR | 0 | 0 | 0 | 0 | 0 | 0 | 0 | TF |
| D | BSY | 0 | 0 | 0 | 0 | TR | SUBADDRESS | | | | WORD COUNT | | | | | |

Fig. 11B.

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| S | TERMINAL ADDRESS | | | | | ME | | SR | | | | BSY | | | | TF |
|   | Z | Z | Z | Z | Z | 0 |   | 0 | 0 | 0 | 0 | 0 |   | 0 | 0 |   |

Fig. 11C.

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|

ACTIVITY MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Z | Z | Z | Z | Z | 1 | 0 | 0 | 1 | 1 | 1 | 0 | 0 | 0 | 0 | 1 |
| S | Z | Z | Z | Z | Z | ME | 0 | 1 | 0 | 0 | 0 | 0 | 0 | 0 | 0 | TF |
| D | 0 | 0 | 0 | 0 | 0 | 0 | 1 | 0 | 0 | 1 | 1 | 0 | 0 | 0 | 1 | 0 |

MEMORY CONFIGURATION MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Z | Z | Z | Z | Z | 0 | 1 | 0 | 0 | 1 | 1 | 0 | 0 | 0 | 1 | 0 |
| D1 | MEMORY AREA 1 CONFIGURATION | | | | | | | | | | | | | | | |
| D2 | MEMORY AREA 2 CONFIGURATION | | | | | | | | | | | | | | | |
| S | Z | Z | Z | Z | Z | ME | 0 | 0 | 0 | 0 | 0 | 0 | BSY | 0 | 0 | TF |

|   | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| ACTIVITY MESSAGE | | | | | | | | | | | | | | | | |
| C | Z | Z | Z | Z | Z | 1 | 0 | 0 | 1 | 1 | 1 | 0 | 0 | 0 | 0 | 1 |
| S | Z | Z | Z | Z | Z | ME | 0 | 1 | 0 | 0 | 0 | 0 | 0 | 0 | 0 | TF |
| D | 0 | 0 | 0 | 0 | 0 | 1 | 1 | 1 | 1 | 0 | 1 | 0 | 0 | 1 | 0 | 0 |
| REPROGRAM CONTROL MESSAGE | | | | | | | | | | | | | | | | |
| C | Z | Z | Z | Z | Z | 1 | 1 | 1 | 1 | 0 | 1 | \multicolumn{5}{l|}{WORD COUNT} |
| C | Z | Z | Z | Z | Z | 1 | 1 | 1 | 1 | 0 | 1 | 0 | 0 | 1 | 0 | 0 |
| S | Z | Z | Z | Z | Z | ME | 0 | 0 | 0 | 0 | 0 | 0 | 0 | 0 | 0 | TF |
| D1 | \multicolumn{8}{l|}{TYPE} | \multicolumn{8}{l|}{TYPE} |
| D2 | \multicolumn{8}{l|}{NUMBER} | \multicolumn{8}{l|}{NUMBER} |
| D3 | \multicolumn{8}{l|}{NUMBER} | \multicolumn{8}{l|}{NUMBER} |
| D4 | \multicolumn{5}{l|}{FILL} | \multicolumn{3}{l|}{L/V} | \multicolumn{8}{l|}{CONTROL CODE} |

*Fig.11D.*

|   | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| ACTIVITY MESSAGE | | | | | | | | | | | | | | | | |
| C | Z | Z | Z | Z | Z | 1 | 0 | 0 | 1 | 1 | 1 | 0 | 0 | 0 | 0 | 1 |
| S | Z | Z | Z | Z | Z | ME | 0 | 1 | 0 | 0 | 0 | 0 | 0 | 0 | 0 | TF |
| D | 0 | 0 | 0 | 0 | 0 | 1 | 1 | 0 | 1 | 0 | 0 | 0 | 0 | 1 | 0 | 0 |
| HEADER MESSAGE | | | | | | | | | | | | | | | | |
| C | Z | Z | Z | Z | Z | 1 | 1 | 0 | 1 | 0 | 0 | 0 | 0 | 1 | 0 | 0 |
| S | Z | Z | Z | Z | Z | ME | 0 | 0 | 0 | 0 | 0 | 0 | 0 | 0 | 0 | TF |
| D1 | \multicolumn{2}{l|}{TM} | \multicolumn{3}{l|}{HT} | \multicolumn{11}{l|}{BUFFER TRANSFER COUNT} |
| D2 | \multicolumn{16}{l|}{INITIAL LOAD ADDRESS} |
| D3 | \multicolumn{16}{l|}{PROGRAM ENTRY ADDRESS} |
| D4 | \multicolumn{13}{l|}{PAGE NUMBER} | 0 | \multicolumn{2}{l|}{TC} |

*Fig.11E.*

ACTIVITY MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Z | Z | Z | Z | Z | 1 | 0 | 0 | 1 | 1 | 1 | 0 | 0 | 0 | 0 | 1 |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| S | Z | Z | Z | Z | Z | ME | 0 | 1 | 0 | 0 | 0 | 0 | 0 | 0 | 0 | TF |
| D | 0 | 0 | 0 | 0 | 0 | 1 | 1 | 0 | 1 | 0 | 1 | \multicolumn{5}{c}{WORD COUNT 1-32} |

MEMORY DATA LOAD MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Z | Z | Z | Z | Z | 1 | 1 | 0 | 1 | 0 | 1 | | | WORD COUNT 1-32 | | |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| S | Z | Z | Z | Z | Z | ME | 0 | 0 | 0 | 0 | 0 | 0 | 0 | 0 | 0 | TF |
| D1 | | | | | | | | | DATA | | | | | | | |
| D2 | | | | | | | | | DATA | | | | | | | |
| ⋮ | | | | | | | | | | | | | | | | |
| DN | | | | | | | | | DATA | | | | | | | |

Fig. 11F.

ACTIVITY MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Z | Z | Z | Z | Z | 1 | 0 | 0 | 1 | 1 | 1 | 0 | 0 | 0 | 0 | 1 |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| S | Z | Z | Z | Z | Z | ME | 0 | 1 | 0 | 0 | 0 | 0 | 0 | 0 | 0 | TF |
| D | 0 | 0 | 0 | 0 | 0 | 0 | 1 | 1 | 0 | 1 | 1 | | WORD COUNT 1-32 | | | |

MESSAGE DATA VERIFY MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Z | Z | Z | Z | Z | 0 | 1 | 0 | 1 | 0 | 1 | | WORD COUNT 1-32 | | | |
| D1 | | | | | | | | | DATA | | | | | | | |
| D2 | | | | | | | | | DATA | | | | | | | |
| ⋮ | | | | | | | | | | | | | | | | |
| DN | | | | | | | | | DATA | | | | | | | |

Fig. 11G.

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| S | Z | Z | Z | Z | Z | ME | 0 | 0 | 0 | 0 | 0 | 0 | BSY | 0 | 0 | TF |

Fig.11H.

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | ACTIVITY MESSAGE | | | | | | | | | | | | | | | |
| C | Z | Z | Z | Z | Z | 1 | 0 | 0 | 1 | 1 | 1 | 0 | 0 | 0 | 0 | 1 |
| S | Z | Z | Z | Z | Z | ME | 0 | 1 | 0 | 0 | 0 | 0 | 0 | 0 | 0 | TF |
| D | 0 | 0 | 0 | 0 | 0 | 1 | 1 | 0 | 1 | 1 | 0 | 0 | 0 | 0 | 1 | 0 |
| | TRAILER MESSAGE | | | | | | | | | | | | | | | |
| C | Z | Z | Z | Z | Z | 1 | 1 | 0 | 1 | 1 | 0 | 0 | 0 | 0 | 1 | 0 |
| S | Z | Z | Z | Z | Z | ME | 0 | 0 | 0 | 0 | 0 | 0 | 0 | 0 | 0 | TF |
| D1 | SUB-PAGE/REGISTER COUNT | | | | | | | | FIRST SUB-PAGE/REGISTER | | | | | | | |
| D2 | CHECKSUM | | | | | | | | | | | | | | | |

Fig.11I.

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | REPROGRAM STATUS MESSAGE | | | | | | | | | | | | | | | |
| C | Z | Z | Z | Z | Z | 0 | 1 | 0 | 1 | 1 | 1 | 0 | 0 | 0 | 0 | 1 |
| D | SF | SI | SC (STATUS CODE) | | | | | | | | | | | | | |
| S | Z | Z | Z | Z | Z | ME | 0 | 0 | 0 | 0 | 0 | 0 | 0 | 0 | 0 | TE |

Fig.11J.

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | ACTIVITY MESSAGE | | | | | | | | | | | | | | | |
| C | Z | Z | Z | Z | Z | 1 | 0 | 0 | 1 | 1 | 1 | 0 | 0 | 0 | 0 | 1 |
| S | Z | Z | Z | Z | Z | ME | 0 | 1 | 0 | 0 | 0 | 0 | 0 | 0 | 0 | TF |
| D | 0 | 0 | 0 | 0 | 0 | 1 | 1 | 0 | 1 | 1 | 1 | 0 | 0 | 0 | 1 | 1 |
| | MLV ERROR MESSAGE | | | | | | | | | | | | | | | |
| C | Z | Z | Z | Z | Z | 1 | 1 | 0 | 1 | 1 | 1 | 0 | 0 | 0 | 1 | 1 |
| S | Z | Z | Z | Z | Z | ME | 0 | 0 | 0 | 0 | 0 | 0 | 0 | 0 | 0 | TF |
| D | 0 | 0 | 0 | 0 | 0 | 0 | 0 | 0 | 0 | 0 | 0 | 0 | 0 | A | C | T |

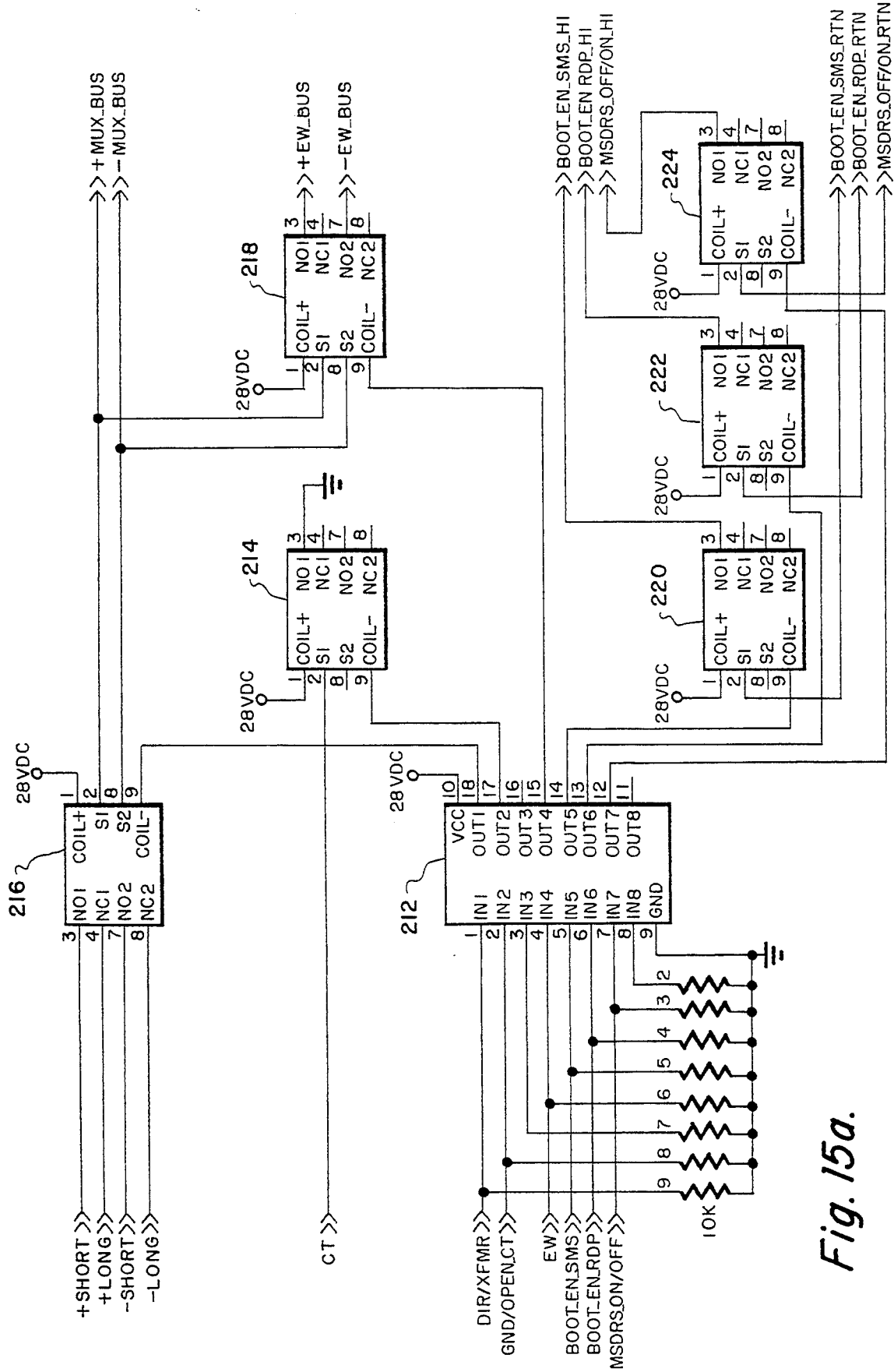

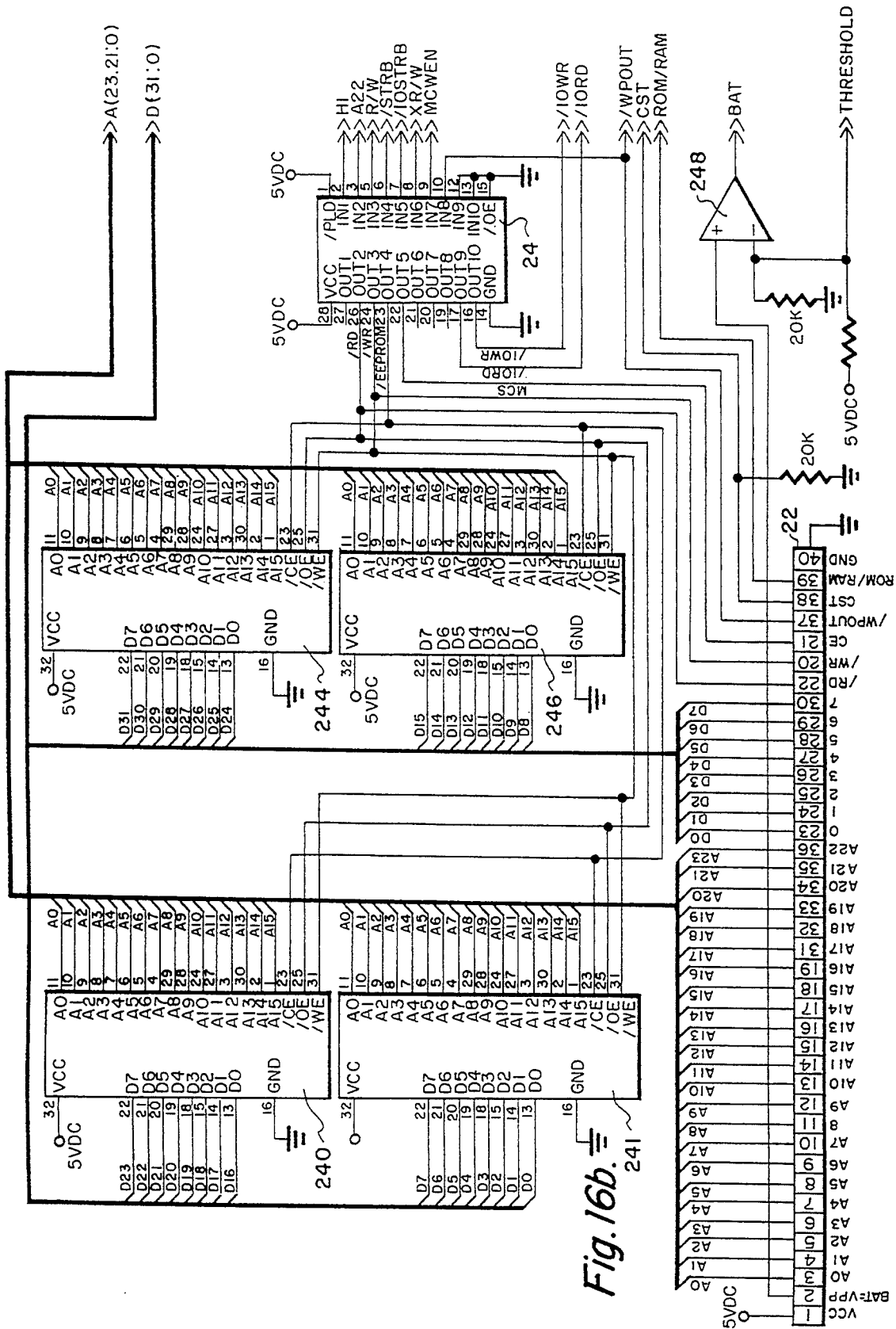

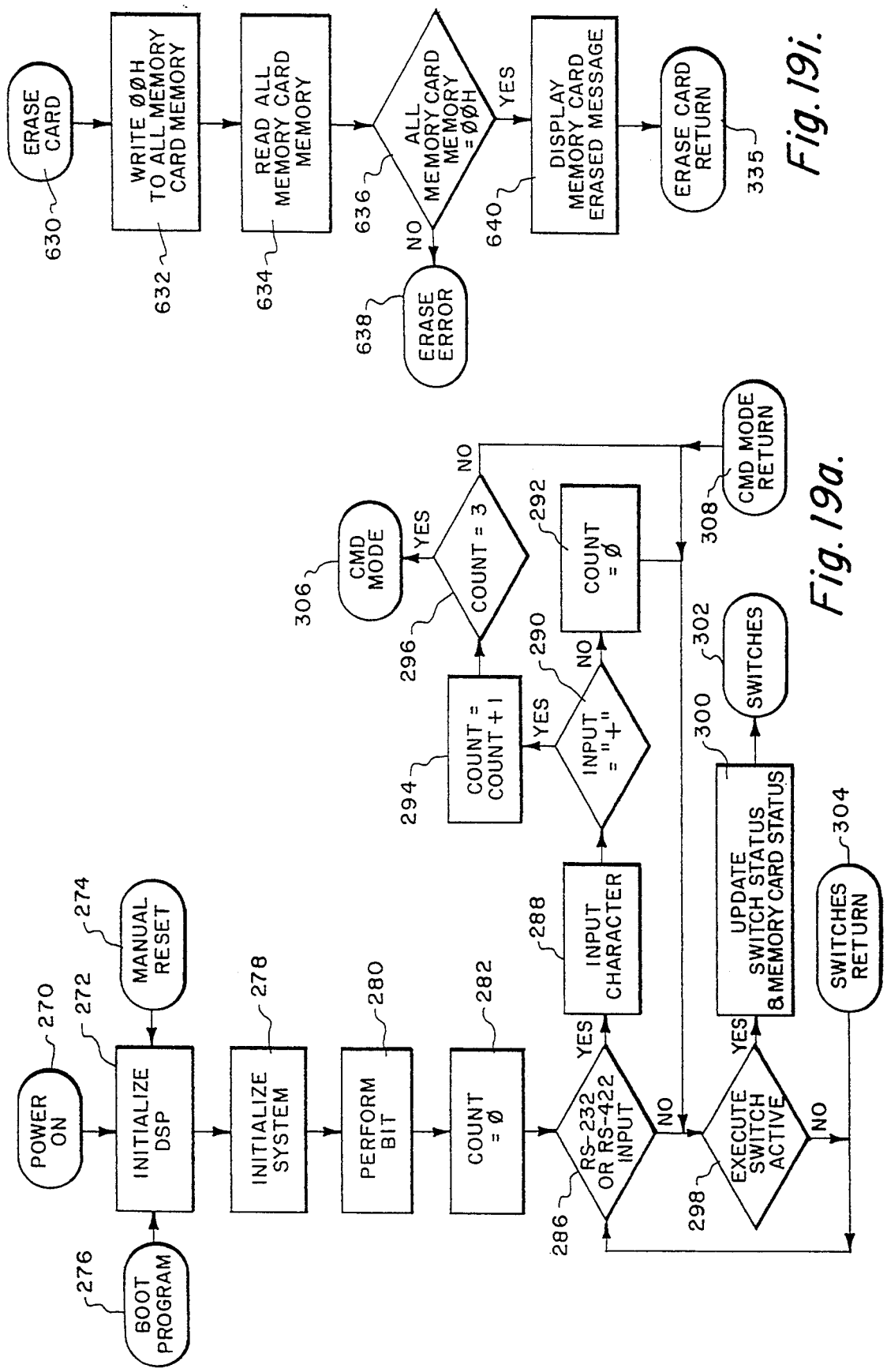

MULTIPURPOSE BUS INTERFACE UTILIZING A DIGITAL SIGNAL PROCESSOR

BACKGROUND OF THE INVENTION

1. Field of the Invention

The present invention relates generally to a communications interface and, in particular, to a multipurpose bus interface circuit which uses as a digital signal processor to provide a communications interface between, for example, a personal computer and a command/response, time division multiplexing data bus such as, for example, a Military Standard 1553 multiplex data bus.

2. Description of the Prior Art

Military Standard 1553 contains requirements for military aircraft command/response, time division multiplexing data bus techniques utilized in systems integration of military aircraft systems such as avionics and electronic warfare systems. This Military Standard applies to a variety of military aircraft such as the F-14 and the F/A-18. The multipurpose communications interface of the present invention is particularly adapted for use with data buses where Military Standard 1553 applies, but may also be adapted for use to interface other data buses such as the RS-232 interface used to communicate with, for example, general purpose computer equipment.

In the prior art there are multipurpose interfaces which provide the means for communicating on a Military Standard 1553 avionics bus or the like. One such device of the prior art is a "Multipurpose Bus Interface" disclosed in U.S. Pat. No. 5,001,704. The multipurpose bus interface of U.S. Pat. No. 5,001,704 includes a main controller for controlling the transfer of data between a first bus and a RAM. A microstore contains the software for the main controller, the software controlling the handling and interpretation of data to and from the first bus. A co-processor has direct access to the RAM and performs the data processing function of the interface circuit. An interface module provides interface between the RAM and a second data bus, the interface module formatting the data transmitted between the RAM and the second data bus.

While satisfactory for its intended purpose that of providing a means for interfacing a first communications bus to a second communications bus where at least one of the buses is a command response multiplexing data bus, this prior art device is complex in design and does not perform all of the functions of the present invention. Further, the present invention makes use of a combination of electrical components controlled by a digital signal processor utilizing a unique computer software program that is somewhat different from that of the prior art U.S. Pat. No. 5,001,704.

SUMMARY OF THE INVENTION

The multipurpose bus interface of the present invention comprises a digital signal processor which receives a clock signal and control signals from a Manchester type encoder/decoder and then processes these clock and control signals allowing for the serial transfer of data to and from the 1553 multiplex data bus, the encoder/decoder and the digital signal processor into an IC memory card for storage in or retrieval from the IC memory card. Software stored in an electrically erasable programmable read only memory (EEPROM) controls how the data is transferred and interpreted making it easier to modify the digital signal processor's operation to accommodate its use with different bus standards and data protocols/formats. The encoder/decoder of the present invention formats and protocols data transferred from the electrically erasable programmable read only memory to the 1553 multiplex data bus as well data transferred from the 1553 multiplex data bus to the memory, as appropriate.

The multipurpose bus interface of the present invention also includes an RS-232 interface and an RS-422 interface controlled by the digital signal processor which provides for data transfer to and from a host computer or the like into the IC memory card. In addition, the multipurpose bus interface of the present invention may be made adaptable for use with variations of the Military Standard 1553 bus as well as the protocols of Military Standard 2217 by modifying the software stored in the electrically erasable programmable read only memory to meet the timing and other requirements of such specifications. Hence the interface of the present invention provides substantial versatility by making software as opposed to hardware changes.

Various other objects and advantages of the present invention will become apparent to those skilled in the art as a more detailed description of the invention is set forth below.

BRIEF DESCRIPTION OF THE DRAWINGS

FIG. 8a illustrates multipurpose bus interface to remote terminal data transfers;

FIG. 8b illustrates remote terminal to multipurpose bus interface data transfers;

FIG. 9A illustrates the format of activity message transfers via the 1553 multiplex data bus to and from a remote terminal being reprogrammed;

FIG. 9B illustrates the status response word format provided by a remote terminal for each message transaction via the 1553 multiplex data bus;

FIG. 9C illustrates the format of memory configuration messages transferred via the 1553 multiplex data bus to a remote terminal being reprogrammed;

FIG. 9D illustrates the format of enter load, exit load, enter verify and exit verify messages transferred via the 1553 multiplex data bus to a remote terminal being reprogrammed;

FIG. 9E illustrates the format of a header message transferred via the 1553 multiplex data bus to a remote terminal being reprogrammed;

FIG. 9F illustrates the format of a memory data load message transferred via the 1553 multiplex data bus to a remote terminal being reprogrammed;

FIG. 9G illustrates the format of a memory data verify message transferred via the 1553 multiplex data bus to a remote terminal being reprogrammed;

FIG. 9H illustrates the format of a trailer message transferred via the 1553 multiplex data bus to a remote terminal being preprogrammed;

FIG. 9I illustrates the format of a reprogram status message transferred via the 1553 multiplex data bus from a remote terminal being reprogrammed;

FIG. 9J illustrates the format of a RRT error message transferred via the 1553 multiplex data bus to a remote terminal being reprogrammed;

FIG. 11a illustrates the format of activity message transfers via the 1553 multiplex data bus to and from a bus controller being reprogrammed;

FIG. 11b illustrates the status response word format provided by a bus controller terminal for each message transaction via the 1553 multiplex data bus;

FIG. 11C illustrates the format of memory configuration messages transferred via the 1553 multiplex data bus to a bus controller being reprogrammed;

FIG. 11D illustrates the format of enter load, exit load, enter verify and exit verify messages transferred via the 1553 multiplex data bus to a bus controller being reprogrammed;

FIG. 11E illustrates the format of a header message transferred via the 1553 multiplex data bus to a bus controller being reprogrammed;

FIG. 11F illustrates the format of a memory data load message transferred via the 1553 multiplex data bus to a bus controller being reprogrammed;

FIG. 11G illustrates the format of a memory data verify message transferred via the 1553 multiplex data bus to a bus controller being reprogrammed;

FIG. 11H illustrates the format of a trailer message transferred via the 1553 multiplex data bus to a bus controller being reprogrammed;

FIG. 11I illustrates the format of a reprogram status message transferred via the 1553 multiplex data bus from a bus controller being reprogrammed;

FIG. 11J illustrates the format of a RRT error message transferred via the 1553 multiplex data bus to a remote terminal being reprogrammed;

FIGS. 15a and 15b is a detailed electrical schematic of the electronic warfare interface of the present invention;

FIGS. 16a, 16b, 16c, 16d are a detailed electrical schematic of the control circuitry of the present invention;

FIGS. 19a, 19b, 19c, 19d, 19e, 19f, 19g, 19h, 19i is a flow chart for the present invention.

DETAILED DESCRIPTION OF THE PREFERRED EMBODIMENT

Figure 1:
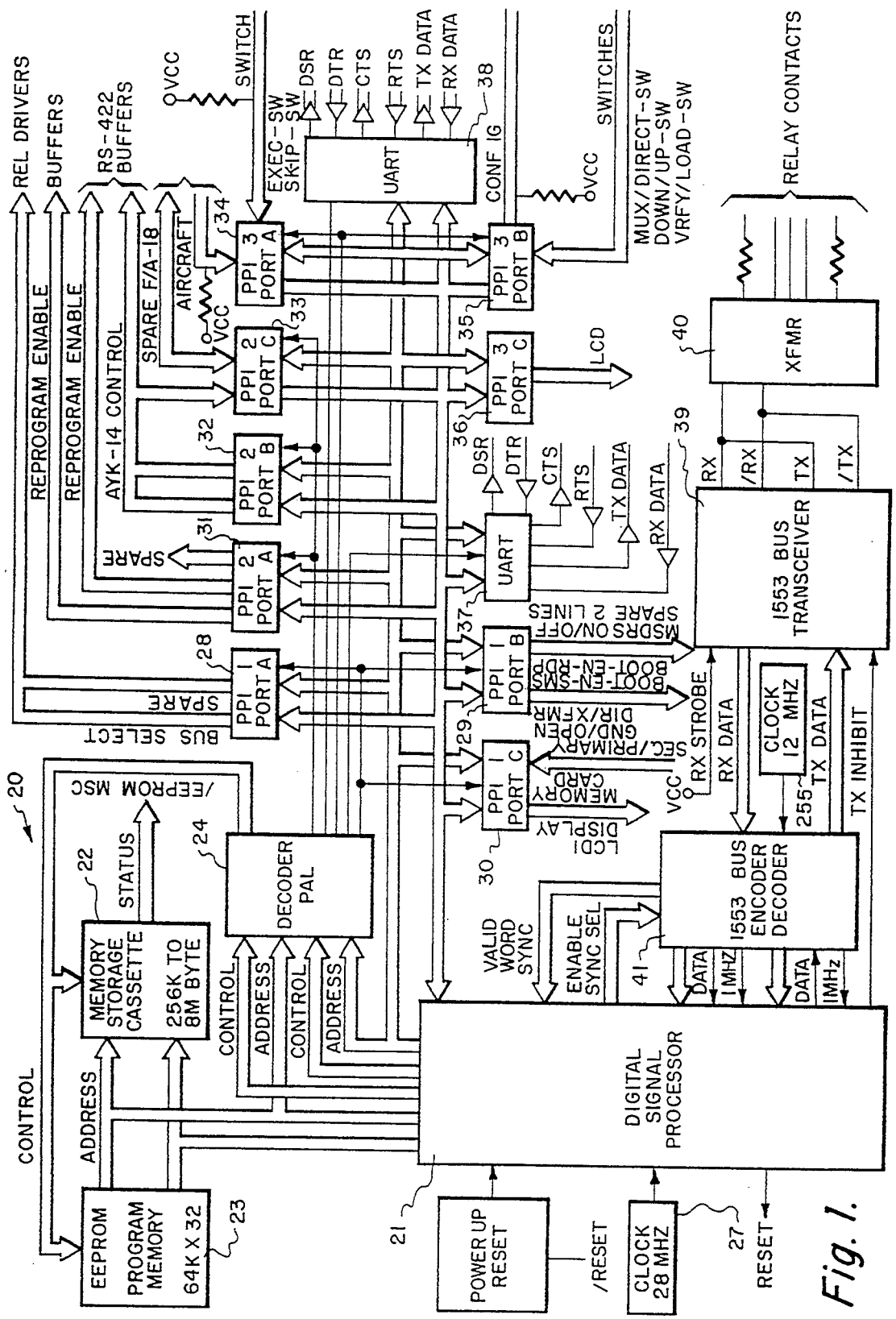
FIG. 1 is a system block diagram of the multipurpose bus interface constituting the present invention.
Figure 3:
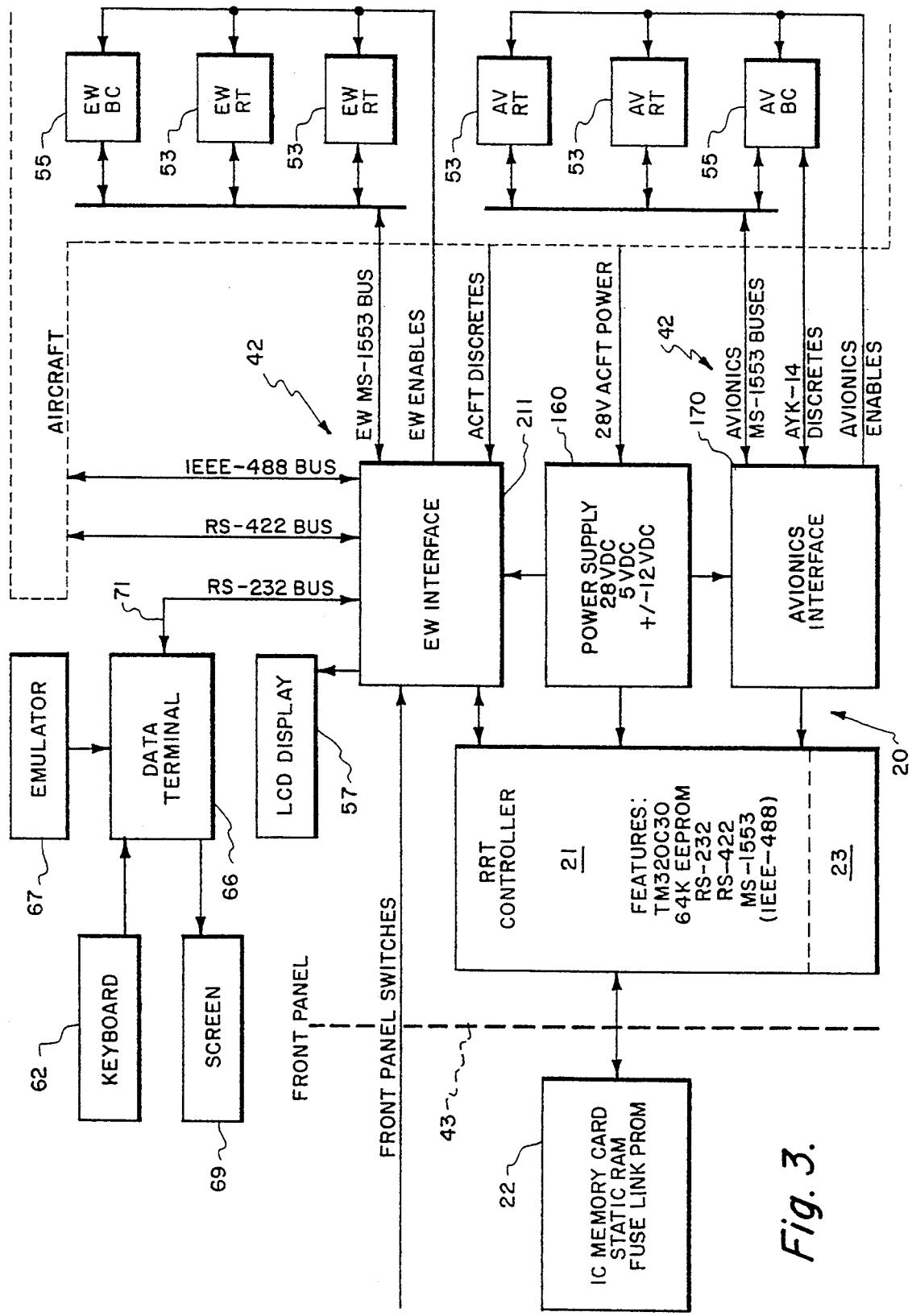
FIG. 3 is a block diagram illustrating the present invention interfacing with the 1553 multiplex data bus on board an aircraft.
Figure 16A:
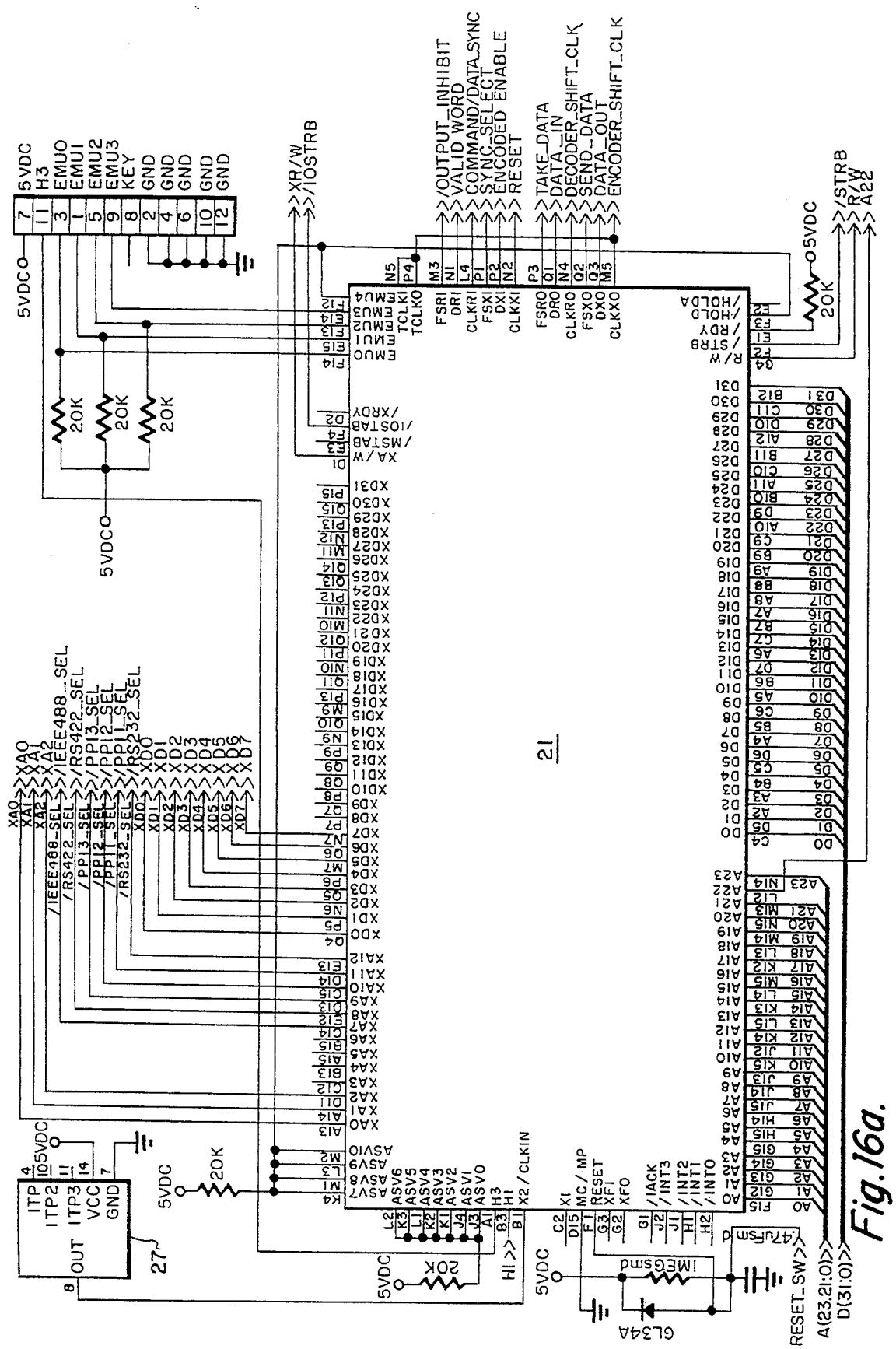

Referring to FIGS. 1 and 3, there is shown a system block diagram of the multipurpose bus interface 20 constituting the present invention. Multipurpose bus interface 20 comprises a digital signal processor 21 which controls the communications interfaces of multipurpose bus interface 20, controls the discrete signals provided by and supplied to multipurpose bus interface 20 and effects the transfer of digital data to and from an IC memory card 22. Digital signal processor 21, in turn, receives it instructions from software in an EEPROM 23, provides addressing to EEPROM 23 and utilizes an internal random access memory (RAM) as storage for certain software and temporary storage of data and status bits. EEPROM 23 consist of four 64K×8 bit EEPROMs 240, 241, 244 and 246, FIG. 16b configured in parallel which function as a single 64K×32 bit EEPROM. Programs which effect the transfer of data to and from the 1553 multiplex data bus are loaded into EEPROM memory under software control of digital signal processor 21, that is digital signal processor 21 provides addressing, data and control signals to EEPROM 23 under the direction of software stored in the internal random access memory of digital signal processor 21. Multipurpose bus interface 20 also includes a memory storage cassette which is IC memory card 22 for storing digital data to be transferred to the 1553 multiplex data bus 42 aboard the aircraft or which is transferred from the 1553 multiplex data bus 42 to IC memory card 22. Data is transferred to and from the 1553 multiplex data bus 42 serially via a Manchester encoder/decoder 41, a 1553 bus transceiver 39 and a 1553 bus transformer 40 with the encoder/decoder 41 servicing the requirements of Military Standard 1553 and similar Manchester II encoded time division multiplex serial data protocols. Digital signal processor 21 receives from encoder/decoder 41 a one megahertz clock signal and certain enable, data transfer and sync signals to effect the transfer of data to and from the 1553 multiplex data 42.

Data read from IC memory card 22 is masked to the least eight significant bits of each word since the remaining bits are floating and would be read as noise.

A programmable array logic device 24 functions as a decoder for address and control signals supplied thereto to direct the operation of all external devices to digital signal processor 21. As shown in FIG. 16b, decoder 24 is programmed to convert a primary address line input (A22 input) of decoder 24 and the control line inputs (/STRB and R/W inputs) into control signals (/EEPROM, MCS, /RD and/WR) that control EEPROM 23 and IC memory card 22. Decoder 24 is programmed to convert alternate control signals /IOSTRB and XR/W provided by processor 21 into control signals that operate the parallel peripheral interface (PPI) ports 28 through 36 and the universal asynchronous receiver transceiver (UART) circuits 37 and 38 of multipurpose bus interface 20. Software within processor 21 extends access time for parallel peripheral interface ports 28 through 36 and universal asynchronous receiver transceiver circuits 37 and 38 since processor 21 operates at a processing speed that is too fast for parallel peripheral interface ports 28 through 36 and universal asynchronous receiver circuits 37 and 38. Universal asynchronous receiver circuits 37 and 38 respectively provide the communications interfaces for peripherals communicating via the RS-232 communications bus 71 and any RS-422 communications bus for the transfer of data to and from the IC memory card 22 via digital signal processor 21.

At this time it should be noted that multipurpose bus interface 20 is also configured to reprogram either a remote terminal 53 or bus controller 55 on the 1553 multiplex data bus 42 and henceforth will be designated as multipurpose bus interface/rapid reprogramming terminal 20 or interface/rapid reprogramming terminal 20.

PPI port 28 is an output port designated to send control signals selecting the 1553 multiplex data bus 42 aboard the aircraft. The logic signals EW, AV1, AV2, AV3 and AV4 select which bus multipurpose bus interface/rapid reprogramming terminal 20 will pass data through. PPI port 29 is an output port which is utilized to configure and turin on the 1553 multiplex data bus avionics and electronic warfare equipment, that is remote terminals 53 and bus controllers 55. PPI port 30 is an input port as well as an output port which provides output signals to control liquid crystal display 57 and accepts input signals from IC memory card 22.

PPI port 31 is an output port which provides control signals to a predetermined device within the aircraft's avionics or electronic warfare systems enabling access to the memory of the device to which data is being transferred.

PPI port 32 is an output port which is designated to send control signals to the avionics bus controller of 1553 multiplex data bus 42 preparing the bus controller for reprogramming by interface/rapid reprogramming terminal 20. PPI port 32 also provides rapid reprogramming terminal generated control signals which power down the avionics bus controller allowing multipurpose bus interface/rapid reprogramming terminal 20 to download data into the aircraft avionics and thereby reprogram the avionics.

PPI port 33 is an input port which monitors fail signals provided by the aircraft avionics bus controller to determine whether the data has been correctly loaded into the avionics bus controller, that is PPI port 33 is used to indicate an error in loading.

PPI port 34 is an input port used to monitor the aircraft type and thereby prevent data which is designated for loading in one type of aircraft from being loaded in a different type of aircraft. PPI port 35 is an input port used to monitor configuration of the aircraft to prevent data which is designated for loading in one configuration of the aircraft from being loaded in a different aircraft configuration. PPI ports 34 and 35 together monitor the state of the switches on front panel 43, FIG. 2A.

Figures 2A, 2B:
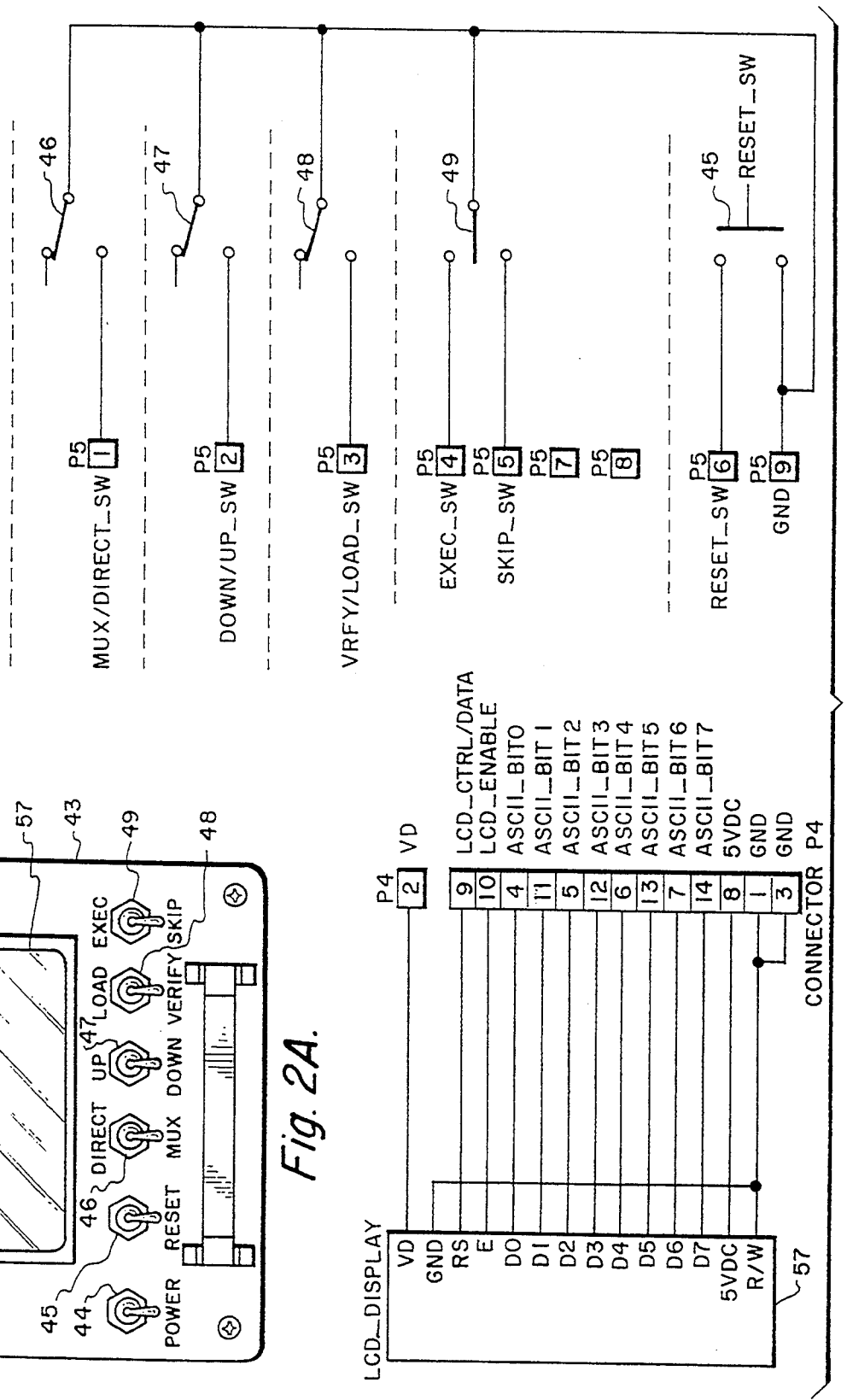
FIGS. 2A and 2B illustration the front panel and front panel electrical wiring diagram for the present invention.

PPI port 36 is an output port for supplying ASCII characters to liquid crystal display 57 on front panel 43, FIG. 2A.

The UART circuits 37 and 38 of multipurpose bus interface/rapid reprogramming terminal 20 respectively communicate with any RS-232 communications bus 71 and any RS-422 communications bus for the transfer of data to and from the IC memory card 22 via the multipurpose bus interface/rapid reprogramming terminal 20. As is best illustrated in FIG. 1, UART circuits 37 and 38 are connected to drivers and receivers which match the interface characteristics of RS-232 and 422 buses.

Rapid reprogramming terminal also includes bus transceiver 39 used to drive a bus transformer 40 which, in turn, is used to isolate the 1553 multiplex data bus 42 aboard the aircraft from multipurpose bus interface/rapid reprogramming terminal 20. There is also electrically coupled between processor 21 and transceiver 39 a bus encoder/decoder 41 which is used to translate the sixteen bit data words provided by processor 21 into Manchester mark encoded Military Standard 1553 signals for use by 1553 multiplex data bus 42 and also to decode Manchester mark signals provided by bus 42 into sixteen bit data words supplied to processor 21.

Referring to FIGS. 2A, 2B and 3, there is shown the front panel 43 which includes a power switch 44, a reset switch 45, a mux/direct switch 46, a down/up switch 47, a verify/load switch 48 and an execute/skip 49. The power switch 44 when in the up position turns power on to multipurpose bus interface/rapid reprogramming terminal 20, reset switch 45 when pressed down resets multipurpose bus interface/rapid reprogramming terminal 20 and mux/direct switch 46 when in the mux position directs the loading of data into the on board aircraft avionics and electronic warfare and countermeasures systems via the 1553 multiplex data bus 42 aboard the aircraft. When in the direct position mux/direct switch 46 allows for loading of data directly into an aircraft electronic system or subsystem. The down/up switch 47 when in the up position allows data to be loaded from multipurpose bus interface/rapid reprogramming terminal 20 to the aircraft avionics or electronic warfare system and when in the down position allows data to be loaded from the avionics or electronic warfare systems to multipurpose bus interface/rapid reprogramming terminal 20. The verify/load switch 48 when in the load position allows data to be either up loaded from multipurpose bus interface/rapid reprogramming terminal 20 or down loaded to multipurpose bus interface/rapid reprogramming terminal 20 depending on the position of switch 47 and when in the down position allows for data already in the aircraft avionics and electronic warfare systems to be verified by multipurpose bus interface/rapid reprogramming terminal 20. When the message "Exec to continue" is displayed by liquid crystal display 57, execute/skip switch 49 is a momentary contact switch which when activated to the Exec position allows multipurpose bus interface/rapid reprogramming terminal 20 to begin operation loading data files. When in the manual mode and it is desired to load or skip a data file, that is load or not load the data file, an operator can press the exec/skip switch to the exec position to load the data file or skip position to not load the data file.

Figure 17:
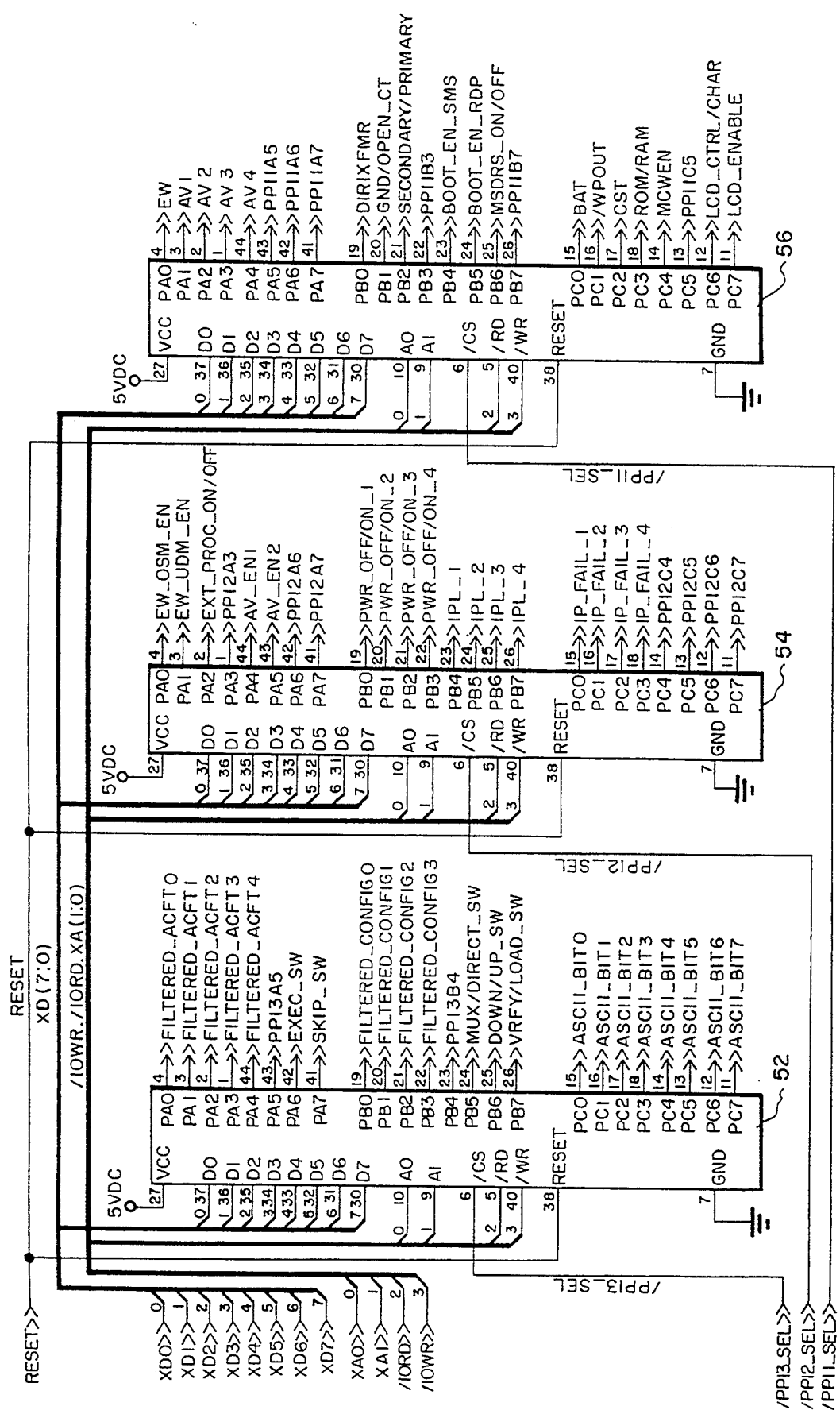
FIG. 17 is an electronics circuit diagram of the discrete interface of the present invention.

Referring now to FIGS. 3 and 17 there is shown the discrete interface circuit which comprises three programmable peripheral interfaces 52, 54 and 56 with interfaces 52, 54 and 56 providing an interface for the discrete logic signals to be provided by interface/rapid reprogramming terminal 20 to the aircraft on board avionics and electronic warfare and countermeasures systems via the 1553 multiplex data bus 42 as well as the discrete logic signals provided from the avionics and electronic warfare and countermeasures systems to interface/rapid reprogramming terminal 20.

The programmable interfaces 52, 54 and 56 may be a performance CMOS version of the industry standard 8255A general purpose programmable input/output device compatible with any general purpose microprocessor. For example a Model 82C55A CMOS Programmable Peripheral Interface manufactured by Harris Corporation may be used as programmable interfaces 52, 54 and 56.

Referring to FIGS. 1, 2A, 2B 3 and 17, the EW output of programmable interface 56 electrically couples the electronic warfare bus of 1553 multiplex data bus 42 to interface/rapid reprogramming terminal 20 when the EW output of programmable interface 56 is at the logic one state. Similarly, the AV1, AV2, AV3 and AV4 outputs of interface 56 electrically couple the four avionics buses bus interface 170 to interface/rapid reprogramming terminal 20. It should be noted that a data transfer from multipurpose bus interface/rapid reprogramming terminal 20 to the EW bus, the AV1 bus, the AV2 bus, the AV3 bus or the AV4 bus of the aircraft can occur only when the EW, AV1, AV2, AV3 or AV4 output from interface 56 is at the logic one state. Outputs PPI1A5, PPI1A6 and PPI1A7 are spares.

Figure 4:
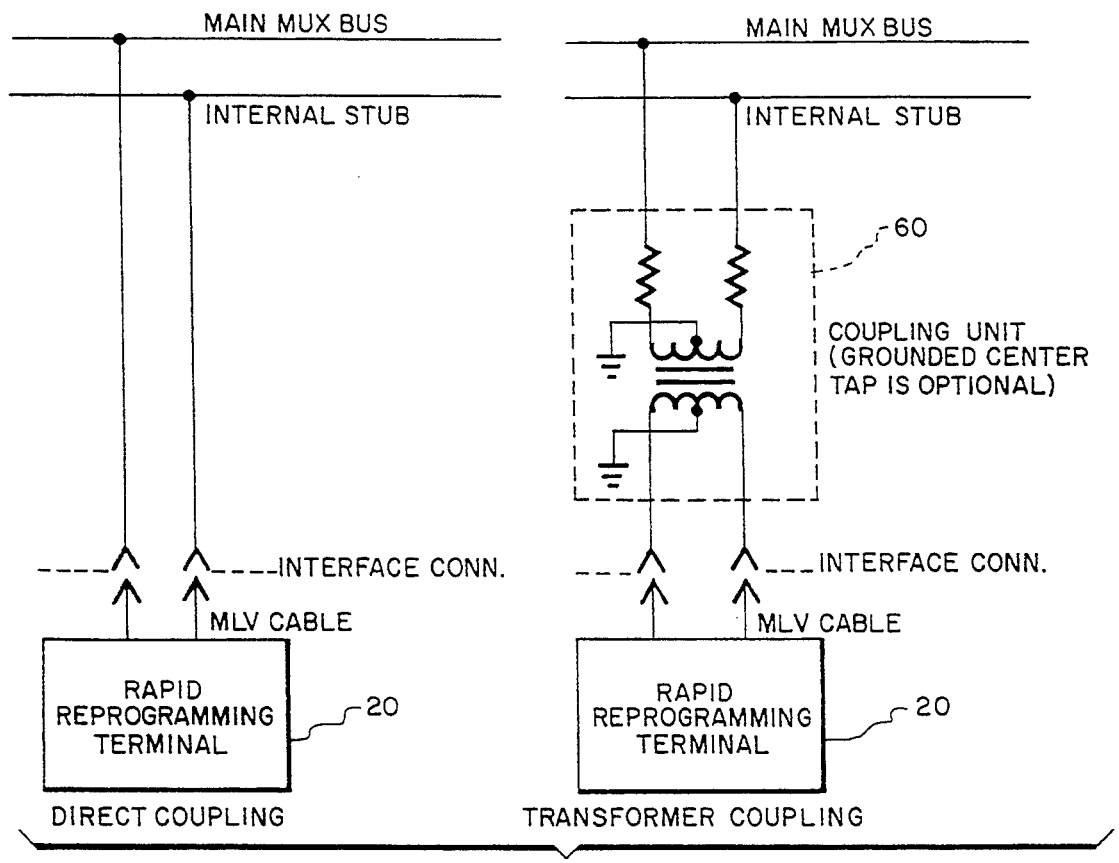
FIG. 4 illustrates the bus coupling methods of the 1553 multiplex data bus to which the present invention is connected.

The DIR/XFMR output configures the 1553 multiplex data bus 42 such that coupling is either provided directly as is best illustrated by FIG. 4 or via a center tap transformer 60 as is best illustrated by FIG. 4. When the DIR/XFMR output is at the logic one state the multipurpose bus interface/rapid reprogramming terminal 20 is coupled directly to the aircraft on board avionics and electronic warfare systems. When the DIR/XFMR output is at the logic zero the coupling is through transformer 60. The GND/OPEN_CT output of interface 56 when at the logic one state grounds the center tap of the transformer 40 while a logic 0 at the GND/OPEN_CT output removes the ground from the center tap of the transformer 40. The SECONDARY/PRIMARY output of interface 56 enables either the primary or secondary avionics bus connections of 1553 multiplex data bus 42. When the SECONDARY/PRIMARY output of interface 56 is at the logic one state the secondary avionics one through four 1553 multiplex data bus connections are utilized, while a logic zero means that the primary one through four bus connections are being utilized. The PPI1B3 output of interface 56 is a spare.

The MSDRS_OFF/ON Output of interface 56 enables the Maintenance Signal Data Recording Set (MSDRS) line aboard an aircraft with a logic zero enabling the MSDRS line and a logic one disabling the MSDRS line. This output is also currently being utilized with only the F/A-18 fighter aircraft. The PPI1B7 line of interface 56 is a spare.

When the BAT input of interface 56 is at the logic one state the battery in IC memory card 22 is sufficiently charged to operate properly while a logic zero indicates that the battery is discharged. The /WPOUT and MCWEN inputs when at the logic one state indicates that write is enable for IC memory card 22 and when either are at the logic zero state the write is disabled for IC memory card 22.

At this time, it should be noted that the memory card used in the preferred embodiment of the present invention may be any forty pin, eight bit wide, Mixed CMOS SRAM Memory Device manufactured by Seiko Epson Corporation which have storage capacities from 32K to 8M. It should further be understood that the memory storage capacity of IC memory card 22 may range from 256K to 8M.

The CST input indicates the presence or absence of the IC memory card 22. When the CST input is low card 22 is absent, when the CST input is high card 22 is present.

The ROM/RAM input indicates whether IC memory card 22 is a ROM or a RAM device. When the ROM/RAM input is at the logic one state a ROM is being utilized with interface/rapid reprogramming terminal 20 while a logic zero indicates that a RAM is being utilized. The PPI1C5 output is a spare.

The LCD_CTRL/CHAR output of interface 56 is the register select for the liquid crystal display 57. When the LCD_CTRL/CHAR output is at a logic one state a control register for liquid crystal display 57 is selected, while a logic zero at the LCD_CTRL/CHAR output selects a character register for liquid crystal display 57.

The BOOT_EN_SMS output is utilized with an aircraft having a stores management system (SMS) requiring an input to enable a boot strap load operation. A logic one at this output enables the SMS line to the electronic warfare system bus allowing data to be transferred from multipurpose bus interface/rapid reprogramming terminal 20 to the stores management system while a logic zero disables the SMS system.

The BOOT_EN_RDP output enables the radar data processor (RDP) aboard an aircraft and is currently being utilized with only the F/A-18 fighter aircraft. When the BOOT_EN_RDP output is at the logic one state the radar data processor is enabled allowing data to be transferred from multipurpose bus interface/rapid reprogramming terminal 20 to the radar data processor, while a logic zero disables the processor.

The electronic warfare user data memory program enable discrete of interface 54 enables the erase and write functions of all user data memories, for examples EEPROMS, of all the electronic warfare equipment on the electronic warfare multiplex bus. In addition, upon initial activation the electronic warfare user data memory program enable discrete, if required, will cause the bus controller for the electronic warfare multiplex bus to start polling multipurpose bus interface/rapid reprogramming terminal 20 and upon deactivation will cause the bus controller to stop polling multipurpose bus interface/rapid reprogramming terminal 20. Further this program enable discrete is used to indicate to the bus controller that it is to resume its bus controller functions when the enable is released, that is driven to the logic zero state. The electronic warfare operating system memory has the same functions with respect to reprogrammable operating system memories in devices connected to the electronic warfare multiplex bus.

A logic one at the EW_OSM_EN output of interface 54 enables the operating system memory of the electronic warfare system on board the aircraft, that is data may be down loaded into the operating system software memory. Similarly, when the EW_UDM_EN output of interface 54 is at the logic one state data is down loaded into the user data memory of the electronic warfare system on board the aircraft.

The AV_EN1 and AV_EN2 outputs (AV Program Enable discretes) of interface 54, which are used for the four avionics buses in the aircraft, may be connected to individual avionics equipment to control two program memory areas or the AV_EN1 and AV_EN2 outputs may be routed separately to avionics equipment on board the aircraft which does not require control of two memory areas. When the AV_EN1 output of interface 54 is at a logic one state the first memory areas of the aircraft avionics system are enabled, while a logic one at the AV_EN2 output of interface 54 enables the second memory areas of the aircraft avionics system. The PPI-2A3, PPI2A6 and PPI2A7 are spares.

The bus controller for the aircraft avionics is an AN-/AYK-14 computer with each aircraft avionics system having up to four AN/AYK-14 computers. The Initiate Program Load (IPL), Initiate Program load Fail (IPL_F) and Power Off/On (PWR OFF/ON) discretes, which are used to control an AN/AYK-14, are implemented between each AN/AYK-14 computer on board the aircraft and multipurpose bus interface/rapid reprogramming terminal 20. It should be noted that the AV reprogram enable discretes are not used with the AN/AYK-14 computers.

A logic one at the IPL_1 output of programmable interface 54 initiates program loading of the AN/AYK-14 avionics computer via avionics bus number one of 1553 multiplex data bus 42. When this output goes to a logic zero state data is loaded into the AN/AYK-14 avionics computer. The IPL_2 through IPL_4 outputs operate in a similar manner with respect to avionics buses two through four bus of the 1553 multiplex data bus 42. A logic one at the IPL_FAIL_1 input of programmable interface 54 indicates that the initiate program load one has failed. Similarly, logic ones at the IPL_FAIL_2 through IPL_FAIL_4 inputs indicate that initiate program loads 2 through 4 have failed. The PPI2C4 through PPI2C7 outputs are spares.

Logic ones at the PWR_OFF/ON 1, PWR_OFF/ON 2, PWR_OFF/ON 3 or PWR_OFF/ON 4 outputs of interface 52 will turn off one or more of the four AN/AYK-14 Avionics computer bus controllers, while a logic zero at one or more of these outputs will turn on one or more of the controllers. To transfer data to one or more remote terminals 53, that is one or more avionics devices on board the aircraft, on any of the four avionics buses aboard the aircraft, power to the AN-/AYK-14 controlling the bus must be turned off.

A logic one at the EXT_PROC_ON/OFF output of interface 54 enables the external processor of an AN-/ALQ-165 radar jammer on board the aircraft. The purpose of the AN/ALQ-165 external processor discrete is to limit power on time to less than one minute for a load/verify of 32K data words of user data memory. It should be noted that the AN/ALQ-165 processor is currently incorporated on only the F/A-18C/D fighter aircraft.

When there is a logic one state at the LCD_EN output of 56 interface, liquid crystal display 57 is enabled. The data bits for liquid crystal display 57 are provided through the ASCII_BIT0 through ASCII_BIT7 outputs of programmable interface 52.

The FILTERED_ACFT0 through FILTERED_ACFT4 inputs of interface 52 provide signals from the aircraft to the multipurpose bus interface/rapid reprogramming terminal 20 which indicate the aircraft type. The FILTERED_ACFT0 input is the least significant bit provided by the aircraft, while the FILTERED_ACFT4 input is the most significant bit provided by the aircraft. For example a 1, 0, 1, 1, 0 respectively at the FILTERED_ACFT0 through FILTERED_ACFT4 inputs indicates that the aircraft is an F/A-18 fighter aircraft.

The FILTERED_CONFIG0 through FILTERED_CONFIG3 inputs of interface 52 provide signals from the aircraft to interface/rapid reprogramming terminal 20 which indicate the aircraft avionics configuration such as whether the aircraft is an F/A-18A/B or F/A-18C/D.

When the MUX/DIRECT_SW input of programmable interface 52 is at the logic zero state switch 46 is at the DIRECT position while a logic one indicates that switch 46 is at the MUX position. Similarly, when the DOWN/UP_SW input of programmable interface 52 is at the logic zero state switch 47 is at the UP position while a logic one indicates that switch 47 is at the DOWN position. Likewise, when the VRFY/LOAD_SW input of programmable interface 52 is at the logic zero state switch 48 is at the LOAD position while a logic one indicates that switch 48 is at the VRFY position.

Switch 49 has a pair of momentary contacts, the first contact of which is connected to EXEC_SW input of interface 52 and the second contact of which is connected to SKIP_SW input of interface 52. When switch 49 is activated to the EXEC position a logic zero pulse is provided to the EXEC_SW input of interface 52, while activation of switch 49 to the SKIP position will result in a logic zero pulse at the SKIP_SW input of interface 52.

Multipurpose bus interface/rapid reprogramming terminal 20 utilizes a software program which comprises the modules illustrated in FIG. 6 and set forth in the table below:

TABLE I

| BOOT.C 113 | PROGRAM.C 111 | CMDMODE.C 117 |
|---|---|---|
| UPLOAD.C 129 | DOWNLOAD.C 131 | ERASE.C 119 |
| MS1553.C 133 | RRT_BIT.C 109 | RRT_MAIN.C 115 |
| PROTOCOL.C 141 | PROTOB.C 137 | PROTOC.C 139 |
| MESSAGES.C 135 | SWITCHES.C 127 | ERROR.C 147 |
| SERIALIO.C 143 | TIMER.C 149 | DSPINIT.ASM 103 |
| SYSINIT.ASM 107 | CONTROL.C 125 | DISPLAY.C 145 |

The BOOT.C module 113 along with the PROGRAM.C module 111 are the update modules for the rapid reprogramming terminal program. The BOOT.C module 113 of the rapid reprogramming terminal software functions to transfer data from a serial port such as the RS-232 port into the EEPROM 23 of interface/rapid reprogramming terminal 20 and also reboots or starts the program. The PROGRAM.C module 111 displays an update prompt on a video screen 69, transfers the BOOT.C code into RAM of processor 21 for execution and then proceeds to upload a new program into program memory (the EEPROM 23) by executing the BOOT.C code using a modified form of the Hex-32 format designed by Intel Corporation. The data contained in the modified Intel Hex-32 format represents 32 bit words with the most significant byte coming first. Once a proper record is received the word oriented data record (type 00) is transferred to program memory.

Figure 5:
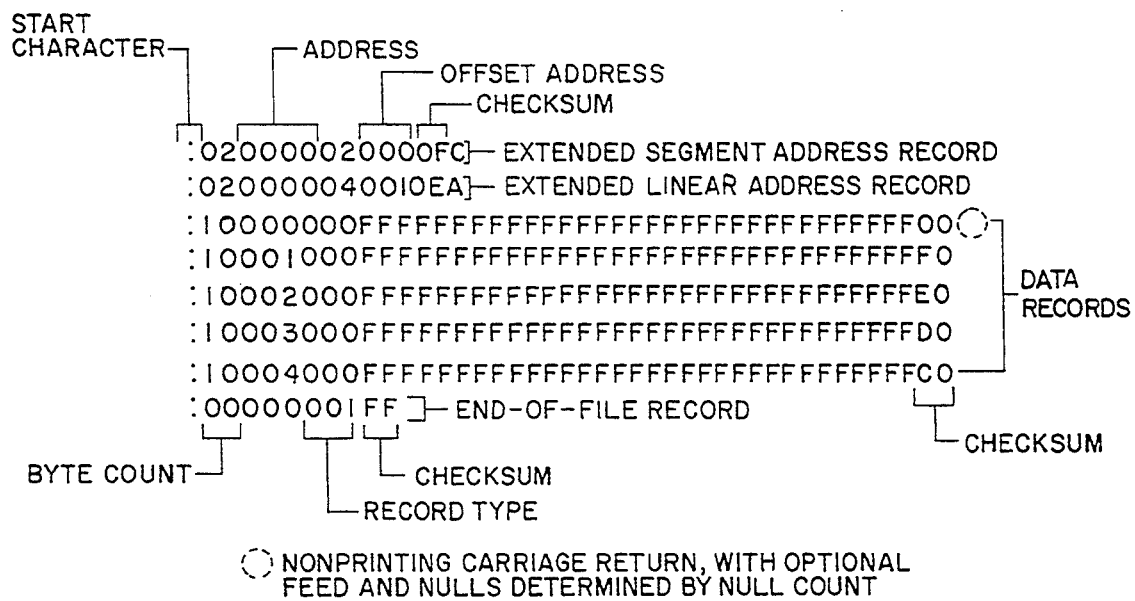
FIG. 5 is an example illustrating the Intel 32 bit Hexadecimal Object File Record Format used with the present invention.

It should be noted that for the purpose of loading the rapid reprogramming terminal software into interface/rapid reprogramming terminal 20, the Intel format illustrated in FIG. 5 is modified by replacing the byte count with a word count. The Intel format of FIG. 5 is used as illustrated for all upload and download functions.

Referring to FIG. 5, the Intel 32-bit Hexadecimal Object file record format or the modified format each have a nine character (four field) prefix that defines the start of record, byte count or word count, load address, and record type and a two character checksum suffix. FIG. 5 illustrates the sample records of the Intel format. The six record types for the Intel HEX-32 format are 00 (data record), 01 (end of file record), 02 (extended segment address record), 03 (start segment address record), 04 (extended linear address record) and 05 (start linear address record).

The data record begins with a colon start character, which is followed by the word or byte count which is in hexadecimal notation, the address of the first data word or byte, and the record type which is "00". The data bytes are next in the data record. The checksum follows the data bytes and is the two's complement in binary of the preceding bytes in the record, including the word or byte count, address, record type and data bytes.

The end-of-file record also begins with the colon start character and is followed by the word or byte count (equal to "00"), the address (equal to "0000"), the record type (equal to "01") and the checksum, "FF".

The extended segment address record is added to the offset address to determine the absolute destination address. The address field for this record must contain ASCII zeros (Hexadecimal 30's). The extended segment address record defines bits 4 to 19 of the segment base address. This record type can appear randomly anywhere within the object file and affects the absolute memory address of subsequent data records in the file.

The start segment address record, which specifies bits 4-19 of the execution start address for the object file, is not used by interface/rapid reprogramming terminal 20.

The extended linear address record specifies bits 16-31 of the destination address for the data records that follow. This record is added to the offset address to determine the absolute destination address, and can appear randomly anywhere within the object file. The address field for this record must contain ASCII zeros (Hexadecimal 30's).

The start linear address record, which specifies bits 16-31 of the execution start address for the object file, is not used by interface/rapid reprogramming terminal 20.

The CMDMODE.C module 117 interfaces a keyboard 62 with multipurpose bus interface/rapid reprogramming terminal 20 to allow a user/operator to enter commands into interface/rapid reprogramming terminal 20. When the user enters "+++" into interface/rapid reprogramming terminal 20 via keyboard 62 a Command Mode menu will appear on video screen 69. The Command Mode menu includes the following UP LOAD (U), DOWNLOAD (D), ERASE (E), PROGRAM (P) and ESCAPE. When the user enters a "U" via the keyboard 62, digital data is transferred from an external computer 66 through either the RS-232 or RS-422 interfaces to IC memory card 22. Similarly, when the user enters a "D" via the keyboard 62, digital data is transferred from IC memory card 22 through either the RS-232 or RS-422 interfaces to external computer 66.

An "E" entered by the user via keyboard 62 erases IC memory card 22. Entering a "P" via keyboard 62 allows the user to enter a new program into EEPROM 23. The PROGRAM command functions in the same manner as the UPLOAD command. The Escape key on keyboard 62 allows the user to escape the Command Mode menu.

The RRT_MAIN.C module 115 is an untimed background executor module looking for inputs such as the "+++" command entered via keyboard 62.

The RRT_BIT.C module 109 is a software built in test routine which when power is turned on for interface/rapid reprogramming terminal 20 test the communications interfaces of interface/rapid reprogramming terminal 20. The RRT_BIT.C module first tests the liquid crystal display 57 by activating the display elements to ensure they are functioning with the elements of display 57 remaining active until the module completes its function. The duration of the test provides an indication of the operation of the MS-1553 encoder shift clock within bus encoder/decoder 41, FIG. 1. Next UART circuits 37 and 38 are tested using an internal loop test subroutine. Then the MS-1553 encoder/decoder 41 and transceiver 39 are tested using a hardwired "echo" characteristic of transformer 40, that is a signal is provided to transformer 40 and the echo return of the signal provided from transformer 40 is used to test decoder 41 and transceiver 39. Next the EXEC/SKIP switch 49, FIG. 2A, is tested to ensure it is not stuck. Finally, the presence of the IC memory card 22 is tested. If IC memory card 22 is present, that is the IC memory card 22 is inserted into multipurpose bus interface/rapid reprogramming terminal 20 and the card is a RAM card the battery of IC memory card 22 is tested. If any of these tests fail the display elements of liquid crystal display 57 will remain active until they pass or the RESET switch 45 is pressed to begin another software built in test.

UART activity is tested for in both UART circuits 37 and 38 of interface/rapid reprogramming terminal 20 to process any digital data/characters being received. If a "+++" character sequence occurs from either UART circuit 37 or UART circuit 38 the program will enter the Command Mode and display on video screen 69 the Command Menu. All other character sequences are echoed with no further processing taking place.

Switch 49 on front panel 43 is tested for the EXEC position. If switch 49 is in the EXEC position and IC memory card 22 is present the SWITCHES.C module is called to setup and control the loading process of IC memory card 22.

The UPLOAD.C module 129 is the module which uploads data from processor 21 to IC memory card 22. An upload prompt message is displayed on video screen 69 at the beginning of this module. The module tests the status of IC memory card 22 for changes, that is IC memory card 22 must be operating properly and the battery for IC memory card 22 must be sufficiently charged. The UPLOAD.C module 129 then enters an infinite loop to process incoming records in an Intel Hex-32 format. All Intel Hex-32 record types are supported except types 03 and 05. Once a proper data record (type 00) is received the byte oriented data record is transferred to IC memory card 22. The UPLOAD.C module 129 is exited with the proper receipt of a type 01 record, that is an end of data record, and returns to the command mode.

The DOWNLOAD.C module 131 is the module during which data is down loaded from IC memory card 22 to digital signal processor 21. The DOWNLOAD.C module 131 displays a download prompt message on video screen 69 asking for the location of the data to download and then proceeds to download the data in the Intel Hex-32 format of FIG. 5. Upon completion of the down loading of data this module returns to the Command Mode.

The SWITCHES.C module 127 is the switch test and the interactive reprogram control module. The mux/direct switch 46, down/up switch 47, and vrfy/load switch 48 of front panel 43 comprise the mode of operation of interface/rapid reprogramming terminal 20, while the EXEC/SKIP switch 49 determines whether a data file is to be loaded/verified or skipped. The SWITCHES.C module 127 updates the status of switches 46 through 49 and test whether the current data file should be loaded/verified or skipped. If the data file is to be loaded/verified it selects the proper bus, bus characteristics, and executes a protocol based upon the contents of a lookup table in IC memory card 22.

Switch status is first tested for switch 49 to determined whether switch 49 has been activated to the EXEC position. Next all the proper pointers are set to point to file headers in IC memory card 22. Finally the mux/direct switch 46 is tested to see if a load is to be preformed through the aircraft 1553 multiplex data bus. If the 1553 multiplex data bus is to be used, then the aircraft identification is tested and verified.

The data bus and bus characteristics are obtained from a lookup table stored in IC memory card 22 and selected once it is determined that a data file should be loaded. The Protocol is also obtained from the lookup table and executed. Once data is loaded/verified pointers are set to the next file and the operation is repeated until no further file names are found.

The PROTOCOL.C module 141 contains the protocols identified in Military Standard 2217 that are not yet implemented in the multipurpose interface/rapid reprogramming terminal 20.

This PROTOB.C module 137 is the Protocol B module of the rapid reprogramming terminal's software which directs the loading and verifying of digital data to and from a remote terminal 53 aboard the aircraft. Loading of the remote terminal 53 is preformed by first sending an activity message to ensure that the remote terminal 53 is not busy. After a short delay interface/rapid reprogramming terminal 20 sends a memory configuration message to see if the data was already loaded. If the data was not previously loaded, interface/rapid reprogramming terminal 20 sends a load message to begin the process of loading the remote terminal 53. Next a header message is sent to pass on the size and location of the data to be loaded, followed by data load messages which are sent to the remote terminal 53 until all the data is transferred. A trailer message is then sent to the remote terminal 53 containing a checksum so that the data transferred to the remote terminal 53 can be validated. Finally an exit load message is sent by rapid reprogramming terminal 20 to the remote terminal 53 to terminate the load process.

The verification process is performed by first sending an activity message to ensure the remote terminal 53 is not busy. After a short delay rapid reprogramming terminal 20 sends an enter verify message to the remote terminal 53 followed by a header message to pass on the size and location of the data to be verified. The data is down loaded a message block at a time until all the data is received by rapid reprogramming terminal 20. As each data message is received the down/up 47 and vrfy/load 48 switch status is checked to determined if rapid reprogramming terminal 20 is performing a download into IC memory card 22 or a verify of the data in the IC memory card 22. When all the data is received and processed a trailer message is sent followed by an exit verify message to terminate the verification process.

The PROTOC.C module 139 of the rapid reprogramming terminal's software is similar to PROTOB.B module 137 except that the PROTOC.C module 139 directs the loading and verifying of digital data to and from a bus controller aboard the aircraft.

The MESSAGES.C module 135 is the message module for the rapid reprogramming terminal software and contains all the messages used by all protocols of the software. The MESSAGES.C module 135 directs the proper sending and receiving of these messages and returns an indication of the nature of any failure occurring during the transfer or processing of the message. The messages used by multipurpose bus interface/rapid reprogramming terminal 20 are the following:

TABLE II

| | |
|---|---|
| Activity message | Exit Load message |
| Memory Configuration message | Memory Data Verify message |
| Enter Load message | Enter Verify message |
| Header message | Exit Verify message |
| Memory Data Load message | Reprogram Status message |
| Trailer message | RRT Error message |

The MS1553.C module 133 is the MS-1553 driver module which contains routines used to transfer data to and from the MS-1553 data bus on board the aircraft. When interface/rapid reprogramming terminal 20 is performing as a bus controller, the routines are an MS-1553 Send routine which outputs messages to the 1553 data bus and an MS-1553 Receive routine which inputs messages from the 1553 data bus. When interface/rapid reprogramming terminal 20 is performing as a remote terminal, the routine used to send and receive data is an MS-1553 Respond routine.

When interface/rapid reprogramming terminal 20 is performing as a bus controller, these messages are contained in a message buffer and the returned status message is put in a status buffer. The first word of a message is put in the serial port 0 output shift register of digital signal processor 21 after the register is verified empty. A command sync signal and an encode enable signal are then set. When digital data is being shifted out of the serial port 0 output shift, the sync and enable signals are cleared. This process is repeated for each of the remaining data words with the sync signal always cleared until all the data is sent to the 1553 data bus. The echoed data received from transformer 40 through transceiver 39 and bus encoder/decoder 41 is next flushed. Status is received by waiting for a valid sync signal and then inputting the word contained in the serial port 0 receive shift register of digital signal processor 21 into internal RAM of processor 21.

The MS-1553 Receive routine inputs messages from the 1553 data bus to digital signal processor 21. The command word that initiates a receive data message is stored in a command status buffer. The messages are stored in a software storage array indicated by a passed pointer. Once the command word is sent to the 1553 data bus all echos are flushed prior to waiting for the receive message. Each word is input after a valid sync signal is received and when valid data is indicated. The MS-1553 Respond routine, which is used when interface/rapid reprogramming terminal 20 is a remote terminal, provides for a pointer to the command expected by interface/rapid reprogramming terminal 20, that is interface/rapid reprogramming terminal 20 request a command word from the bus controller 55. When the bus controller 55 polls interface/rapid reprogramming terminal 20 with activity messages, interface/rapid reprogramming terminal 20 through its response to the activity message can request a command or service request from the bus controller 55. The MS-1553 Respond routine also has a message pointer which points to the data and status information which are provided by rapid reprogramming terminal 20 in response to the command word supplied by the bus controller.

The TIMER.C module 149 of the rapid reprogramming terminal software is the timer module which contains the timer routines used to set delays or timeouts.

The ERROR.C module 147 of the rapid reprogramming terminal software contains routines that display error messages such as the voltage on the battery of IC memory card 22 is low.

The ERASE.C module 119 clears IC memory card 22 by writing logic zeros in each location in the memory of IC memory card 22.

The SERIALIO.C module 143 of the rapid reprogramming software is the RS-232 and RS-422 driver modules which contains routines used to transfer data to and from the RS-232 and RS-422 data buses.

The EIA RS-232 data bus protocol or interface is a conventional, well known, widely used and popular data bus protocol which provides an interface between data terminal equipment and data communications equipment using serial binary data exchange. It may typically be used to interface a computer and a peripheral device such as a modem, mouse, drawing tablet or printer and typically uses a 25 pin DB-25 or a 9 pin DB-9 connector. It normally has a cable length limitation of 50 feet. The RS-232 interface standard specifies the electrical signal characteristics, connector pin assignments and functional interchange circuit descriptions for serial binary exchange.

The RS-422 is an EIA standard for serial transmission that extends the distances and speeds beyond the RS-232 standard.

The routines used by the SERIALIO.C module 143 for the RS-232 interface are a Get Byte routine which inputs data bytes by constructing the byte from nybles obtained from the Get Nyble routine; a Get Nyble routine which inputs data nybles obtained from ASCII characters returned by an RS232 Receive routine; a Put Byte routine which outputs bytes by constructing nybles and sending them through a Put Nyble routine; a Put Nyble routine which outputs nybles by constructing ASCII characters and then outputs the nybles through the RS232 Send routine; a RS232 Receive routine which inputs ASCII characters by first testing the UART status until a character is received and then getting the character from the RS232 Data routine and an RS232 Data routine which inputs ASCII characters directly from the UART receive register without testing any UART status bits other that those indicating if an error (overrun, parity, etc.) has occurred. Further, the SERIALIO.C module 143 for the RS-232 interface uses a RS232 Send routine which outputs ASCII characters by first testing for a busy (the RS-232 interface might be sending data) and if busy prevents a receive overrun and when not busy a receive is enabled and data is sent. The SERIALIO.C module 143 for the RS-232 interface also uses a String Send routine which outputs ASCII strings by first testing the busy status to ensure that each character can be sent.

The DSPINIT.ASM module 103 is the entry point for the rapid reprogramming terminal program. The DSPINIT.ASM module 103 establishes interrupt vectors, initializes internal registers within digital signal processor 21, performs an auto-initialization which moves variables from ROM to RAM within digital signal processor 21 for usage by processor 21, initializes internal control registers within processor 21, and calls a system initialization routine for interface/rapid reprogramming terminal 20 prior to calling RRT_BIT.C. A description of each section of the DSPINIT.ASM module 103 follows.

The Processor Global Declarations contain declarations of two types, defined globals which are labels defined by the DSPINIT.ASM module 103 and used by other modules and referenced globals which are labels used by the DSPINIT.ASM module 103 that were defined by another module.

The reset and interrupt vector specification contains values or references used to established vectored entry points throughout the rapid reprogramming terminal program. This section's "int-vecs" (interrupt vectors) are mapped into the lower part of program memory by a linker through its interpretation of the linker command file (LNK30.EXE program for digital signal processor 21).

The Stack, DMA, Timer 0, Timer 1, Serial Port 0 and Serial Port 1 sections of DSPINIT.ASM 103 contain references used to establish the location of internal registers of digital signal processor 21 throughout the program. These register locations are defined in a linker command file.

The data constants define values used in initializing the internal registers of the Digital Signal Processor 21 with the specific function of each value being described in the module.

Once the stack pointer, frame pointer, cache, and interrupts are established for digital signal processor 21 an auto-initialization takes place. Auto-initialization is the process of moving variables defined in the ROM of processor 21 into the RAM of processor 21 where these variables can be manipulated. The location in the internal digital signal processor 21 RAM is established in the linker command file.

The defined data constants are then stored into their appropriate locations, completing the process of initializing the various Digital Signal Processor 21 internal control registers leaving only the initialization of the external system components prior to entering the main program.

The SYSINIT.ASM module 107 is the system initialization routine which performs a hardware reset and initializes the registers of all peripheral devices.

Hardware Reset is performed by taking a dedicated output discrete high (active high reset) for approximately 16 microseconds and then low again. This discrete is connected to UARTS 37 and 38, and all three programmable peripheral interfaces 52, 54 and 56 reset pins.

The initialization of these peripherals configures the peripherals to accomplish specific functions. UART 37 is initialized as RS-232 Data Set Equipment (DSE) for the fastest baud rate the Data Terminal Equipment (DTE) will operate at. The second UART 38 is initialized as RS-422 Data Set Equipment also for the fastest baudrate the terminal will operate at. Both UARTs 37 and 38 may be reconfigured for equipment loading, as specified by the IC memory card's contents, for those loads not transpiring over the MS-1553 bus. Programmable peripheral interfaces 52, 54 and 56 are configured to support discrete input or output functions as described in the rapid reprogramming terminal program.

The INTERRUPT.ASM module provides for interrupt routines and is currently not being utilized by interface/rapid reprogramming terminal 20.

The CONTROL.C module 125 is used to detect and to establish control of the 1553 multiplex data bus 42. The CONTROL.C module 125 performs a bus polling function which determines if interface/rapid reprogramming terminal 20 is being polled by a bus controller 55 on the 1553 multiplex data bus 42. The second function performed by the CONTROL.C module 125 is that of converting interface/rapid reprogramming terminal 20 to a bus controller and also converts the bus controller to a remote terminal. The third function performed by the CONTROL.C module 125 is to quiet or inactivate the bus controller for the purpose of reprogramming a remote terminal 53. For example, if interface/rapid reprogramming terminal 20 is to reprogram an AN/ALQ-126B Defensive Electronic Counter Measures Set (a remote terminal on the electronics warfare bus) and the AN/ALR-67 Radar Warning Receiver (the bus controller on the electronic warfare bus) is active, the CONTROL.C module 125 will quite the AN/ALR-67 Radar Warning Receiver to allow interface/rapid reprogramming terminal 20 to reprogram the AN/ALQ-126B Defensive Electronic Counter Measures Set. The fourth function performed by the CONTROL.C module 125 is to enable a bus controller which was previously quieted by the CONTROL.C module 125. For example, if it is now required to reprogram the AN/ALR-67 Radar Warning Receiver the CONTROL.C module 125 will enable the AN/ALR-67 Radar Warning Receiver for the purpose of reprogramming. The fifth function performed by the CONTROL.C module 125 takes the bus controller that was previously converted to a remote terminal by the CONTROL.C module 125 and reconverts it to a bus controller and also reconverts interface/rapid reprogramming terminal 20 from a bus controller to it's initial RT status.

The DISPLAY.C module 145 performs two functions with respect to liquid crystal display 57 in that it provides for the initialization (LCD_initialization) of liquid crystal display 57 and for the alpha numeric display (LCD_display) provided to the operator by liquid crystal display 57. The initialization function of the DISPLAY.C module 145 clears liquid crystal display 57 and sets up display 57. It should be noted that liquid crystal display 57 provides two lines of alpha numeric display characters with each line having twenty alpha numeric characters for display. The display function provides for two arguments for the function call, the first argument being the string of alpha numeric characters to be displayed by liquid crystal display and the second argument being the starting location of the string of alpha numeric characters to be displayed by liquid crystal display 57. If the value of the starting location is zero LCD_display clears display 57 prior to displaying the string of alphanumeric characters. If the value of the starting location is other than zero LCD_display causes liquid crystal display 57 to display the string of alpha numeric characters for viewing by the operator without clearing display 57.

Figures 6, 7:
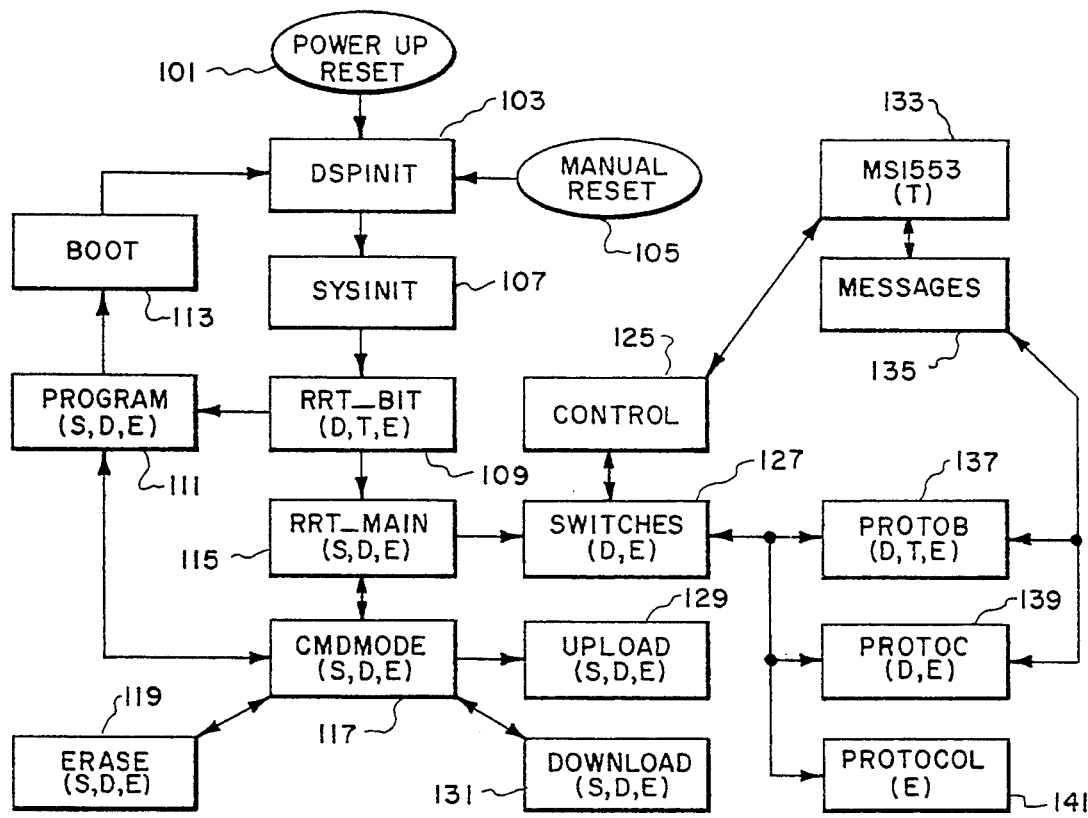
FIG. 6 is a simplified flow diagram illustrating the sequence of operation of the program modules for the software used by the present invention.
FIG. 7 illustrates the format of message transfers via the 1553 multiplex data bus interface aboard an aircraft.

Referring to FIG. 7, the format of message transfers on the 1553 multiplex data bus 42 will now be discussed. Encoder/decoder 41 is used to translate sixteen bit data words provided by processor 21 into Manchester mark encoded Military Standard 1553 signals for use by 1553 multiplex data bus 42 and also to decode Manchester mark signals provided by bus 42 into sixteen bit data words supplied to processor 21. A logic one is transmitted as a bipolar coded signal 1/0 or 0/1, occurring during the falling edge of the data clock (either the one megahertz ESCLK signal or either one megahertz DSCLK signal provided by encoder/decoder 41). A logic zero is the absence of a bipolar coded signal transition occurring during the falling edge of the data clock. A transition always occurs during the rising edge of the data clock. An absence of either pulse within a bit time is a Manchester error. The transmission rate is set at one megahertz.

The encoder/decoder 41 used in the preferred embodiment of the present invention is a Model No. HD-15530 CMOS Manchester Encoder-Decoder manufactured by Harris Corporation, although it should be understood that any integrated circuit device which functions in accordance with the requirements of Manchester encoded time division multiplexed serial data protocols may be used with the present invention. The transceiver 39 used in the preferred embodiment of the present invention is a Model No. 63102 II Military Standard 1553 data bus transceiver manufactured by ILC Data Device Corporation, although it should be understood that any integrated circuit device which functions in accordance with the requirements of Manchester encoded time division multiplexed serial data protocols may be used with the present invention. The transformer 40 used in the preferred embodiment of the present invention is a Military Standard 1553 data bus isolation transformer manufactured by ILC Data Device Corporation.

As is best illustrated by FIG. 7, the Command Word format for each Command Word transmitted by interface/rapid reprogramming terminal 20 consist of a command sync waveform which is an invalid Manchester waveform. The width of the waveform is three bit times with the waveform being positive for the first one and one-half bit times, and then negative for the following one and one-half bit times.

The next five bits (Bit times 4 to 8, bits 11–15) following the sync waveform is the remote terminal address, with there being thirty addressable units per bus since the digital codes 00000 and 11111 are not used. The type of avionics or other equipment defined by these addresses vary by aircraft and selected bus.

Following the remote terminal address is the transmit/receive bit (Bit time 9, bit 10) which indicates the action required of the remote terminal 53. A logic zero indicates that the remote terminal 53 is to receive data, while a logic one indicates that the remote terminal 53 is to transmit data.

The subaddress field (Bit time 10 to 14, bits 5–9) follows the transmit/receive bit and identifies the type of message, for example an activity message. The subaddress values 00000 and 11111 are used for mode commands.

The data word count (Bit times 15 to 19, bits 0–4) follows the subaddress field and is a binary number indicating the data words to be either sent or received by the remote terminal 53. The remote terminal 53 may either send or receive a maximum of thirty two words in any one message block with all ones indicating a decimal count of thirty one and all zeros indicating a decimal count of thirty two.

The P bit (Bit time 20) of the command word is used for parity over the preceding sixteen bits and utilizes odd ones parity.

Status words are transmitted by a remote terminal 53 after receipt of a rapid reprogramming terminal generated Command Word or following a rapid reprogramming terminal to remote terminal transfer.

The Status Word format for each Status Word transmitted by a remote terminal 53 consist of a status sync waveform which is an invalid Manchester waveform identical to the command sync waveform.

The next five bits (Bit times 4 to 8, bits 11–15) following the sync waveform is the address of the remote terminal 53 which is transmitting a status word.

Following the remote terminal 53 address is a message error bit (Bit time 9, bit 10) which is not currently used by interface/rapid reprogramming terminal 20.

The status code field (Bit times 10 to 18, bits 1–9) follows the message error bit and is used to convey remote terminal status information to interface/rapid reprogramming terminal 20.

The terminal flag (Bit time 19, bit 0) follows the status code and will be set to one to indicate that the status code field should be examined by interface/rapid reprogramming terminal 20.

The P bit (Bit time 20) of the status word is used for parity over the preceding sixteen bits and utilizes odd ones parity.

Sequences of up to thirty two data words may be sent from a remote terminal 53 to interface/rapid reprogramming terminal 20 or from interface/rapid reprogramming terminal 20 to a remote terminal 53. Each data word consist of a data sync waveform (Bit times 1 to 3) which is an invalid Manchester waveform. The width of the waveform is three bit time with the waveform being negative for the first one and one-half bit times, and then positive for the following one and one-half bit times. The sixteen message data bits (Bit times 4 to 19, bits 0–15) following the sync waveform are used for message data transmission.

The P bit (Bit time 20) of the data word is used for parity over the preceding sixteen bits and utilizes odd ones parity.

Referring to FIG. 8a during the transfer sequence from interface/rapid reprogramming terminal 20 to a remote terminal 53, terminal 20 transmits a command word with its TR bit set to zero, followed immediately by from one to thirty two data words also generated by terminal 20. The remote terminal 53 next responds with a status word.

Referring to FIG. 8b during the transfer sequence from a remote terminal 53 to interface/rapid reprogramming terminal 20, interface/rapid reprogramming terminal 20 transmits a command word with its TR bit set to one. The remote terminal 53 responds with a status word followed by one to thirty two data words.

The messages of Table II utilized by interface/rapid reprogramming terminal 20 to communicate with a remote terminal 53 being reprogrammed via the 1553 multiplex data bus 42 will now be discussed. It should be understood that the messages used by interface/rapid reprogramming terminal 20 to communicate with any remote terminal 53 aboard the aircraft via the 1553 data bus are required to follow the message formats set forth in FIGS. 7 and 9.

The Activity Message of FIG. 9A is utilized by interface/rapid reprogramming terminal 20 when reprogramming a remote terminal 53 to determine whether the remote terminal 53 is ready to receive data and allows the remote terminal 53 a request to send information to interface/rapid reprogramming terminal 20 or receive information from interface/rapid reprogramming terminal 20.

Referring to FIG. 9A the Command Word for the activity message follows the format set forth in FIG. 7. Bits 11–15 provide the address of the remote terminal 53 to receive the message, bit 10 is set at a logic one, the subaddress (bits 5–9) is set at 07 hexadecimal and the word count (bits 0–5) is one.

The status word response to the activity message as well as the other messages of Table II follows the general format set forth in FIG. 7 supplemented by FIG. 9B. A status response word to any of the messages set forth in Table II is provided by a remote terminal 53 for each message transaction. The status response word follows data on a remote terminal receive type transaction and precedes the data on a remote terminal transmit type transaction. The interface/rapid reprogramming terminal 20 allows a response time gap of approximately 12 usec. from the end of the last transmitted command word (transmit type message) or the end of the last transmitted data word (receive type message), to the start of the remote terminal status response word before declaring a no response error. The remote terminal 53 begins the status response word within a time period of approximately 2–10 usec. from the receipt of the end of the last command word (transmit type message) or the receipt of the end of the last data word (receive type message). The software for rapid reprogramming terminal ensures that the time from the end of the remote terminal transmission of the last data word (transmit type message) or the end of the last status response word (receive type message) to the beginning of the next command word is at least 8 usec. Referring to FIG. 9B, the status response word bits for each of the messages of Table II comprise a terminal address (bits 11–15) which is the remote terminal address of the remote terminal 53 being reprogrammed (referred to as YYYYY); a message error bit (bit 10) which is not used; a service request bit (bit 8) and a busy bit (bit 3).

The busy bit is utilized by interface/rapid reprogramming terminal 20 if it is set and when the remote terminal being reprogrammed is compatible with setting the busy bit, that is the remote recognizes the busy bit. The setting of this bit to a logic one indicates to the interface/rapid reprogramming terminal 20 that it is necessary to suspend or slow down communications with the remote terminal 53. The first status response word received by the interface/rapid reprogramming terminal 20 with the busy bit set to a logic one causes the interface/rapid reprogramming terminal 20 to send only activity messages (normally every 10 msec.) until the busy bit is cleared (logic 0). As long as the busy bit is clear in the status response word from a remote terminal 53, interface/rapid reprogramming terminal 20 assumes that the remote terminal 53 can support a continuous stream of identical messages within a 2 msec. time period from the end of one message to the start of the next command word. The continuous stream of identical messages is assumed to be either memory data load or memory data verify messages.

This continuous stream is maintained for a time period compatible with IC Memory Card 22 and remote terminal 53 data transfer capabilities and at a minimum, interface/rapid reprogramming terminal 20 is capable of transferring 2K data words (in memory data load or memory data verify messages) per second when remote terminal 53 does not indicate a busy status during the transfer. Any data word transmitted after a status word with the busy bit set is ignored by interface/rapid reprogramming terminal 20. If the remote terminal 53 being reprogrammed cannot set the busy bit in the remote terminal status response, then prior to each message transmission other than an activity message transmission, interface/rapid reprogramming terminal 20 will command an activity message from the remote terminal 53 being reprogrammed and inspect the busy bit in the data word following the status response word to determine if the remote terminal 53 is ready to communicate with interface/rapid reprogramming terminal 20.

The operation of interface/rapid reprogramming terminal 20 after the busy bit has been set to a logic one and then cleared varies depending on the operation of the remote terminal 53. If the busy bit was set in the status response word for a transmit type command, after the busy bit is cleared (in the response to the activity message) the last transmit command will be repeated so that interface/rapid reprogramming terminal 20 can receive data words that were ignored when the busy bit was set.

If the busy bit was set in the data word of the activity message which is only applicable when the busy bit is not set in the status response word, the data word for the first activity message with the busy bit cleared will be processed normally.

If the busy bit is set in the status response word for a receive type command, then two options (selectable by a flag in the look up table for the remote terminal being reprogrammed) are allowed. Interface/rapid reprogramming terminal 20 assumes that the data words were not received by the remote terminal 53 and when the busy bit is cleared in the status response word for the activity message, the last received message will be repeated or rapid reprogramming terminal assumes that the data words were received by the remote terminal 53 and when the busy bit is cleared in the status response word for the activity message, the last received message will not be repeated.

Referring again to FIG. 9A, the remote terminal address (bits 11–15) for the status word response to the activity message is the address of the remote terminal 53 being reprogrammed. The message error bit (bit 10) may be a one or a zero since this bit is not utilized. The service request bit (bit 8) may normally be a one or zero since this bit is not utilized unless a data transfer is in progress. When the service request bit is not used, interface/rapid reprogramming terminal 20 determines that the remote terminal 53 is requesting a message transaction based on the fact that the contents of bits 0 through 10 of the data word that follows are non-zero.

The busy bit (bit 3) if set to a logic one is used to indicate that the remote terminal 53 is not ready to process any messages from terminal 20 other than the activity message. Prior to the transmission of any other type messages to the remote terminal 53, interface/rapid reprogramming terminal 20 will continue to send Activity Messages (approximately every 10 msec.) to the remote terminal 53 until the busy bit is cleared, or the number of sequential Activity Messages is exhausted as determined from a lookup table or a Reprogram Status Message is requested. Remote terminal 53 will respond to the busy bit (bit 15) in the data word that follows only when the busy bit in the status word is not set. Bits 9, 7, 6, 5, 4, 2 and 1 of the status word are not utilized and therefore may be either a one or a zero.

The terminal flag bit (bit 0) of the status word is used only when a data transfer from interface/rapid reprogramming terminal 20 to a remote terminal 53 is in progress. Following a header message and proceeding an exit load message during a data transfer, if the terminal flag bit and the service request bit of the status word are set at a logic one state, interface/rapid reprogramming terminal 20 will extract from a data word sent by the remote terminal 53 to interface/rapid reprogramming terminal 20 the next command word to be sent by interface/rapid reprogramming terminal 20 to the remote terminal 53. This command word is the command word for the reprogram status message of Table II.

Rapid reprogramming terminal will ignore the data word of the activity message when the busy bit is set to a logic one in the status response word provided by remote terminal 53; thus, the remote terminal 53 need not transmit the data word.

The busy bit (bit 15) in the data word for the activity message functions identically to the busy bit in the status word (bit 3). This bit is provided to accommodate a remote terminal 53 that does not utilize bit 3 of the status word to indicate it is busy. The busy bit and the remote terminal request bits (bits 0–10) of the data word will not be set simultaneously unless the remote terminal 53 is required to send a reprogram status message to interface/rapid reprogramming terminal 20. The busy bit need not be set to a logic one state in order to send a reprogram status message to interface/rapid reprogramming terminal 20. Interface/rapid reprogramming terminal 20 will not honor the reprogram status message request until an activity message containing the request with the busy bit clear or at the logic zero state is received by terminal 20.

The request bits (bits 0–10) of the data word are utilized to allow the remote terminal 53 to request that interface/rapid reprogramming terminal 20 send a specific command to the remote terminal 53. As a result of the remote terminal request, interface/rapid reprogramming terminal 20 will transmit a command word with the remote terminal address defined in bits 11 through 15 of the command word and the contents of the activity message remote terminal request in bits 0–10 of the data word. The TR bit (bit 10) is set to 1 if remote terminal 53 is to transmit a message and will be set to 0 if remote terminal 53 is to receive a message. The subaddress bits (bits 5–9) of the data word indicate the subaddress of the message to be sent. The word count bits (bits 0–4) indicate the data word count for the message. Bits 11–14 are equal to a logic 0.

The activity messages prior to interface/rapid reprogramming terminal 20 beginning a Load/Verify operation or a Verify operation will now be discussed. After the setting of the discrete, that is the setting of the outputs of programmable peripheral interfaces 52, 54 and 56 and the expiration of a 10 msec. wait period, the first messages commanded by interface/rapid reprogramming terminal 20 are activity messages regardless of whether or not a lookup table for the remote terminal 53 indicates that activity messages are required for each and every transaction. A transaction, in turn, comprises a header message followed by a number of data transfer messages as indicated by the header message and a trailer message. Bits 11–14 of the activity message data word are never used by interface/rapid reprogramming terminal 20. The digital information received in bits 0–10 of the data word for all activity messages commanded by interface/rapid reprogramming terminal 20 before the first message of FIG. 9D are ignored by terminal 20. This operation is implemented to permit use of the activity message subaddress for other uses when reprogramming is not being performed, that is interface/rapid reprogramming terminal 20 only assumes the activity message data is valid after reprogramming of a remote terminal 53 has begun by the setting of discretes and receipt of a valid load/verify message, FIG. 9D. The information received in bit 15 (busy bit) of the data word for all activity messages commanded by interface/rapid reprogramming terminal 20 before the load/verify message, FIG. 9(D), will only be used if the lookup table for the remote terminal 53 indicates that activity messages are required for every transaction and the busy bit is not set to a logic one in the status word response to the activity message. In this case the remote terminal 53 must ensure that bit 15 of the data word is valid or set to zero prior to receipt of the load/verify message, FIG. 9D.

In the manual mode, if the remote terminal lookup table indicates that memory configuration messages are supported, then there will be a memory configuration message commanded before the load/verify message, FIG. 9D, and interface/rapid reprogramming terminal 20 will expect valid memory configuration data. Ignoring the activity message data word bits 0-14 precludes a remote terminal 53 from sending a reprogram status message prior to receipt of the load/verify message, FIG. 9D, from interface/rapid reprogramming terminal 20; however, a reprogram status message would not be valid before reprogramming is initiated. Therefore a remote terminal 53 should not request a reprogram status message until after the remote terminal 53 receives a load/verify message, FIG. 9D.

Referring to FIG. 9C, the data word in the activity message provided prior to a memory configuration message is processed only when interface/rapid reprogramming terminal 20 is required to check the busy bit status (check bit 15 of the data word of the activity message) of remote terminals 53 that do not use the busy bit in the status response word. The memory configuration message is utilized to read the current memory configuration of remote terminals 53. This message is only used when its use is indicated in a lookup table for the remote terminal 53. The command word and status word for the memory configuration message follow the format of FIG. 7. Each remote terminal 53 aboard an aircraft has up to two memories designated memory area one and memory area two. Data bits 0-15 of data word one of the memory configuration message represent the configuration of the data stored in memory area one. Unused data bits equal zero. Similarly, data bits 0-15 of data word two of the memory configuration message represent the configuration of the data stored in memory area two. Unused data bits equal zero. In the automatic mode of operation this message is used for the purpose of comparing a remote terminal's configuration stored in the IC memory card 22 with the reported remote terminal configuration. If the reported value is the same as the value stored in the IC memory card 22, interface/rapid reprogramming terminal 20 will not perform a load operation. However, if the reported value is different from the value stored in the IC memory card 22, interface/rapid reprogramming terminal 20 will proceed with a load operation.

Referring to FIG. 9D, there is shown the format for the enter load, exit load, enter verify and exit verify messages of Table II. For the first enter load, exit load, enter verify or exit verify message, the data word in the activity message provided prior to an enter load, exit load, enter verify or exit verify message will be processed only when interface/rapid reprogramming terminal 20 is required to check the busy bit status (check bit 15 of the data word of the activity message) of remote terminals 53 that do not use the busy bit (bit 3) in the status response word and in this case bits 0-14 of the data word will be ignored.

The transmit/receive bit (bit 10) in the command word for the enter load, exit load, enter verify and exit verify messages is a logic zero since the remote terminal 53 is to receive data. The terminal subaddress field (bits 5-9) in the command word is set at 1D hexadecimal. Each message enter load, exit load, enter verify and exit verify requires that an enable signal be provided by interface/rapid reprogramming terminal 20 before a load or verify may be executed. A logic one at the EW_OSM_EN output of interface 54 enables the operating software memory of the electronic warfare system on board the aircraft. Similarly, a logic one at the EW_UDM_EN output of interface 54 enables the user data memory of the electronic warfare system on board the aircraft. When the AV_EN1 output of interface 54 is at a logic one state the first memory areas of the aircraft avionics system are enabled, while a logic one at the AV_EN2 output of interface 54 enables the second memory areas of the aircraft avionics system.

Each field in the data is checked by the remote terminal 53 for compliance with the following prior to execution of a load or verify. The type and number fields are defined based on WRA nomenclature (e.g., RT-1079); however, if this creates a conflict, the system nomenclature (e.g., ALQ-126) is utilized instead. The preferred embodiment of the present invention uses WRA nomenclature.

Data word one (bits 0-15) is the type field consisting of the first two eight bit ASCII characters that represent the nomenclature of the remote terminal 53 being controlled. For example, for RT-1079 the two characters would be "R", "T".

Data word two (bits 0-15) is a number field consisting of the third and fourth eight bit ASCII characters that represent the nomenclature of the remote terminal 53 being controlled. For example, for RT-1079 the two characters would be "1", "0".

Data word three (bits 0-15) is a number field consisting of the last two eight bit ASCII characters that represent the nomenclature of the remote terminal 53 being controlled. For example, for RT-1079 the two characters would be "7", "9".

Data word four (bits 10-15) is the fill field which may be any bit pattern including zero and is to be defined by the individual remote terminal 53 being controlled. The fill field is required to be checked even if the field is defined as zero. The fill field is contained in a look up table for the remote terminal 53 being reprogrammed.

The load/verify bits (bits 8-9) are used to described whether a Load, Verify, or other type transaction will follow. The load/verify bits are coded as follows: L/V=01 indicates that a memory load follows; L/V=10 indicates that a memory verify follows; L/V=11 is not used and L/V=00 indicates that a enter load, enter verify, exit load or exit verify message is being sent for some reason other than a load or verify such as to quiet the bus controller for the remote terminal 53 being reprogrammed.

The control code (bits 0-7) of data word four are set as follows: bit 7 is a reprogram enable for memory area one and is equal to 80 hexadecimal; bit 6 is a reprogram enable for memory area two and is equal to 40 hexadecimal; bit 5 is a reprogram disable for memory area one and is equal to 20 hexadecimal and bit 4 is a reprogram disable for memory area two and is equal to 10 hexadecimal. Bit 3 of the control code (08 hexadecimal) indicates to the bus controller for a remote terminal 53 being reprogrammed to convert to a remote terminal so as to allow the remote terminal 53 to be reprogrammed. In addition, bit 3 converts a bus controller 55 which may only be reprogrammed as a remote terminal to a remote terminal for reprogramming. Bit 2 of the control code which is 04 hexadecimal tells the bus controller for remote terminal 53 to stop transmitting or receiving information so as to allow the remote terminal to be reprogrammed. The use of bit 2 of the control code in this manner is required because some bus controllers can not be converted to a remote terminal when reprogramming a remote terminal 53. Bit 1 of the control code which is 02 hexadecimal is utilized to have a bus controller when converted to a remote terminal revert back to a bus controller. Bit 0 of the control code which is 01 hexadecimal causes the remote terminal to begin executing starting at the address previously supplied via data word three or data word four of a header message.

The control code field is valid only if all other fields are correct and only if either the Avionics Reprogram Enable 1 (AV_EN1 output of interface 54); or the EW UDM Reprogram Enable discrete (the EW-UDM_EN output of interface 54) is present or the Avionics Reprogram Enable 2 (AV_EN2 output of interface 54) or the EW OSM Reprogram Enable discrete (EW-OSM_EN output of interface 54) is present. At the end of reprogramming, interface/rapid reprogramming terminal 20 will maintain the active discrete for at least 100 msec after the transmission of a exit load or exit verify message that ends the reprogramming mode.

The following are the only valid control codes that can occur when interface/rapid reprogramming terminal 20 is functioning as a bus controller during a load or verify. Any other code shall cause the remote terminal to not execute a load or verify.

Code 00000000 which is 00 hexadecimal indicates that no load or verify control action is to be taken.

Code 00000001 which is 01 hexadecimal will cause the remote terminal 53 to begin execution starting at the address previously supplied via data word three and data word four of the header message.

Code 00000010 which is 02 hexadecimal will cause the remote terminal 53 to revert back to a bus controller. Upon execution of this Code the message traffic shall be for interface/rapid reprogramming terminal 20 functioning as a remote terminal.

Code 00010000 which is 10 hexadecimal will cause the remote terminal 53 to exit the reprogramming mode for memory area two. This code is only valid if the Avionics Reprogram Enable 2 or the EW OSM Reprogram Enable discrete is active.

Code 00100000 which is 20 hexadecimal will cause the remote terminal to exit the reprogramming mode for memory area one. This code shall only be valid if the Avionics Reprogram Enable 1 or EW UDM Reprogram Enable discrete is active.

Code 00110000 which is 30 hexadecimal is a combination of 10 hexadecimal and 20 hexadecimal for simultaneous memory areas one and two exit reprogramming mode.

Code 01000000 which is 40 hexadecimal will cause the remote terminal 53 to enter the reprogramming mode for memory area two. This code shall only be valid if the Avionics Reprogram Enable 2 or the EW OSM Reprogram Enable discrete is active.

Code 10000000 which is 80 hexadecimal will cause the remote terminal 53 to enter the reprogramming mode for memory area one. This code shall only be valid if the Avionics Reprogram Enable 1 or the EW UDM Reprogram Enable discrete is active.

Code 11000000 which is C0 hexadecimal is a combination of 40H and 80H for simultaneous memory areas one and two enter reprogramming mode.

Referring to FIG. 9E there is shown the format for a header message which is used to pass load and verify parameters to the remote terminal 53 being reprogrammed. The data word in the activity message provided prior to a header message is processed only when interface/rapid reprogramming terminal 20 is required to check the busy bit status (check bit 15 of the data word of the activity message) of remote terminals 53 that do not use the busy bit (bit 3) in the status response word.

The transmit/receive bit (bit 10) in the command word is at the logic zero state since the remote terminal 53 is to receive data and the terminal subaddress field (bits 5-9) is set at 14 hexadecimal. The transfer mode (bits 14-15) are used to describe the memory data load or memory data verify message data word content. The transfer mode bits are binary coded as follows: TM=00; TM=01; TM=10 and TM=11. When TM=00 which is the no transfer mode, the buffer transfer count contained in data word one and the initial load address contained in data word two have no meaning. This mode is used to transfer the program entry address contained in data word three and Page Number contained in data word four or is used as a preamble to the trailer message.

When TM=01, each sixteen bits of data transmitted in a data word will contain only eight bits of information in bits 0-7. When TM=10, each sixteen bits of data transmitted in a data word will contain sixteen bits of information in bits 0-15. When TM=11, the sixteen bits of data transmitted in each odd word (first is odd) contains the sixteen least significant bits of data in bits 0-15 and each even word (second is even) contains the sixteen most significant bits of data in bits 0-15.

The header type bits (bits 12-13) are used to describe the header and have no meaning when the transfer mode is 00. The header type are binary coded as follows: HT=00, HT=01, HT=10 and HT=11. When HT=00, the buffer transfer count equals the number of words to be transferred. When HT=01, the buffer transfer count equals number of messages to be transferred. HT=10 is undefined, while HT=11 is reserved for internal use by digital signal processor 21 and therefore will not be transmitted on the 1553 multiplex data bus 42 aboard the aircraft.

The buffer transfer count (bits 0-11) is used to indicate the amount of data that will follow the header message. The buffer transfer count has no meaning when the transfer mode is 00. The range of the buffer transfer count is from one to four thousand ninety six words.

When HT=00, the buffer transfer count is the total number of data words that will be transmitted in a transaction which includes the header message and trailer message. The data words are transmitted in 32-word messages since each transfer sequence is limited to thirty two data words (see FIG. 8) with the last message containing from one to thirty two data words. The maximum transfer for HT=00 is four thousand ninety six words using one hundred twenty eight memory data load or memory data verify messages.

When HT=01, the buffer transfer count is the number of memory data load or memory data verify messages that will follow the header message. Thus, the maximum data transfer per header message is 4096×32 data words per memory data load or memory data verify message which equals 131,072 sixteen bit words (128K). If paging (data word four, bits 0-1) is utilized for transfer modes 01 or 10, the maximum value of the buffer transfer count will be 2048 which results in 65,536 sixteen bit data words (64K) for transfer by modes 01 and 10.

Data word two is the initial load address (bits 0-15) which is the sixteen or less least significant bits of the point in memory into which data is to be loaded or read. The maximum value (number of bits) used in the initial load address is compatible with the page size of remote terminals using paging. Unused bits equal zero.

Data word three is program entry address (bits 0-15) which has meaning only for transfer mode =00. The program entry address is the sixteen or less least significant bit of the point in memory at which the remote terminal 53 being reprogrammed is to begin execution after receipt of an execute command in a load/verify message, FIG. 9D, or when a transfer control is indicated in data word four. The load/verify message, FIG. 9D, is only used with remote terminals which require this command. The maximum value (number of bits) used in the program entry address is compatible with the page size of remote terminals using paging. Unused bits equal zero.

Data word four is the page number (bits 3-15) representing up to the thirteen most significant bits for a paged memory address within the remote terminal 53. The page number applies to the program entry address for transfer mode =00 or the initial load address for transfer modes =01, 10 or 11. Unused bits shall equal 0. It should be noted that a page comprises 65,536 addresses in memory.

The transfer control bits 0-1 may be used to transfer control to a loaded program after a verify is processed or to an unaltered memory area after a load is completed, that is a remote terminal 53 has been reprogrammed. When the transfer control bits equal 01 this indicates to the remote terminal 53 being reprogrammed that this is the last header, memory data load or verify (up to 4096 messages), trailer or header, trailer transaction. When the transfer control bits equal 01 this indicates to the remote terminal 53 being reprogrammed that more data is to follow the current header, memory data load or verify (up to 4096 messages), trailer transaction or header, trailer transaction and control should not be transferred. For remote terminals 53 using paging and the program entry address, the transfer control will remain equal to 01 even for the last data transaction, until a transfer mode equals 00 message is used to supply the program entry address and page number. Transfer control equal to 10 indicates that control is to be transferred to the program entry address of data word three. When control is transferred, the transfer does not take place until after the trailer message and control is transferred only to non-reprogrammed areas or verified areas in memory. Transfer control equals 11 is invalid and bit 2 equals zero.

Referring to FIG. 9F there is shown the format for a memory data load message which is used to transfer the data to be loaded into the memory of a remote terminal 53 being reprogrammed. The data word in the activity message provided prior to a memory data verify message is processed only when interface/rapid reprogramming terminal 20 is required to check the busy bit status (check bit 15 of the data word of the activity message) of remote terminals 53 that do not use the busy bit (bit 3) in the status response word.

The transmit/receive bit (bit 10) in the command word is at the logic zero state since the remote terminal 53 is to receive data and the terminal subaddress field (bits 5-9) is set at 15 hexadecimal, while the word count may vary from one to thirty two.

If the busy bit (bit 3) is set to a logic one in the status response word for a memory data load message and the remote terminal 53 is of the type that requires retransmission of the message, the memory data load message for which the busy bit has previously been set will be repeated after the busy bit (bit 15 of the data word) in the activity message is cleared or at the logic zero state. The number of data words will equal the word count in the memory data load message command word.

Referring to FIG. 9G, there is shown the format for a memory data verify message which is used to pass the data that interface/rapid reprogramming terminal 20 will compare to the data stored in IC memory card 22. The data word in the activity message provided prior to a header message is processed only when interface/rapid reprogramming terminal 20 is required to check the busy bit status (check bit 15 of the data word of the activity message) of remote terminals 53 that do not use the busy bit (bit 3) in the status response word.

The transmit/receive bit (bit 10) in the command word is at the logic one state since the remote terminal 53 is to transmit data and the terminal subaddress field (bits 5-9) is set at 15 hexadecimal, while the word count may vary from one to thirty two.

If the busy bit (bit 3) is set to a logic one in the status response word for a memory data verify message then any data words transmitted by the remote terminal 53 are ignored. After the busy bit is cleared in the status response word for the activity message, interface/rapid reprogramming terminal 20 recommands a memory data verify message. The remote terminal 53 ensures that the data words transmitted are for the memory data verify message for which the busy bit was set, even if the data words were previously transmitted.

The number of data words will equal the word count in the memory data verify message command word.

Referring now to FIG. 9H, the trailer message is used to pass the data checksum and additional load or verify parameters to the remote terminal 53 being reprogrammed. The activity message shown prior to the trailer message will only be present when interface/rapid reprogramming terminal 20 is required to check the busy bit status of remote terminals 53 that do not use the busy bit in the status response word.

The transmit/receive bit (bit 10) in the command word for the trailer message is a logic zero since the remote terminal 53 is to receive data and the terminal subaddress field (bits 5-9) in the control word is set at 16 hexadecimal.

Data word one contains the number of sub-pages and the first sub-page for remote terminals 53 utilizing paging or sub-paging. This word may also be used for internal register control. The fields of data word one represent the values to be used in the next header, memory data load or verify (up to 4096 messages), trailer transaction. For the first header, memory data load or verify (up to 4096 messages), trailer transaction the information will be transmitted prior to the memory data transaction via a header message, trailer message transaction in which the TM (transfer mode) field in data word one of the header is 00.

The sub-page/register count (bits 8–15) field in data word one may be used in lieu of or in conjunction with the page number field in data word four of the header message and is individual user definable. Unused bits equal zero. In the preferred embodiment of the present invention the sub-page field in data word one of the trailer message is used in conjunction with the data word four of the header message of FIG. 9E.

For purpose of illustrating the use of the sub-page field in the trailer message the following example is provided. In order to load 256K of memory into a remote terminal 53 with bank switching, 64K of address capability and a page size definition of 2048 words, the following approach may be used. To load 256K with sub-pages 2048 words long requires 128 header, memory data, memory data, trailer transactions (256K/2048=128). The 128 transactions consist of 32 transactions for each of the four banks of switching in remote terminal 53. Thus, for each 32 transactions the header message, data word four page number, FIG. 9E, equals the bank number which would be incremented from zero to three. Within each group of 32 transactions the sub-page count would increment every transaction from zero to thirty one. For each transaction (assuming HT=01 for buffer transfer count equals the number of messages) the header data one buffer transfer count would be 64 (2048 words/32 words per message).

The first sub-page/register (bits 0–7) field may be used in lieu of or in conjunction with the page number field in data word four of the header message and may be defined by the user. Unused bits equal zero. Examples of use of this field are: specifying a processor register into which the page number field in data word four of the header message is to be loaded or specifying the initial sub-page count in the example set forth above to one so as to not reprogram the first 2048 memory locations (the first group of transactions would only be 31 transactions long (1 to 31) and the sub-page count for the first transaction would be set to one to indicate a starting address of 2048).

The data word two checksum (bits 0–15) is the checksum of an entire transaction, i.e., header, memory data, memory data, trailer transaction (when TM in header data word one is not equal to zero) or header, trailer transaction (when TM in header data one is equal to zero). The checksum is derived by a two's complement sixteen bit addition of every data word in the transaction (i.e., header, memory data, and trailer data words) with the exception of the checksum data word which is data word two of the trailer message. The two's complement sixteen bit addition is binary addition with the carry discarded, that is there is no end around carry (e.g., FFFF (hexadecimal)+1=0).

The remote terminal 53 being reprogrammed is responsible for comparing the checksum received from interface/rapid reprogramming terminal 20 with the data words for both load and verify functions. The checksum value in data word two of the trailer message is the checksum that should be computed by the remote terminal 53. If the value computed does not match the value received from processor 21 for either a load or verify operation, an error is declared and a reprogram status message is requested by the remote terminal 53 being reprogrammed.

Referring to FIG. 9I, the activity message illustrated prior to the reprogram status message indicates that remote terminal 53 wants to provide to interface/rapid reprogramming terminal 20 a reprogram status message (bits 5–9 of the data word of the activity message).

During a reprogramming operation the remote terminal 53 being reprogrammed may halt the operation and notify interface/rapid reprogramming terminal 20 of an error by setting the busy bit (bit 3) in the status response word or the busy bit (bit 15) in the Activity Message data word. When interface/rapid reprogramming terminal 20 receives the busy bit from remote terminal 53, it will continue to transmit activity messages until the busy bit is cleared. The service request by remote terminal 53 to transmit a reprogram status message will be honored after the first activity message response with the busy bit cleared. By this means remote terminal 53 can notify interface/rapid reprogramming terminal 20 of the error.

The transmit/receive bit (bit 10) of the command word of the reprogram status message is set at a logic one since remote terminal 53 is to transmit and the subaddress (bits 5–9 of the command word) for this message is 17 hexadecimal.

The status flag (bit 15) of data word one is set to a logic one to indicate that the remainder of the data word should be processed by interface/rapid reprogramming terminal 20, that is the reprogram status message contains valid data. If this bit is set to a logic zero, the reprogram status message will be ignored by interface/rapid reprogramming terminal 20.

The status indicator (bit 14) defines the meaning of the remainder of the data word, that is an error code or a status code to be displayed by interface/rapid reprogramming terminal 20.

When the status indicator equals zero this indicates that an error has occurred and the error code will be processed by interface/rapid reprogramming terminal 20.

When the status indicator equals one this indicates that no error has occurred and the status code in bits 13–0 are to be displayed on liquid crystal display 57 as 4 hexadecimal characters (bits 15 and 14 of the display value are 0). With the status indicator equal to one the values of bits 13–0 will be used to indicate status or progress through the load or verify operation.

When SF equals one and SI equals one the status code bits 0–13 are display characters. When SF equals one and SI equals zero bits 0–13 represent error codes and the desired interface/rapid reprogramming terminal 20 action. The error codes are 0001 (hexadecimal) which is an abort; 0002 (hexadecimal) which is a restart; 0003 (hexadecimal) which is a retry and 0004 (hexadecimal) which is a automatic retry.

The abort error code indicates to interface/rapid reprogramming terminal 20 that the load operation or verify operation has been aborted and should not be retried. Interface/rapid reprogramming terminal 20 will display the error code and wait for an operator response. On receiving the response from the operator, interface/rapid reprogramming terminal 20 will abort the load of the remote terminal 53 being reprogrammed and continue with the load of the next remote terminal or bus controller to be reprogrammed if there is a requirement to reprogram another remote terminal or bus controller.

The restart status code indicates that an unrecoverable error has occurred in loading a remote terminal 53 and a reload of remote terminal 53 is desired. Interface/rapid reprogramming terminal 20 will display the error code and wait for an operator response. On receiving the response from the operator, interface/rapid reprogramming terminal 20 will restart the load of the remote terminal 53 being reprogrammed.

The retry status code indicates that an error has occurred in the last message sequence transaction and a repeat of the sequence is desired. Interface/rapid reprogramming terminal 20 will display the error code and wait for an operator response. On receiving the response from the operator, interface/rapid reprogramming terminal 20 will repeat the last transaction.

The automatic retry status code indicates that an error has occurred in the last message sequence transaction. After three consecutive retries, interface/rapid reprogramming terminal 20 will display the error code and wait for an operator response. However, if the retry is successful before reception of the third consecutive error, an error message will not be displayed and operation will continue as normal. On receiving the response from the operator, interface/rapid reprogramming terminal 20 will abort the load of the remote terminal 53 being reprogrammed and continue with the load of the next remote terminal or bus controller to be reprogrammed.

Referring to FIG. 9J, the activity message shown prior to the RRT error message is present only when interface/rapid reprogramming terminal 20 is required to check the busy bit status of remote terminals 53 that do not use the busy bit in the status response word.

The PRT error message is utilized to inform the remote terminal 53 being reprogrammed that interface/rapid reprogramming terminal 20 has detected an error in the load or verify. Data word one, bit 2 is an abort which is set to a logic one by interface/rapid reprogramming terminal 20 to notify the remote terminal 53 that the load or verify has been aborted and no further retries will be made.

Bit 1 is a complete restart which is set to a logic one by interface/rapid reprogramming terminal 20 to notify the remote terminal 53 that an unrecoverable error has occurred and all memory data load or memory data verify transactions will be restarted. Bit 0 is the transaction bit which is set to a logic one by interface/rapid reprogramming terminal 20 to notify the remote terminal 53 that there was an error detected in the last header, memory data, trailer or header, trailer transaction and that the transaction will be repeated. The remaining bits (bits 3-15) of the data word are a logic zero.

Figure 10:
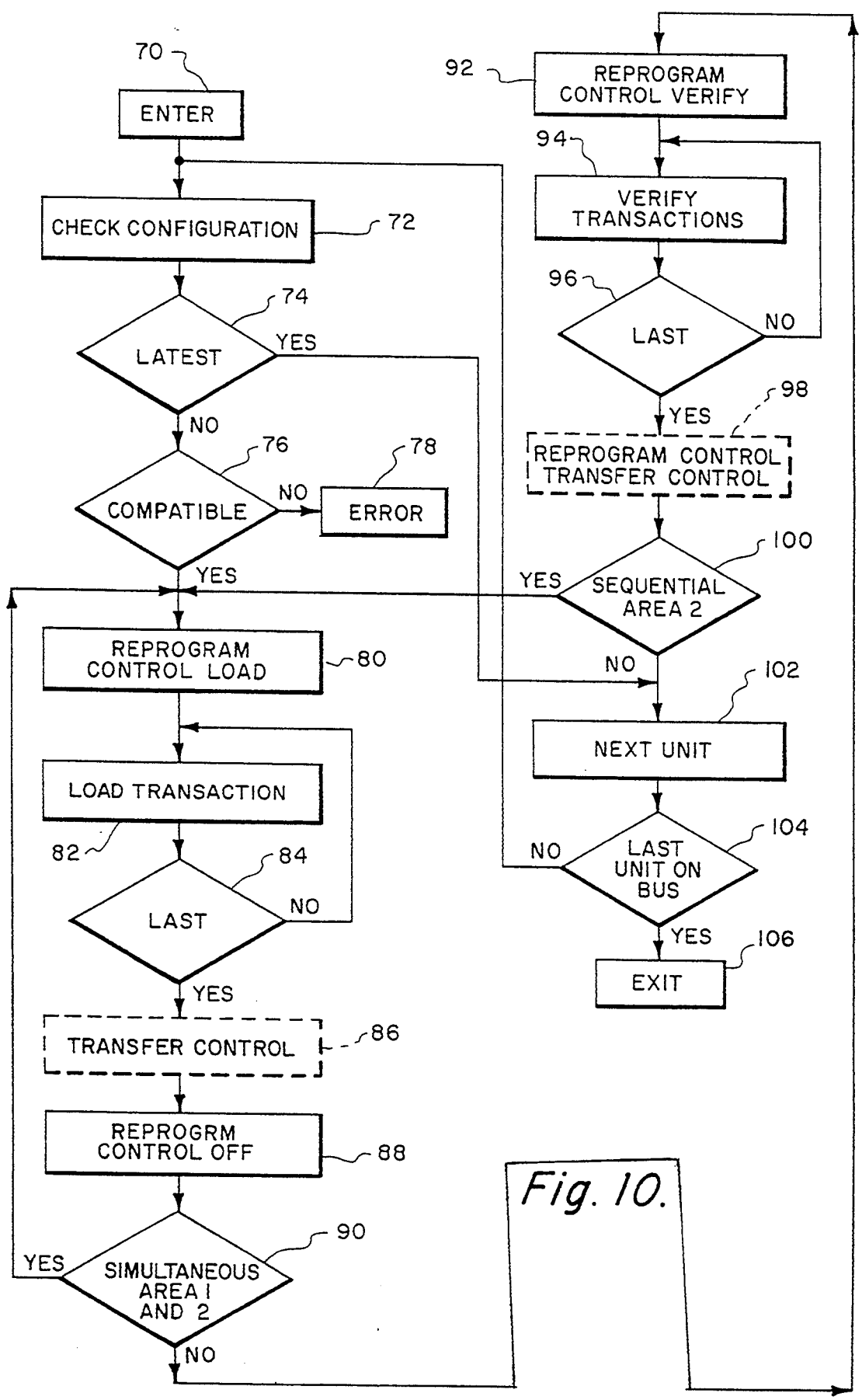
FIG. 10 is a flow chart illustrating the PROTOB.C module of the multipurpose interface software.

Referring now to FIG. 10, the operation of interface/rapid reprogramming terminal 20 when reprogramming a remote terminal 53 or a bus controller which reverts to a remote terminal during reprogramming will now be discussed.

When the lookup table indicates that the remote terminal 53 supports memory configuration as identified by the remote terminal's software, interface/rapid reprogramming terminal 20 request a memory configuration message, FIG. 9(C), from the remote terminal 53 being programmed. The memory configuration message describes the current memory contents for one or two memory areas of the remote terminal 53 being reprogrammed. Interface/rapid reprogramming terminal 20 compares the received memory configuration to the current memory configuration for the remote terminal 53 stored in IC memory card 22 (program step 72).

In automatic mode, if the remote terminal 53 already contains the current memory configuration, interface/rapid reprogramming terminal 20 continues on to the next remote terminal 53 to be processed (program step 102). If the memory configuration message is not usable, interface/rapid reprogramming terminal 20 will assume that the remote terminal 53 requires reprogramming. In manual mode, interface/rapid reprogramming terminal 20 will display the memory configuration data and contiue reprogramming for the selected remote terminal 53.

If the remote terminal 53 requires reprogramming of either or both memory areas, interface/rapid reprogramming terminal 20 checks the old and new memory configurations to determine if the information in the IC memory card 22 is compatible with updating the old memory (program step 76) and will use a patch file if it exists. If a patch file does not exist or is not usable, rapid reprogramming terminal 20 checks to see if a complete file exists and checks to determine if this file will result in a newer revision level for the memory configuration. If the configuration message is not usable, no patch file should exist and interface/rapid reprogramming terminal 20 uses the complete file for reprogramming the remote terminal 53. Interface/rapid reprogramming terminal 20 will declare an error if the IC memory card 22 information is insufficient (program step 78). If the IC memory card 22 information is correct for reprogramming, interface/rapid reprogramming terminal 20 sends a reprogram control message, FIG. 9D, to enable the reprogramming function for either or both memory areas and depending upon remote terminal requirements memory areas one and two will be enabled simultaneously or sequentially (program step 80). The remote terminal 53 will next check the validity of the message utilizing internally stored information and the reprogram enable discretes if required.

Once the reprogramming mode is entered (program step 82 and 84), interface/rapid reprogramming terminal 20 proceeds to load the new memory contents in blocks of varying size depending on the remote terminal 53 and update requirements. There will be no specific erasure commands from interface/rapid reprogramming terminal 20. The remote terminal 53 being reprogrammed is responsible for erasure based on the directed write information. The reprogramming of a remote terminal 53 is conducted by a series of one or more header message (FIG. 9E), memory data load message (FIG. 9F), trailer message (FIG. 9H) transactions. If required, a header message, trailer message transaction will also be provided for paging or transfer of control functions. If the remote terminal 53 being reprogrammed is required to keep track of how many times a particular memory area has been reprogrammed, the remote terminal 53 being reprogrammed shall declare an abort error (bits 0-13 of the data word of the reprogram status message of FIG. 9I) if the predetermined memory write capability of the remote terminal 53 has been exceeded. The storage of this information within the remote terminal's memory shall not affect the validity of a memory verify procedure that is the remote terminal 53 being reprogrammed shall mask out this information during a verify operation.

After completion of the load (program step 84), interface/rapid reprogramming terminal 20 will, if required, then provide transfer of control information to the remote terminal 53 using a header message, trailer message transaction (program step 86). Transfer of control prior to a verify via the control code bits (bits 0-7) of the data word four of FIG. 9D is not permitted. The transfer of control prior to a verify is not used to transfer control to a memory area of remote terminal 53 that has been loaded but not verified. If it is necessary to transfer control prior to the completion of a memory area load/verify, the two parts of the memory area are loaded/verified separately using the same technique as for sequentially loading memory areas 1 and 2. The transfer of control via the header message of FIG. 9E may be inhibited during the load.

After all required data for a particular memory area have been transferred interface/rapid reprogramming terminal 20 will, via bit 4 or 5 of data word four of FIG. 9D disable the reprogramming function for that memory area.

When simultaneous reprogramming of memory areas one and two of a remote terminal 53 is utilized (program step 90), rapid reprogramming terminal loads the second memory area prior to the verify operation. When sequential memory area reprogramming or single memory area reprogramming is utilized, interface/rapid reprogramming terminal 20 will at this time verify (program steps 92-96) the previously loaded memory area one load prior to the memory area two load operation. Interface/rapid reprogramming terminal 20 performs the memory verify utilizing the same message transactions that are used for the memory load except that the interface/rapid reprogramming terminal 20 receives the data from the remote terminal 53 being reprogrammed and compares the received data with memory configuration data stored in IC memory card 22. The automatic verify after a load may be inhibited.

After completion of the verify (program step 96) rapid reprogramming terminal 20 will, if required, provide transfer of control information to the remote terminal 53 (program step 98) using either a header message, trailer message transaction or via the control code bits (bits 0-7) of the data word four of FIG. 9D. When sequential reprogramming of memory areas one and two is utilized, interface/rapid reprogramming terminal 20 repeats the load/verify operations (program step 100) for the second memory area after reprogramming of the first memory area is complete.

Assuming there were no errors in reprogramming, interface/rapid reprogramming terminal 20 will continue (program step 102) and reprogram the next remote terminal 53 on the 1553 multiplex data bus 42. If an error did occur, operator intervention is requested by a fault display.

There is an individual memory file describing the operation of interface/rapid reprogramming terminal 20 and containing the necessary data to reprogram each remote terminal 53 and each bus controller 55 on the 1553 multiplex data bus 42. The memory file contains a lookup table and reprogramming data for each remote terminal 53 and bus controller 55. A memory file is wholly contained in IC memory card 22.

The lookup table contains the digital information necessary for interface/rapid reprogramming terminal 20 to communicate with the remote terminal 53 or bus controller 55 being reprogrammed. Unless otherwise specified all bits set to a logic one are active (i.e., RRT output is to be active) and all bits set to a logic zero are inactive (i.e., RRT output is to be inactive).

Referring to FIGS. 3 and 4, the specific bus connection for interface/rapid reprogramming terminal 20 is a function of the type of aircraft on board avionics or electronic warfare equipment being reprogrammed. When interface/rapid reprogramming terminal 20 selects a bus for connection terminal 20 will, based on aircraft type and configuration, selected the type of multiplex bus connection to be utilized.

Referring now to the RRT program section MEMCARD.H MODULE as well as FIGS. 3 and 4, the first three bits (bits 2-0) of the first thirty two bit word (defined as Aircraft Bus Specification in MEMCARD.H MODULE of the RRT program) in the lookup table describe the aircraft multiplex bus to which interface/rapid reprogramming terminal 20 will couple. When bits 2-0 are respectively 0,0,1, rapid reprogramming terminal 20 couples to primary Avionics Bus Number One; 0,1,0 couples interface/rapid reprogramming terminal 20 to primary Avionics Bus Number Two; 0,1,1 couples rapid reprogramming terminal 20 to primary Avionics Bus Number Three; 1,0,0 couples interface/rapid reprogramming terminal 20 to primary Avionics Bus Number Four and 1,0,1 couples interface/rapid reprogramming terminal 20 to the Electronic Warfare Bus.

Bits 4,3 of the first word in the lookup table are the secondary bus identifiers with 0,0 coupling interface/rapid reprogramming terminal 20 to secondary Avionics Bus Number One; 0,1 coupling interface/rapid reprogramming terminal 20 to secondary Avionics Bus Number Two; 1,0 coupling rapid reprogramming terminal 20 to secondary Avionics Bus Number Three and 1,1 coupling interface/rapid reprogramming terminal 20 to secondary Avionics Bus Number Four.

Bit 5 of the first word indicates whether the secondary avionics buses aboard the aircraft are usable with a logic one indicating that the buses are usable.

When bit 6 of the first word is a logic zero the aircraft uses a coupling transformer 60, FIG. 4B, between the aircraft buses and rapid reprogramming terminal interface connectors. A logic one indicates that the aircraft uses direct coupling as is illustrated in FIG. 4. Data bit 7 of the first word is reserved for the center tap on data bus isolation transformer 40 with zero being an open center tap and one being a grounded center tap.

The first four bits (bits 3-0) of the second thirty two bit word (discrete one in MEMCARD.H MODULE of RRT program) in the lookup table set the PWR_OFF/ON_1 through PWR_OFF/ON_4 outputs of interface 54. Bit zero set at a logic one turns off the AYK-14 computer bus controller connected to avionics bus one, bit one set at a logic one turns off the AYK-14 computer bus controller connected to avionics bus two, bit two set at a logic one turns off the AYK-14 computer bus controller connected to avionics bus three and bit three set at a logic one turns off the AYK-14 computer bus controller connected to avionics bus four.

Bit four of the second word is used for enabling the external processor of the AN/ALQ-165 radar jammer on board the F/A-18C/D fighter aircraft. The AN/ALQ-165 radar jammer is an electronic warfare bus controller which may be reprogrammed either in the aircraft or when removed from the aircraft. When the AN/ALQ-165 is removed from the aircraft, the power on time for example is generally limited to less than one minute for a load/verify of 32K data words of user data memory, since the aircraft's air conditioning system is not available to cool the AN/ALQ-165. The lookup table provides for reprogramming of the AN/ALQ-165 when removed from the aircraft by allowing for a maximum on time of between ten seconds and thirty minutes for the AN/ALQ-165, although it is desirable to allow the AN/ALQ-165 to be enabled for not more than two minutes.

Bit five is used for turning off the Maintenance Signal Data Recording Set on board the F/A-18 aircraft; bit six is used for turning off the radar data processor currently being utilized with only the F/A-18 fighter aircraft and bit seven is used for turning off the stores management system aboard the aircraft. These bits when set at a logic one state allow other remote terminals 53 or bus controllers 55 aboard the aircraft to be reprogrammed since the Maintenance Signal Data Recording Set, the radar data processor and/or the stores management system will no longer be communicating with the remote terminal 53 or the bus controller 55 being reprogrammed.

The first four bits (bits 3–0) of the third thirty two bit word (discrete two in the MEMCARD.H MODULE) in the lookup table set the IPL_1 through IPL_4 outputs of interface 54 for reprogramming the AYK-14 computers. When bit zero of the third word is a logic one the AYK-14 computer on avionics bus one is to be reprogrammed; when bit one of the third word is a logic one the AYK-14 computer on avionics bus two is to be reprogrammed; when bit two of the third word is a logic one the AYK-14 computer on avionics bus three is to be reprogrammed; and when bit three of the third word is a logic one the AYK-14 computer on avionics bus four is to be reprogrammed. To reprogram any of the AYK-14 computers aboard an aircraft it is first required to turn off the power to the AYK-14 to be reprogrammed and then activate the initiate program load output of interface 54 to the AYK-14 of the computer to be reprogrammed before turning on the power to the AYK-14 computer to be reprogrammed. The AYK-14 will sense the initiate program load output is active which initiates the reprogramming of the AYK-14. A failure in the reprogramming of the AYK-14 results in a logic one at the initiate program load input of interface 54 connected to the AYK-14 being reprogrammed.

Bits four and five of the third word are respectively used for enabling the first and second memory areas of the remote terminals 53 within the aircraft avionics system; bit six is used for enabling the user data memories of all remote terminals 53 communicating on the electronic warfare multiplex bus and bit seven is used for enabling the operating software memories in remote terminals 53 connected to the electronic warfare multiplex bus.

The first four bits (bits 3–0) of the fourth word (AYK-14 Discrete Bus Correlation)) in the look up table determine which of the AYK-14 will be reprogrammed. When bit zero is a logic one the AYK-14 computer on avionics bus number one is to be reprogrammed; when bit one is a logic one the AYK-14 computer on avionics bus number two is to be reprogrammed; when bit two is a logic one the AYK-14 computer on avionics bus number three is to be reprogrammed and when bit three is a logic one the AYK-14 computer on avionics bus number four is to be reprogrammed.

The first three bits (bits 2–0) of the fifth word (RRT Operational Status) in the look up table determine the operational status of interface/rapid reprogramming terminal 20. When bits 2–0 are respectively 0,0,1 interface/rapid reprogramming terminal 20 operates as a remote terminal 53, the bus controller 55 converts to a remote terminal 53 and inerface/rapid reprogramming terminal 20 converts to the bus control 55. When bits 2–0 are respectively 0,1,0 rapid reprogramming terminal 20 operates as the bus controller 55. When bits 2–0 are respectively 0,1,1 interface/rapid reprogramming terminal 20 operates as a remote terminal 53. When bits 2–0 are respectively 1,0,0 interface/rapid reprogramming terminal 20 operates as a remote terminal 53, the bus controller 55 is quieted and interface/rapid reprogramming terminal 20 converts to the bus control 55. Bits 6–3 are unused and bit 7 indicates that the AYK-14 computer is the normal bus controller 55.

Bits 4–0 of the sixth word (Remote Terminal Address) provide the address of the remote terminal being reprogrammed.

Bits 3–0 of the seventh word (Operational Mode) describe the operational mode of interface/rapid reprogramming terminal. For example, when bits 3–0 are respectively 0,0,0,1 interface/rapid reprogramming terminal 20 is in an operational mode by which interface/rapid reprogramming terminal 20 is reprogramming a remote terminal 53 or a bus controller 55 which when being reprogrammed functions as a remote terminal 53. Likewise, when bits 3–0 are respectively 0,0,1,0 interface/rapid reprogramming terminal 20 is in an operational mode by which interface/rapid reprogramming terminal 20 is reprogramming a bus controller 55 such as the AN/ALR-67 Radar Warning Receiver which does not convert to a remote terminal.

When bits 3–0 of the seventh word in the lookup table are respectively 0,0,1,1 interface/rapid reprogramming terminal 20 may reprogram an AYK-14 computer having a serial interface module type B acting as a remote terminal; when bits 3–0 are respectively 0,1,0,0 interface/rapid reprogramming terminal 20 may reprogram an AYK-14 computer having a serial interface module type B acting as a bus controller; when bits 3–0 are respectively 0,1,1,0 interface/rapid reprogramming terminal 20 may reprogram an AYK-14 computer having a serial interface module type A and when bits 3–0 are respectively 0,1,1,1 rapid reprogramming terminal 20 may reprogram the High Speed Anti-Radiation Missile (HARM) Command Launch Computer. Likewise, when bits 3–0 are respectively 1,0,0,0 interface/rapid reprogramming terminal 20 may reprogram the AYQ-9 and AYQ-15 Stores Management Systems' core memory; when bits 3–0 are respectively 1,0,0,1 interface/rapid reprogramming terminal 20 may reprogram the AYQ-9 and AYQ-15 Stores Management Systems' EEPROM memory and when bits 3–0 are respectively 1,0,1,0 interface/rapid reprogramming terminal 20 may reprogram the CP-1726/ASQ-194 Signal Data Computer.

The first eight bits (bits 7–0) of the eighth word (Additional delay between Activity Messages) in the look up table provide for a delay of between 0 and 255 milliseconds between activity messages.

The first bit (bit 0) of the ninth word (Busy Bit Usage) in the lookup table determines whether the busy bit in the status word, FIG. 9A, provided by the remote terminal 53 is usable with a logic one indicating that the busy bit is usable. If the busy bit in the status word is usable then interface/rapid reprogramming terminal 20 will monitor the status word provided by remote terminal 53 to determine whether remote terminal 53 can receive data from interface/rapid reprogramming terminal 20. If the busy bit in the status word is not usable interface/rapid reprogramming terminal 20 will issue activity messages, FIG. 9A to the remote terminal 53 to determine the busy status of the remote terminal 53, that is whether or not the remote terminal 53 can receive data from interface/rapid reprogramming terminal 20. The seventh bit (bit 6) provides for a pause after interface/rapid reprogramming terminal 20 sends a command word to the remote terminal 53. The eighth bit (bit 7) when at the logic zero state causes interface/rapid reprogramming terminal 20 when functioning as a bus controller to repeat the last message whenever remote terminal 53 is busy.

Bits 7-0 of the tenth and eleventh words (Automatic Busy Retry Count Before Error) in the lookup table provide respectively for the least significant byte and the most significant byte of the automatic mode retry count which is the number of times (between 0 and 65,535) interface/rapid reprogramming terminal 20 can send activity messages to the remote terminal 53 being reprogrammed before interface/rapid reprogramming terminal 20 declares an error. The sixteen bit value of the tenth and eleventh words is the total count of busy bits that may occur during a message transaction.

Bits 7-0 of the twelfth and thirteenth words (Manual Busy Retry Count Before Error) in the lookup table provide respectively for the least significant byte and the most significant byte of the manual mode retry count which is the number of times (between 0 and 65,535) interface/rapid reprogramming terminal 20 can send activity messages to the remote terminal 53 being reprogrammed before interface/rapid reprogramming terminal 20 declares an error. The sixteen bit value of the twelfth and thirteenth words is the total count of busy bits that may occur during a message transaction.

It should be noted that the busy count for the manual retry mode is typically 3 and the busy count for the automatic retry mode is typically 256. It should also be noted that the MEMCARD.H MODULE includes a definitions section which pertains to the contents of IC memory card 22. This definition section of MEMCARD.H MODULE has a thirty two bit word (unsigned loading card) which determines whether an automatic load to a remote terminal 53 or bus controller is permitted. Specifically, if bit 1 of this word is at the logic one state an automatic load is permitted. In addition, bit 0 of this thirty two bit word when at the logic zero state indicates that a data load to IC memory card 22 is complete and when at the logic one state indicates that a data load has been interrupted; bit 2 prevents a download to IC memory card 22; bit 3 prevents a download to external computer 66; bit 4 prevents an upload to IC memory card 22 and bit 7 determines whether the information in IC memory card 22 has been tested, verified and is releasable.

Bits 7-0 of the fourteenth, fifteenth, sixteenth, seventeenth, eighteenth and nineteenth words (Nomenclature of RT) in the lookup table provide for the WRA nomenclature (e.g., RT-1079) of the remote terminal 53 being reprogrammed.

Bits 7-0 of the twentieth and twenty first words (Memory Configuration Word 1) in the lookup table represents the configuration of the data stored in memory area one of the remote terminal 53 being reprogrammed. Similarly, bits 7-0 of the twenty second and twenty third words (Memory Configuration Word 2) in the lookup table represents the configuration of the data stored in memory area two of the remote terminal 53 being reprogrammed. The twentieth, twenty first, twenty second and twenty third words in the lookup table contain the memory configuration message, FIG. 9C, data word one and data word two comparison information and are only used for remote terminals 53 and bus controllers 55 that allow the memory configuration message of FIG. 9C. At this time, it should that the user data memory in electronic warfare devices is equivalent to memory area one and operating software memory in electronic warfare devices is equivalent to memory area two.

Bits 1-0 of the twenty fourth word (Memory Configuration Message Implementation) in the lookup table represent a code which when zero indicates that the memory configuration message of FIG. 9C will not be utilized. When bits 1-0 are one only memory area one is verified; when bits 1-0 are two only memory area two is verified and when bits 1-0 are three both memory areas one and two are verified. When bit 7 of the twenty fourth word is a logic zero the memory configuration message of FIG. 9C is not utilized.

Bits 7-2 of the twenty fifth word (Memory Area 1 REPROGRAM CONTROL Message Data Word 4) in the lookup table provide the fill data bits (bits 15-10 of data word four) of the load/verify message of FIG. 9D with respect to memory area one.

Bit 0 of the twenty sixth word (Memory Area 1 Control Transfer) in the lookup table allows for the transfer of data from a temporary storage register within the remote terminal 53 being reprogrammed to memory area one within the remote terminal 53 once the data is verified as being loaded correctly. Bits 5-4 of the twenty sixth word provide a code which indicates whether either memory area one or memory area two or both memory areas are to be disabled, while bits 7-6 provide a code which indicates whether either memory area one or memory area two or both memory areas are to be enabled. It should be understood that bits 7-6 and 5-4 are software controlled enables and disables which are provided by the load/verify message of FIG. 9D.

The twenty seventh word (Memory Area 2 REPROGRAM CONTROL Message Data Word 4) in the lookup table functions in the same manner as the twenty sixth word with respect to memory area two, while the twenty eighth word (Memory Area 2 Control Transfer) in the lookup table functions in the same manner as the twenty sixth word with respect to memory area two.

Bits 1-0 of the twenty ninth word (Sequential or Simultaneous File Type) in the lookup table represent a code which indicates whether a single memory area is to be loaded or whether memory areas one and two are to be loaded in sequence or simultaneously. When bit 2 of the twenty eighth word is zero a verify is not permitted. When bit 3 of the twenty eighth word is a logic one a verify operation may be performed without a data load. Bits 7-4 provide for the aircraft configuration.

Bits 4-0 of the thirtieth word (RT address of BC that can convert to RT) in the lookup table provide the remote terminal address for a bus controller 55 which can convert to a remote terminal when being reprogrammed.

Bits 4-0 of the thirty first word (RT address of RRT) in the lookup table provide the address for interface/rapid reprogramming terminal 20 when terminal 20 converts to a bus controller 55.

The thirty second through thirty seventh word (Nomenclature of unit when RRT is an RT) in the lookup table provide for the WRA nomenclature (six ASCII characters) for interface/rapid reprogramming terminal 20 when terminal 20 is a remote terminal 53 during reprogramming of a bus controller 55.

The thirty eighth word (Fill Field of REPROGRAM CONTROL Message when RRT is an RT) in the lookup table provide the fill data for the message of FIG. 11D.

The messages of Table II utilized by interface/rapid reprogramming terminal 20 to communicate with a bus controller 55 being reprogrammed via the 1553 multiplex data bus 42 will now be discussed. It should be understood that the messages used by interface/rapid reprogramming terminal 20 to communicate with any bus controller 55 aboard the aircraft via the 1553 data bus are required to follow the message formats set forth in FIGS. 7 and 11.

The Activity Message of FIG. 11A is utilized by bus controller 55 when being reprogrammed to determine whether interface/rapid reprogramming terminal 20 (which is operating as a remote terminal) is ready to receive data and allows interface/rapid reprogramming terminal 20 a request to send information to bus controller 55 or receive information from bus controller 55. The Activity Message of FIG. 11A allows interface/rapid reprogramming terminal 20 to control the loading sequence when functioning as a remote terminal. The bus controller 55 commands this message at a periodic rate until a Header Message, FIG. 11E, Memory Data Message, FIG. 11F, Trailer Message, FIG. 11H transaction is begun. After receipt of a Header Message requiring data transfer (TM is not equal to zero), the bus controller 55 may utilize the Activity Message to control the transfer of Memory Data Messages or the bus controller 55 may utilize the Header Message information to internally control the number of Header Data Messages so long as the busy bit (bit 3) in the interface/rapid reprogramming terminal Status Response Word, FIG. 11B, is checked by the bus controller 55. The bus controller 55 may also control the load or the verify (all the Header Message, Memory Data Message, Trailer Message transactions) without the use of the Activity Message by monitoring the TC bits (bits 0-1 of data word four) in the Header Message.

Referring to FIG. 11A the Command Word for the Activity Message follows the format set forth in FIG. 7. Bits 11-15 provide the address for interface/rapid reprogramming terminal 20, bit 10 is set at a logic one, the subaddress (bits 5-9) is set at 07 hexadecimal and the word count (bits 0-5) is one.

The status word response to the Activity Message as well as the other messages of Table II follows the general format set forth in FIG. 7 supplemented by FIG. 11B. A Status Response Word to any of the messages set forth in Table II is provided by a interface/rapid reprogramming terminal 20 for each message transaction. The status response word follows data on a interface/rapid reprogramming terminal receive type transaction and precedes the data on a rapid reprogramming terminal transmit type transaction. The bus controller 55 allows a response time gap of approximately 6.5 usec. from the end of the last transmitted command word (transmit type message) or the end of the last transmitted data word (receive type message), to the start of the rapid reprogramming terminal status response word before declaring a no response error. Interface/rapid reprogramming terminal 20 begins the status response word within a time period of approximately 2-5 usec. from the receipt of the end of the last command word (transmit type message) or the receipt of the end of the last data word (receive type message). The bus controller 55 ensures that the time from the end of the rapid reprogramming terminal transmission of the last data word (transmit type message) or the end of the last status response word (receive type message) to the beginning of the next command word is at least 2 usec.

Referring to FIG. 11B, the status response word bits for each of the messages of Table II comprise a terminal address (bits 11-15) which is remote terminal address of the terminal 20 (referred to as ZZZZZ); a message error bit (bit 10) which is not used; a service request bit (bit 8) and a busy bit (bit 3).

The service request bit (bit 8) is set to one by interface/rapid reprogramming terminal 20 in response to an activity message from the bus controller 55, otherwise this bit is zero.

The busy bit (bit 3) may be utilized by rapid reprogramming terminal 20 for the status response word for any command word from the bus controller 55. The setting of this bit to a logic one means that a message previously received by rapid reprogramming terminal 20 or internal rapid reprogramming terminal 20 requirements necessitates suspension or slow down of communications with the bus controller 55. If interface/rapid reprogramming terminal 20 sets the busy bit in the status response word, it may suppress transmission of the data words associated with each message. All additional message traffic other than the activity message is suspended until the busy bit is cleared (logic 0). While the bus controller 55 is waiting for the busy bit to clear, the activity message is sent every 10 to 100 milliseconds. As long as the busy bit is clear the bus controller 55 assumes that interface/rapid reprogramming terminal 20 can support a continuous stream of identical messages within a 2 msec. time period from the end of one message to the start of the next command word. The continuous stream of identical messages is assumed to be either memory data load or memory data verify messages.

This continuous stream is maintained for a time period compatible with IC Memory Card 22 and internal memory capabilities of interface/rapid reprogramming terminal 20. Interface/rapid reprogramming terminal 20 utilizes the busy bit to suspend the continuous stream when required. As a minimum interface/rapid reprogramming terminal 20 provides 2K data words in memory data load or memory data verify messages per second. Any data word transmitted after a status word with the busy bit set is ignored by rapid reprogramming terminal 20. The bus controller 55 ensures that the message for which interface/rapid reprogramming terminal 20 initially replied with the busy bit set in the status response word will be transferred once the busy bit is cleared.

The Terminal Flag bit (bit 0) is set to a logic one by rapid reprogramming terminal if bit 10, 8 or 3 is set to one. Bits 9, 7, 6, 5, 4, 2 and 1 will always be zero in the status response word provided by interface/rapid reprogramming terminal 20.

Referring again to FIG. 11A, the address (bits 11-15) for the status word response to the activity message is the address of interface/rapid reprogramming terminal 20 when reprogramming a bus controller 55. The interface/rapid reprogramming terminal address is the address assigned to each individual aircraft on the particular bus selected by the rapid reprogramming terminal switching network.

The status word response to the activity message includes the service request bit (bit 8) which interface/rapid reprogramming terminal 20 sets to a logic one whenever the contents of bits 0 through 10 of the data word are other than zero. The bus controller 55 may utilize the service request bit to determine if it is necessary to examine bits 0 through 10 of the data word that follows. Since the contents of bits 0 through 10 of the data word control the state of the service request bit, it is not necessary for the bus controller 55 to process the service request bit.

The busy bit (bit 3) in the status response word when at the logic one state indicates that interface/rapid reprogramming terminal 20 is not ready to process any message from the bus controller 55 other than the activity message. Prior to transmission of any other messages to interface/rapid reprogramming terminal 20, the bus controller 55 will continue to send activity messages to interface/rapid reprogramming terminal 20 every 10 to 100 milliseconds until the busy bit is cleared. The busy bit and the service request bit are not set simultaneously by interface/rapid reprogramming terminal 20.

The data word in the activity message is transmitted by interface/rapid reprogramming terminal 20 even when the busy bit (bit 3) is set in the status response word. The busy bit (bit 15) in the data word in the activity message is used to completely implement the busy response.

Bits 0-10 are utilized to allow interface/rapid reprogramming terminal 20 to request that the bus controller 55 being reprogrammed send a specific message to interface/rapid reprogramming terminal 20. As a result of this request by rapid reprogramming terminal 20 the bus controller 55 will transmit a command word with the address of interface/rapid reprogramming terminal 20 in bits 11-15 of the command word. The transmit/receive bit (bit 10 of the data word) is set to one when interface/rapid reprogramming terminal 20 is to transmit a message and is set to zero whenever interface/rapid reprogramming terminal 20 is to receive a message. The subaddress bits (bits 5-9) indicates the subaddress of the message to be provided by bus controller 55 to interface/rapid reprogramming terminal 20, while the word count bits (bits 0-4) indicate the data word count for the message. The remaining bits (bits 11-14) of the data word are zero.

Referring to FIG. 11C, the activity message provided prior to the memory configuration message requests that the bus controller 55 provide to interface/rapid reprogramming terminal 20 the memory configuration message. The memory configuration message is utilized to read the current memory configuration of the bus controller 55 being reprogrammed. This message is only used when its use is indicated in a lookup table for the bus controller 55. The command word and status word for the memory configuration message follow the format of FIG. 7. Each bus controller 55 aboard an aircraft has up to two memories designated memory area one and memory area two. Data bits 0-15 of data word one of the memory configuration message represent the configuration of the data stored in memory area one. Unused data bits equal zero. Similarly, data bits 0-15 of data word two of the memory configuration message represent the configuration of the data stored in memory area two. Unused data bits also equal zero. In the automatic mode of operation this message is used for the purpose of comparing a bus controller's configuration stored in the IC memory card 22 with reported bus controller configuration. If the reported value is the same as the value stored in the IC memory card 22, interface/rapid reprogramming terminal 20 will not perform a load operation. However, if the reported value is different from the value stored in the IC memory card 22, interface/rapid reprogramming terminal 20 will proceed with a load operation.

Referring to FIG. 11D, there is shown the format for the enter load, exit load, enter verify and exit verify messages of Table II. The activity message provided prior to the enter load, exit load, enter verify and exit verify messages requests that the bus controller 55 provide to interface/rapid reprogramming terminal 20 the required enter load, exit load, enter verify or exit verify message.

The transmit/receive bit (bit 10) in the command word for the enter load, exit load, enter verify and exit verify messages is a logic one since interface/rapid reprogramming terminal 20 which is operating as a remote terminal is to transmit data to the bus controller 55 being reprogrammed. The terminal subaddress field (bits 5-9) in the control word is set at 1D hexadecimal. Each message enter load, exit load, enter verify and exit verify requires that an enable signal be provided by interface/rapid reprogramming terminal 20 before a load or verify may be executed. A logic one at the EW_OSM_EN output of interface 54 enables the operating software memory of the electronic warfare system on board the aircraft. Similarly, a logic one at the EW_UDM_EN output of interface 54 enables the user data memory of the electronic warfare system on board the aircraft. When the AV_EN1 output of interface 54 is at a logic one state the first memory areas of the aircraft avionics system are enabled, while a logic one at the AV_EN2 output of interface 54 enables the second memory areas of the aircraft avionics system.

Each field in the data is checked by the remote terminal 53 for compliance with the following prior to execution of a load or verify. The type and number fields are defined based on WRA nomenclature (e.g., CP-1293); however, if this creates a conflict, the system nomenclature (e.g., ALR-67) is utilized instead. The preferred embodiment of the present invention uses WRA nomenclature.

Data word one (bits 0-15) is the type field consisting of the first two eight bit ASCII characters that represent the nomenclature of the bus controller 55 being controlled. For example, for CP-1293 the two characters would be "C", "P".

Data word two (bits 0-15) is a number field consisting of the third and fourth eight bit ASCII characters that represent the nomenclature of the bus controller 55 being controlled. For example, for CP-1293 the two characters would be "1", "2".

Data word three (bits 0-15) is a number field consisting of the last two eight bit ASCII characters that represent the nomenclature of the bus controller 55 being controlled. For example, for CP-1293 the two characters would be "9", "3".

Data word four (bits 10-15) is the fill field which may be any bit pattern including zero and is to be defined by the individual bus controller 55 being controlled. The fill field is required to be checked even if the field is defined as zero. The fill field is contained in a look up table for the bus controller 55 being reprogrammed.

The load/verify bits (bits 8-9) are used to described whether a Load, Verify, or other type transaction will follow. The load/verify bits are coded as follows:

L/V=01 indicates that a memory load follows; L/V=10 indicates that a memory verify follows; L/V=11 is not used and L/V= 00 indicates that a enter load, enter verify, exit load or exit verify message is being sent for some reason other than a load or verify such as to quiet a bus controller.

The control code (bits 0-7) of data word four are set as follows: bit 7 is a reprogram enable for memory area one and is equal to 80 hexadecimal; bit 6 is a reprogram enable for memory area two and is equal to 40 hexadecimal; bit 5 is a reprogram disable for memory area one and is equal to 20 hexadecimal and bit 4 is a reprogram disable for memory area two and is equal to 10 hexadecimal. Bit 3 of the control code is not used by interface/rapid reprogram%ming terminal 20 when reprogramming bus controllers functioning as bus controllers. Bit 2 of the control code which is 02 hexadecimal tells the bus controller 55 to stop transmitting or receiving information on the bus so as to allow the bus controller 55 to be reprogrammed. The use of bit 2 of the control code in this manner is required because some bus controllers can not be converted to a remote terminal when reprogramming a remote terminal 53. Bit 1 of the control word which is 02 hexadecimal is utilized to have a bus controller when converted to a remote terminal revert back to a bus controller. Bit 0 of the control code which is 01 hexadecimal causes the bus controller 55 to begin executing starting at the address previously supplied via data word three or data word four of a header message.

The control code field is valid only if all other fields are correct and only if either the Avionics Reprogram Enable 1 (AV_EN1 output of interface 54); or the EW UDM Reprogram Enable discrete (the EW_UDM_EN output of interface 54) is present or the Avionics Reprogram Enable 2 (AV_EN2 output of interface 54) or the EW OSM Reprogram Enable discrete (EW_OSM_EN output of interface 54) is present. At the end of reprogramming, interface/rapid reprogramming terminal 20 will maintain the active discrete for at least 100 msec after the transmission of a exit load or exit verify message that ends the reprogramming mode.

The following are the only valid control codes that can occur when interface/rapid reprogramming terminal 20 is functioning as a remote terminal during a load or verify. Any other code shall cause the bus controller to not execute a load or verify.

Code 00000000 which is 00 hexadecimal indicates that no load or verify control action is to be taken.

Code 00000001 which is 01 hexadecimal will cause the bus controller 55 to begin execution starting at the address previously supplied via data word three and data word four of the header message.

Code 00000100 which is 04 hexadecimal will cause the bus controller 55 to stop communications on the bus. Once the bus controller 55 stops communications on the bus, communications activity on the bus will remain stopped until the Avionics Reprogram Enable 1/EW UDM Reprogram Enable discrete and the Avionics Reprogram Enable 2/EW OSM Reprogram Enable discrete are inactive.

Code 00001000 which is 08 hexadecimal will cause the bus controller 55 being reprogrammed to revert to a remote terminal. Upon execution of this reprogram control code the message traffic shall be for interface/rapid reprogramming terminal 20 functioning as a bus controller using the messages illustrated in FIG. 11.

Code 00010000 which is 10 hexadecimal will cause the bus controller to exit the reprogramming mode for memory area two. This code shall only be valid if the Avionics Reprogram Enable 2 or EW OSM Reprogram Enable discrete is active.

Code 00100000 which is 20 hexadecimal will cause the bus controller to exit the reprogramming mode for memory area one. This code shall only be valid if the Avionics Reprogram Enable 1 or EW UDM Reprogram Enable discrete is active.

Code 00110000 which is 30 hexadecimal is a combination of 10 hexadecimal and 20 hexadecimal for simultaneous memory areas one and two exit reprogramming mode.

Code 01000000 which is 40 hexadecimal will cause the bus controller 55 to enter the reprogramming mode for memory area two. This code shall only be valid if the Avionics Reprogram Enable 2 or the EW OSM Reprogram Enable discrete is active.

Code 10000000 which is 80 hexadecimal will cause the bus controller 55 to enter the reprogramming mode for memory area one. This code shall only be valid if the Avionics Reprogram Enable 1 or the EW UDM Reprogram Enable discrete is active.

Code 11000000 which is C0 hexadecimal is a combination of 40H and 80H for simultaneous memory areas one and two enter reprogramming mode.

Referring to FIG. 11E there is shown the format for a header message which is used to pass load and verify parameters to the bus controller 55 being reprogrammed. The activity message shown prior to the header message request that the bus controller 55 being reprogrammed command the header message from interface/rapid reprogramming terminal 20. The activity message will not be used by bus controllers 55 which keep track of header, memory data, trailer message sequence, that is the bus controller automatically commands this message sequence without interface/rapid reprogramming terminal 20 requesting each message.

The transmit/receive bit (bit 10) in the command word is at the logic one state since interface/rapid reprogramming terminal 20 which is functioning as a remote terminal is to transmit data and the terminal subaddress field (bits 5–9) is set at 14 hexadecimal. The transfer mode (bits 14–15) are used to describe the memory data load or memory data verify message data word content. The transfer mode bits are binary coded as follows: TM=00; TM =01; TM=10 and TM=11. When TM=00 which is the no transfer mode, the buffer transfer count contained in data word one and the initial load address contained in data word two have no meaning. This mode is used to transfer the program entry address contained in data word three and Page Number contained in data word four or is used as a preamble to the trailer message.

When TM=01, each sixteen bits of data transmitted in a data word will contain only eight bits of information in bits 0–7. When TM=10, each sixteen bits of data transmitted in a data word will contain sixteen bits of information in bits 0–15. When TM=11, the sixteen bits of data transmitted in each odd word (first is odd) contains the sixteen least significant bits of data in bits 0–15 and each even word (second is even) contains the sixteen most significant bits of data in bits 0–15.

The header type bits (bits 12–13) are used to describe the header and have no meaning when the transfer mode is 00. The header type are binary coded as follows: HT=00, HT=01, HT=10 and HT=11. When HT=00, the buffer transfer count equals the number of words to be transferred. When HT=01, the buffer transfer count equals the number of messages to be transferred. HT=10 is undefined, while HT=11 is reserved for internal use by digital signal processor 20 and therefore will not be transmitted on the 1553 multiplex data bus 42 aboard the aircraft.

The buffer transfer count (bits 0-11) is used to indicate the amount of data that will follow the header message. The buffer transfer count has no meaning when the transfer mode is 00. The range of the buffer transfer count is from one to four thousand ninety six words.

When HT=00, the buffer transfer count is the total number of data words that will be transmitted in a transaction which includes the header message and trailer message. The data words are transmitted in 32-word messages since each transfer sequence is limited to thirty two data words (see FIG. 8) with the last message containing from one to thirty two data words. The maximum transfer for HT=00 is four thousand ninety six words using one hundred twenty eight memory data load or memory data verify messages.

When HT=01, the buffer transfer count is the number of memory data load or memory data verify messages that will follow the header message. Thus, the maximum data transfer per header message is 4096×32 data words per memory data load or memory data verify message which equals 131,072 sixteen bit words (128K). If paging (data word four, bits 0-1) is utilized for transfer modes 01 or 10, the maximum value of the buffer transfer count will be 2048 which results in 65,536 sixteen bit data words (64K) for transfer modes 01 and 10.

Data word two is the initial load address (bits 0-15) which is the sixteen or less least significant bits of the point in memory into which data is to be loaded or read. The maximum value (number of bits) used in the initial load address is compatible with the page size of remote terminals using paging. Unused bits equal zero.

Data word three is program entry address (bits 0-15) which has meaning only for transfer mode =00. The program entry address is the sixteen or less least significant bits of the point in memory at which the bus controller 55 being reprogrammed is to begin execution after receipt of an execute command in the load/verify message of FIG. 11D or when a transfer control is indicated in data word four. The load/verify message, FIG. 11D is only used with remote terminals which require this command. The maximum value (number of bits) used in the program entry address is compatible with the page size of remote terminals using paging. Unused bits equal zero.

Data word four is the page number (bits 3-15) representing up to the thirteen most significant bits for a paged memory address within the bus controller 55. The page number applies to the program entry address for transfer mode =00 or the initial load address for transfer modes =01, 10 or 11. Unused bits shall equal 0. It should be noted that a page comprises 65,536 addresses in memory.

The transfer control bits 0-1 may be used to transfer control to a loaded program after a verify is processed or to an unaltered memory area after a load is completed, that is a bus controller 55 has been reprogrammed. When the transfer control bits equal 01 this indicates to the bus controller 55 being reprogrammed that this is the last header, memory data load or verify (up to 4096 messages), trailer or header, trailer transaction. When the transfer control bits equal 00 this indicates to the bus controller 55 being reprogrammed that more data is to follow the current header, memory data load or verify (up to 4096 messages), trailer transaction or header, trailer transaction and control should not be transferred. For bus controllers 55 using paging and the program entry address, the transfer control will remain equal to 01 even for the last data transaction, until a transfer mode equals 00 message is used to supply the program entry address and page number. Transfer control equal to 10 indicates that control is to be transferred to the program entry address of data word three. When control is transferred, the transfer does not take place until after the trailer message and control is transferred only to non-reprogrammed areas or verified areas in memory. Transfer control equals 11 is invalid and bit 2 equals zero.

Referring to FIG. 11F there is shown the format for a memory data load message which is used to transfer the data to be loaded into the memory of a bus controller 55 being reprogrammed. The activity message provided prior to a memory data load message is used only for bus controllers 55 that do not keep track of the number of memory data load messages required for each header, memory data, trailer transaction or for bus controllers that do not check the busy bit in the status response word, FIG. 11B, provided by interface/rapid reprogramming terminal 20.

The transmit/receive bit (bit 10) in the command word is at the logic one state since the interface/rapid reprogramming terminal 20 is to transmit and the terminal subaddress field (bits 5-9) is set at 15 hexadecimal, while the word count may vary from one to thirty two.

If the busy bit (bit 3) is set to a logic one in the status response word for a memory data load message, no data words would be required to be sent by interface/rapid reprogramming terminal 20. After the busy bit is cleared in the status response word of the activity message, the bus controller 55 commands the memory data load message for which no data was received. The number of data words will equal the word count in the memory data load message command word.

Referring to FIG. 11(G) there is shown the format for a memory data verify message which is used to transfer the data that interface/rapid reprogramming terminal 20 will compare to the data stored in IC memory card 22.

The transmit/receive bit (bit 10) in the command word is at the logic zero state since the interface/rapid reprogramming terminal 20 is to receive data and the terminal subaddress field (bits 5-9) is set at 15 hexadecimal, while the word count may vary from one to thirty two.

If the busy bit (bit 3) is set to a logic one in the status response word for a memory data verify message then bus controller 55 will retransmit the memory data verify message (i.e., same data words) after the busy bit is cleared in the status response word of the activity message.

The number of data words will equal the word count in the memory data verify message command word.

Referring now to FIG. 11H, the trailer message is used to pass the data checksum and additional load or verify parameters to the bus controller 55 being reprogrammed. The activity message shown prior to the trailer message request that the bus controller 55 command the trailer message. The activity message provided prior to a trailer message is used only for bus controllers 55 that keep track of the header, memory data, trailer transaction, that is the bus controller 55 automatically commands this message sequence without interface/rapid reprogramming terminal 20 requesting each message.

The transmit/receive bit (bit 10) in the command word for the trailer message is a logic one since interface/rapid reprogramming terminal 20 is to transmit data and the terminal subaddress field (bits 5-9) in the command word is set at 16 hexadecimal.

Data word one contains the number of sub-pages and the first sub-page for bus controllers 55 utilizing paging or sub-paging. This word may also be used for internal register control. The fields of data word one represent the values to be used in the next header, memory data load or verify (up to 4096 messages), trailer transaction. For the first header, memory data load or verify (up to 4096 messages), trailer transaction the information will be transmitted prior to the memory data transaction via a header message, trailer message transaction in which the TM (transfer mode) field in data word one of the header is 00.

The sub-page/register count (bits 8-15) field in data word one may be used in lieu of or in conjunction with the page number field in data word four of the header message and is individual user definable. Unused bits equal zero. In the preferred embodiment of the present invention the sub-page field in data word one of the trailer message is used in conjunction with the data word four of the header message of FIG. 11E.

For purpose of illustrating the use of the sub-page field in the trailer message the following example is provided. In order to load 256K of memory into a bus controller 55 with bank switching, 64K of address capability and a page size definition of 2048 words, the following approach may be used. To load 256K with sub-pages 2048 words long requires 128 header, memory data, memory data, trailer transactions (256K/2048=128). The 128 transactions consist of 32 transactions for each of the four banks of switching in bus controller 55. Thus, for each 32 transactions the header message, data word four page number, FIG. 11E, equals the bank number which would be incremented from zero to three. Within each group of 32 transactions the sub-page count would increment every transaction from zero to thirty one. For each transaction (assuming HT=01 for buffer transfer count equals the number of messages) the header data one buffer transfer count would be 64 (2048 words/32 words per message).

The first sub-page/register (bits 0-7) field may be used in lieu of or in conjunction with the page number field in data word four of the header message and may be defined by the user. Unused bits equal zero. Examples of use of this field are: specifying a processor register into which the page number field in data word four of the header message is to be loaded or specifying the initial sub-page count in the example set forth above to one so as to not reprogram the first 2048 memory locations (the first group of transactions would only be 31 transactions long (1 to 31) and the sub-page count for the first transaction would be set to one to indicate a starting address of 2048).

The data word two checksum (bits 0-15) is the checksum of an entire transaction, i.e., header, memory data, memory data, trailer transaction (when TM in header data word one is not equal to zero) or header, trailer transaction (when TM in header data one is equal to zero). The checksum is derived by a two's complement sixteen bit addition of every data word in the transaction (i.e., header, memory data, and trailer data words) with the exception of the checksum data word which is data word two of the trailer message. The two's complement sixteen bit addition is binary addition with the carry discarded, that is there is no end around carry (e.g., FFFF (hexadecimal)+1=0).

The bus controller 55 being reprogrammed is responsible for comparing the checksum received from interface/rapid reprogramming terminal 20 with the data words for both load and verify functions. The checksum value in data word two of the trailer message is the checksum that should be computed by the bus controller 55. If the value computed does not match the value received from processor 21 for either a load or verify operation, an error is declared and a reprogram status message is sent by bus controller 55.

Referring to FIG. 11I, the reprogram status message is used by the bus controller 55 to inform interface/rapid reprogramming terminal 20 of an error condition.

The transmit/receive bit (bit 10) of the command word of the reprogram status message is set at a logic zero since interface/rapid reprogramming terminal 55 is to receive information and the subaddress (bits 5-9 of the command word) for this message is 17 hexadecimal.

The status flag (bit 15) of data word one is set to a logic one to indicate that the remainder of the data word should be processed by rapid reprogramming terminal 20, that is the reprogram status message contains valid data. If this bit is set to a logic zero, the reprogram status message will be ignored by rapid reprogramming terminal 20.

The status indicator (bit 14) defines the meaning of the remainder of the data word, that is an error code or a status code to be displayed by interface/rapid reprogramming terminal 20.

When the status indicator equals zero this indicates that an error has occurred and the error code will be processed by interface/rapid reprogramming terminal 20.

When the status indicator equals one this indicates that no error has occurred and the status code in bits 13-0 are to be displayed on liquid crystal display 57 as 4 hexadecimal characters (bits 15 and 14 of the display value are 0). With the status indicator equal to one the values of bits 13-0 will be used to indicate status or progress through the load or verify operation.

When SF equals one and SI equals one the status code bits 0-13 are display characters. When SF equals one and SI equals zero bits 0-13 represent error codes and the desired interface/rapid reprogramming terminal 20 action. The error codes are 0001 (hexadecimal) which is an abort; 0002 (hexadecimal) which is a restart; 0003 (hexadecimal) which is a retry and 0004 (hexadecimal) which is a automatic retry.

The abort error code indicates to interface/rapid reprogramming terminal 20 that the load operation or verify operation has been aborted and should not be retried. Interface/rapid reprogramming terminal 20 will display the error code and wait for an operator response. On receiving the response from the operator, interface/rapid reprogramming terminal 20 will abort the load of the bus controller 55 being reprogrammed and continue with the load of the next bus controller or remote terminal to be reprogrammed if there is a requirement to reprogram another bus controller or remote terminal.

The restart status code indicates that an unrecoverable error has occurred in loading a bus controller 55 and a reload of bus controller 55 is desired. Interface/rapid reprogramming terminal 20 will display the error code and wait for an operator response. On receiving the response from the operator, rapid reprogramming terminal 20 will restart the load of the bus controller 55 being reprogrammed.

The retry status code indicates that an error has occurred in the last message sequence transaction and a repeat of the sequence is desired. Interface/rapid reprogramming terminal 20 will display the error code and wait for an operator response. On receiving the response from the operator, interface/rapid reprogramming terminal 20 will repeat the last transaction.

The automatic retry status code indicates that an error has occurred in the last message sequence transaction. After three consecutive retries, interface/rapid reprogramming terminal 20 will display the error code and wait for an operator response. However, if the retry is successful before reception of the third consecutive error, an error message will not be displayed and operation will continue as normal. On receiving the response from the operator, interface/rapid reprogramming terminal 20 will abort the load of the bus controller 55 being reprogrammed and continue with the load of the next bus controller or remote terminal to be reprogrammed.

Referring to FIG. 11J, if an RRT error message occurs, the interface/rapid reprogramming terminal 20 sets the busy bit in the status response word for all messages and may suppress transmission of any data words. The bus controller 55 will then poll interface/rapid reprogramming terminal 20 with activity messages. When interface/rapid reprogramming terminal 20 is ready for the bus controller 55 to command the RRT error message, it will clear the busy bit, set the service request bit in the status response to the activity message and transmit the data word requesting that the bus controller 55 command the RRT error message.

Data word one, bit 2 is an abort which is set to a logic one by interface/rapid reprogramming terminal 20 to notify the bus controller 55 that the load or verify has been aborted and no further retries will be made.

Bit 1 is a complete restart which is set to a logic one by interface/rapid reprogramming terminal 20 to notify the bus controller 55 that an unrecoverable error has occurred and all memory data load or memory data verify transactions will be restarted. Bit 0 is the transaction bit which is set to a logic one by interface/rapid reprogramming terminal 20 to notify the bus controller 55 that there was an error detected in the last header, memory data, trailer or header, trailer transaction and that the transaction will be repeated. The remaining bits (bits 3-15) of the data word are a logic zero.

Figure 12:
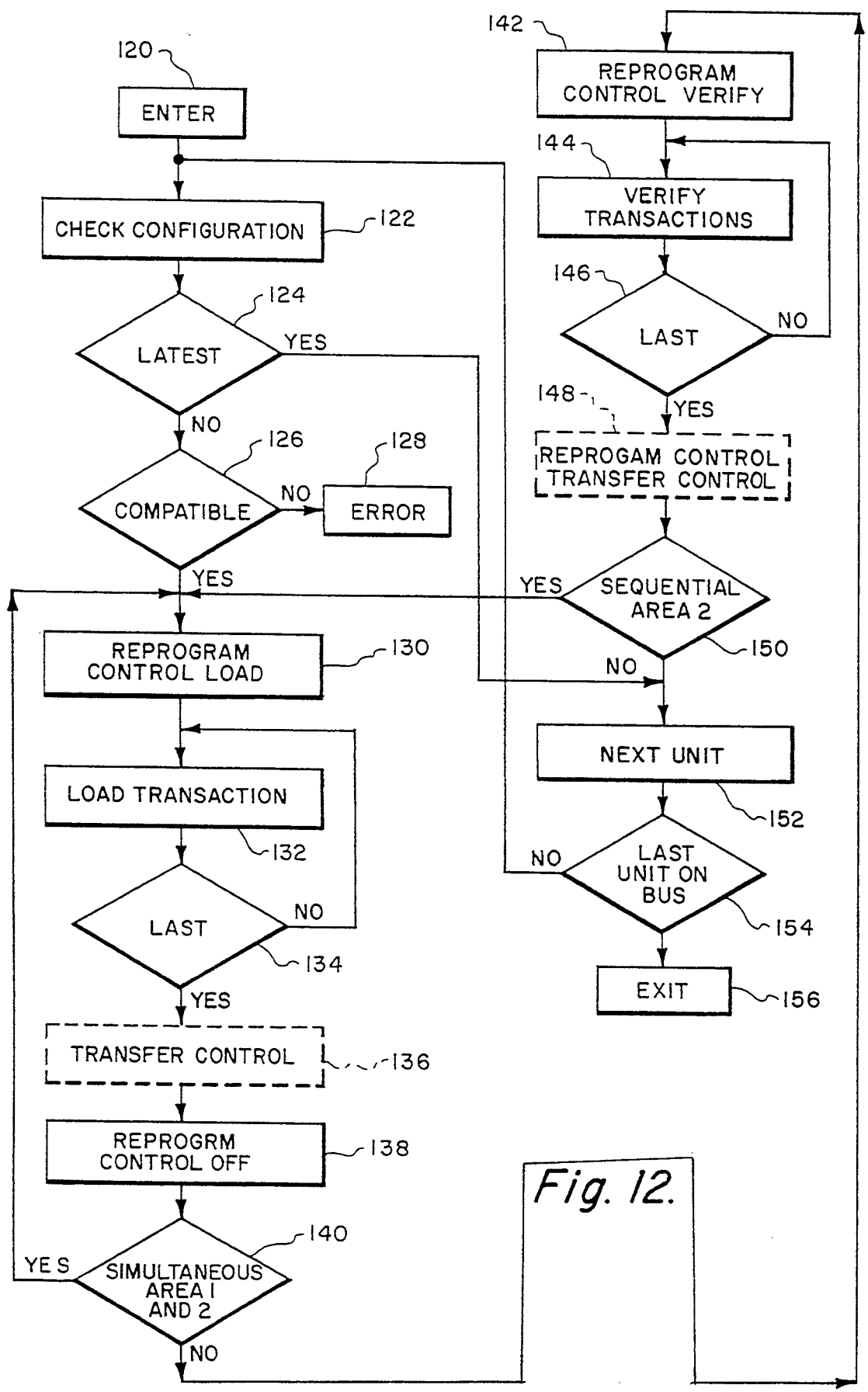
FIG. 12 is a flow chart illustrating the PROTOC.C module of the multipurpose bus interface software.

Referring now to FIG. 12, the operation of interface/rapid reprogramming terminal 20 functioning as a remote terminal when reprogramming a bus controller 55 which does not revert to a remote terminal during reprogramming will now be discussed.

When the lookup table for the bus controller indicates that the bus controller 55 supports memory configuration as identified by the bus controller's software, interface/rapid reprogramming terminal 20 request a memory configuration message, FIG. 11C, from the bus controller 53 being programmed. The memory configuration message describes the current memory contents for one or two memory areas of the bus controller 55 being reprogrammed. Interface/rapid reprogramming terminal 20 compares the received memory configuration to the current memory configuration for the bus controller 55 stored in IC memory card 22 (program step 122). In automatic mode, if the bus controller 55 already contains the current memory configuration, interface/rapid reprogramming terminal 20 continues on to the next remote terminal 53 or bus controller 55 to be processed (program step 152). If the memory configuration message is not usable, interface/rapid reprogramming terminal 20 will assume that the bus controller 55 requires reprogramming. In manual mode, interface/rapid reprogramming terminal 20 will display the memory configuration data and continue reprogramming for the selected bus controller 55.

If the bus controller 55 requires reprogramming of either or both memory areas, interface/rapid reprogramming terminal 20 checks the old and new memory configurations to determine if the information in the IC memory card 22 is compatible with updating the old memory (program step 126) and will use a patch file if it exists. If a patch file does not exist or is not usable, rapid reprogramming terminal 20 checks to see if a complete file exists and checks to determine if this file will result in a newer revision level for the memory configuration. If the configuration message is not usable, no patch file should exist and rapid reprogramming terminal 20 uses the complete file for reprogramming the bus controller 55. Interface/rapid reprogramming terminal 20 will declare an error if the IC memory card 22 information is insufficient (program step 128). If the IC memory card 22 information is correct for reprogramming, rapid reprogramming terminal 20 sends a load message, FIG. 11D, to enable the reprogramming function for either or both memory areas and depending upon bus controller requirements memory areas one and two will be enabled simultaneously or sequentially (program step 130). The bus controller 55 will next check the validity of the message utilizing internally stored information and the reprogram enable discretes if required.

Once the reprogramming mode is entered (program step 132 and 134), interface/rapid reprogramming terminal 20 proceeds to load the new memory contents in blocks of varying size depending on the bus controller 55 and update requirements. There will be no specific erasure commands from interface/rapid reprogramming terminal 20. The bus controller 55 being reprogrammed is responsible for erasure based on the directed write information. The reprogramming of a bus controller 55 is conducted by a series of one or more header message (FIG. 11E), memory data load message (FIG. 11F), trailer message (FIG. 11H) transactions. If required, a header message, trailer message transaction will also be provided for paging or transfer of control functions. If the bus controller 55 being reprogrammed is required to keep track of how many times a particular memory area has been reprogrammed, the bus controller 55 being reprogrammed shall declare an abort error (bits 0-13 of the data word of the reprogram status message of FIG. 11I) if the predetermined memory write capability of the bus controller 55 has been exceeded. The storage of this information within the bus controller's memory shall not affect the validity of a memory verify procedure that is the bus controller 55 being reprogrammed shall mask out this information during a verify operation.

After completion of the load (program step 134), interface/rapid reprogramming terminal 20 will, if required, then provide transfer of control information to the bus controller 55 using a header message, trailer message transaction (program step 136). Transfer of control prior to a verify via the control code bits (bits 0–7) of the data word four of FIG. 11I is not permitted. The transfer of control prior to a verify is not used to transfer control to a memory area of bus controller 55 that has been loaded but not verified. If it is necessary to transfer control prior to the completion of a memory area load/verify, the two parts of the memory area are loaded/verified separately using the same technique as for sequentially loading memory areas 1 and 2. The transfer of control via the header message of FIG. 11E may be inhibited during the load.

After all required data for a particular memory area have been transferred interface/rapid reprogramming terminal 20 will, via bit 4 or 5 of data word four of FIG. 11D disable the reprogramming function for that memory area.

When simultaneous reprogramming of memory areas one and two of a bus controller 55 is utilized (program step 140), rapid reprogramming terminal loads the second memory area prior to the verify operation. When sequential memory area reprogramming or single memory area reprogramming is utilized, interface/rapid reprogramming terminal 20 will at this time verify (program steps 142–146) the previously loaded memory area one load prior to the memory area two load operation. Interface/rapid reprogramming terminal 20 performs the memory verify utilizing the same message transactions that are used for the memory load except that the interface/rapid reprogramming terminal 20 receives the data from the bus controller 55 being reprogrammed and compares the received data with memory configuration data stored in IC memory card 22. The automatic verify after a load may be inhibited.

After completion of the verify (program step 146) interface/rapid reprogramming terminal 20 will, if required, provide transfer of control information to the bus controller 55 (program step 148) using either a header message, trailer message transaction or via the control code bits (bits 0–7) of the data word four of FIG. 11I. When sequential reprogramming of memory areas one and two is utilized, interface/rapid reprogramming terminal 20 repeats the load/verify operations (program step 150) for the second memory area after reprogramming of the first memory area is complete.

Assuming there were no errors in reprogramming, interface/rapid reprogramming terminal 20 will continue (program step 152) and reprogram the next remote terminal 53 or bus controller 55 on the 1553 multiplex data bus 42. If an error did occur, operator intervention is requested by a fault display.

Figures 13A, 13B:
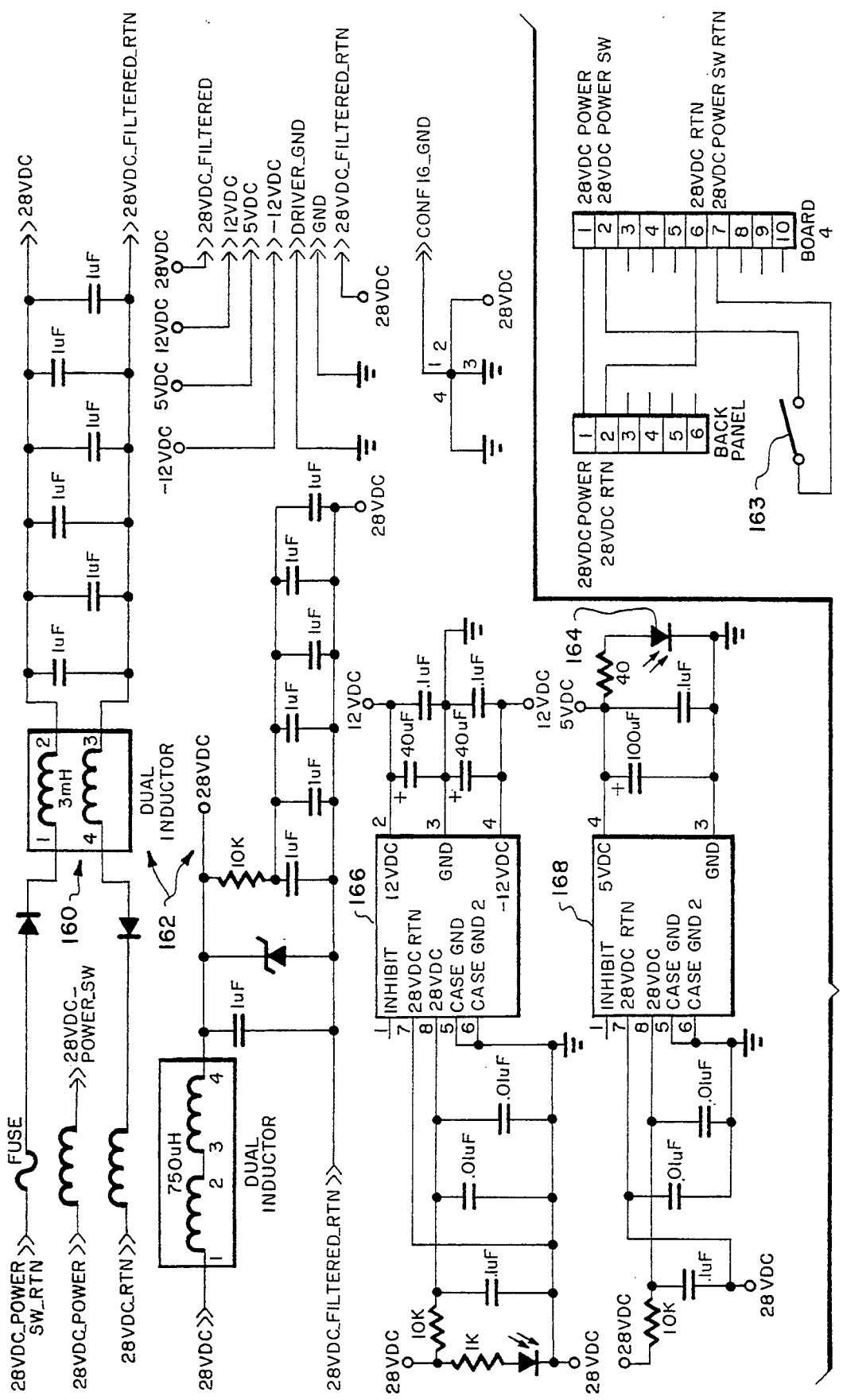
FIGS. 13a and 13b is a detailed electrical schematic illustrating the power supply for the present invention.

Referring now to FIG. 13, there is shown the power supply 160 for interface/rapid reprogramming terminal 20 which includes an electromagnetic interference filter 162 for providing a filtered 28 VDC signal. Power supply 160 also includes a light emitting diode 164 which provides the back light for liquid crystal display 57 on front panel 43, FIG. 2. Power supply 160 further includes a pair of DC to DC converters 166 and 168 with power supply 166 providing plus and minus 12 VDC signal and power supply 168 providing a plus 5 VDC signal.

Figure 14A:
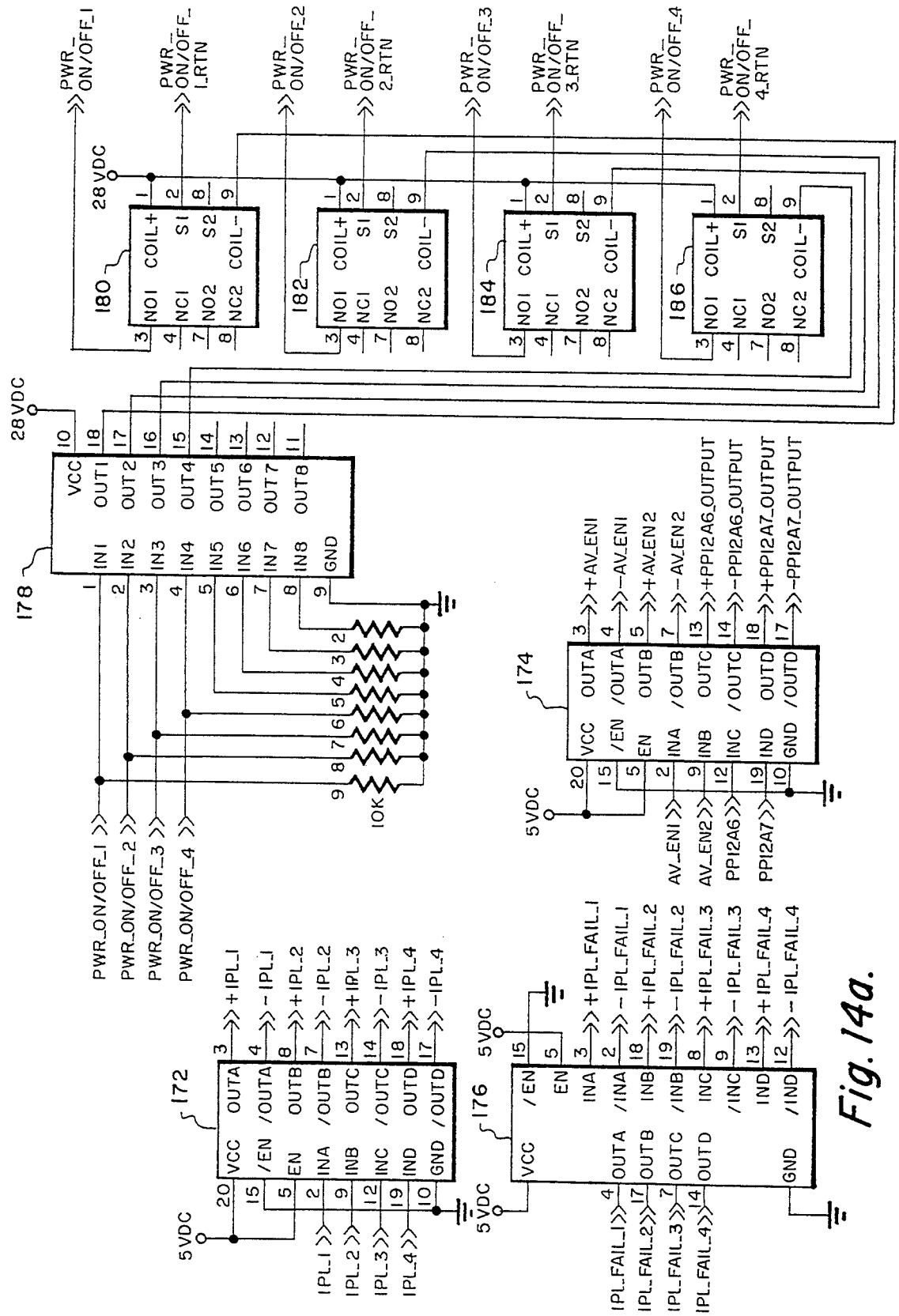
FIGS. 14a and 14b is a detailed electrical schematic of the avionics interface of the present invention.

Referring to FIG. 14a, there is shown the avionics interface 170 of interface/rapid reprogramming terminal 20 which includes a pair differential line driver 172 and 174 with driver 172 providing the unipolar differential signals +IPL_1, −IPL_1 through +IPL_4, −IPL_4 to the 1553 avionics buses one through four to initiate program loading of the AN/AYK-14 avionics computers on buses one through four and driver 174 providing the unipolar differential signals +AV_EN1, −AV_EN1 and +AV_EN2, −AV_EN2 to enable memory areas one and two of remote terminals 53 and bus controllers on the 1553 avionics buses one through four. Avionics interface 170 also includes a differential line receiver 176 which receives the unipolar differential signals +IPL_FAIL_1, −IPL_FAIL_1 through +IPL_FAIL_4, −IPL_FAIL_4 (indicative of an initiate program load failure to an AN/AYK-14 computer) and converts the signals to binary signals IPL_FAIL_1 through IPL_FAIL_4. Avionics interface 170 further includes a power driver 178 which has four inputs PWR_OFF/ON_1 through PWR_OFF/ON_4 respectively connected to the PWR_OFF/ON_1 through PWR_OFF/ON_4 outputs of interface 54, FIG. 17. When a five volt logic one signal is applied to the PWR_OFF/ON_1 of driver 178 the OUT1 output of driver 178 is pulled to ground and the coil in relay 180 is energized closing a normally open contact (NO1 to S1 is shorted) within relay 180 which turns off the AN/AYK-14 computer on avionics bus one. It should be noted that relays 182, 184 and 186 operate in a similar manner with respect to turning off the AN/AYK-14 computers on avionics buses two through four.

Figure 14B:
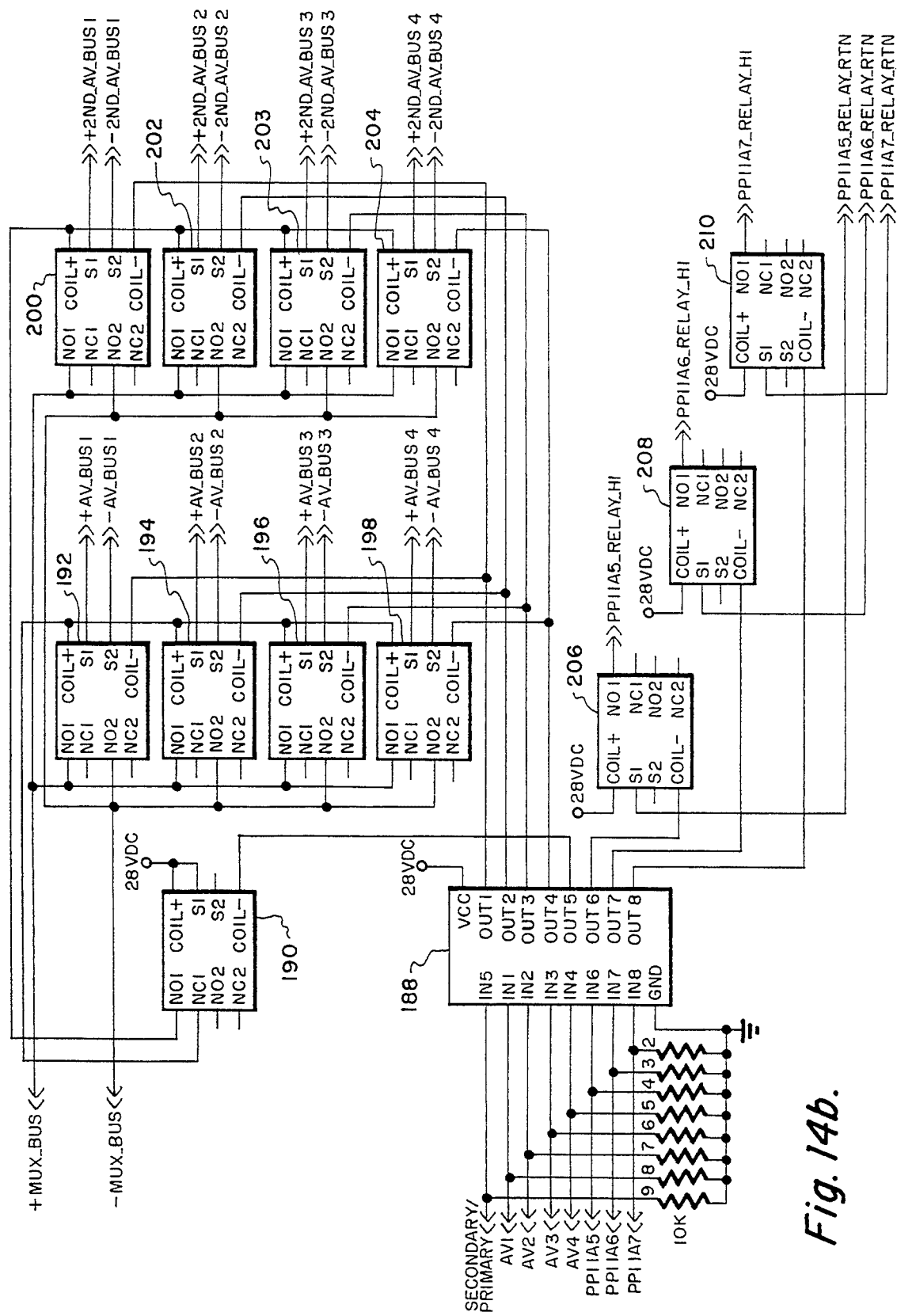

Referring to FIG. 14b, when a logic one is provided from the AV1 output of interface 56, FIG. 17, to the AV1 input of power driver 188, the OUT1 output of driver 188 is driven to ground providing a ground to the coils of relays 192 and 200. When a logic zero is provided to the secondary/primary input of driver 188 the OUT5 output of driver is open, which leaves the coil of relay 190 in a deenergized state providing a 28 VDC signal through the NC1 output thereof to the coils of relays 192, 194, 196 and 198. Since only the coil of relay 192 is at ground, only relay 192 is energized activating the primary avionics bus one on the aircraft. It should be noted that the 1553 multiplex data bus 42 is a differential bus with differential data signals (+MUX_BUS, −MUX_BUS signals) that are Manchester mark encoded Military Standard 1553 signals. Thus, energizing any of the primary avionics bus relays 192 through 198 allows data to be transmitted to and from the avionics bus associated with that particular relay. For example, if the AN/AYK-14 computer on avionics bus number four is to be reprogrammed, a logic one would be provided to the AV4 input of driver 188 and a logic zero would be provided to the secondary/primary input of driver 188 resulting in relay 198 being energized which allows interface/rapid reprogramming terminal 20 to communicate with the AN/AYK-14 computer on avionics bus number four so that this AN/AYK-14 may be reprogrammed.

Figure 15B:
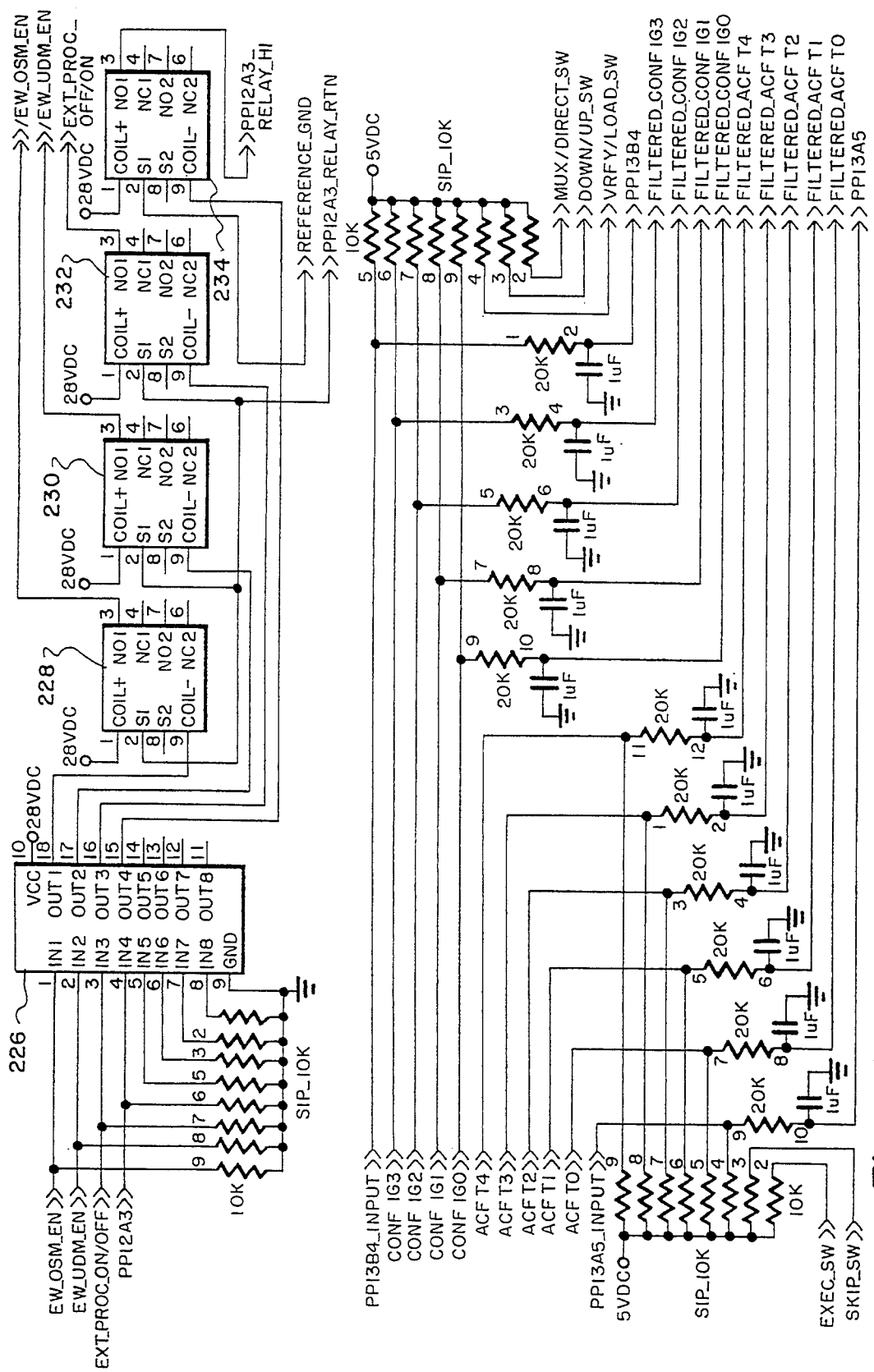

Referring to FIGS. 15a and 15b, there is shown the electronic warfare interface 211 of interface/rapid reprogramming terminal 20 which includes a power driver 212 having an EW input which when supplied a logic one from the EW output of interface 56 results in a logic zero at the OUT4 output of driver 212 energizing the coil of relay 218. When the DIR/XFMR output of interface 56 is at the logic one state the OUT1 output of driver 212 goes to ground energizing the coil of relay 216 closing normally open contacts one and two of relay 212 such that data provided from interface/rapid reprogramming terminal 20 will pass through relays 216 and 218 to a remote terminal 53 or bus controller 55 on the electronics warfare bus. Similarly, when the DIR/XFMR output of interface 56 is at the logic zero state the OUT1 output of driver 212 is open de-energizing the coil of relay 216 leaving the normally closed contacts one and two of relay 212 closed such that data provided from interface/rapid reprogramming terminal 20 will pass through relays 216 and 218, a transformer coupled connection, FIG. 4, directly to a remote terminal 53 or bus controller 55 on the electronics warfare bus.

It should be noted that whenever it is required to ground the center tap of transformer 40, a logic one will be supplied to the GND/OPEN_CT of driver 212 from interface 56. This results in a ground at the OUT2 output of driver 212 energizing the coil of relay 214 which closes the normally open contact one of relay 214 which brings the CT and GND terminals of transformer 40 to ground level, thus grounding the center tap of transformer 40. It should be further noted that the center tap of transformer 40 is generally grounded when coupling to the 1553 multiplex data bus 42 is through transformer 60 if the remote terminal 53 or bus controller 55 requires grounding.

Relays 220, 222 and 224 function in manner similar to relay 218. For example, if it is desired to reprogram the stores management system aboard an aircraft a logic one will be provided at the BOOT_EN_SMS output of interface 56. A logic one at this output is supplied to the IN5 input of driver 212 resulting in a ground at the OUT5 output of driver 212. This energizes the coil of relay 220 closing normally open contact one of relay 220 enabling the stores management system allowing data to be transferred from interface/rapid reprogramming terminal 20 to the stores management system. Referring to FIG. 15b, operating software memory, user data memory and the AN/ALQ-165 radar jammer are respectively enabled by logic ones provided at the IN1, IN2 and IN3 inputs driver 226. This energizes either relay 228, 230 or 232, which respectively enables either the operating software memory, user data memory or the AN/ALQ-165 radar jammer in the electronic warfare system.

Referring to FIGS. 3, 16a, 16b and 17, digital signal processor 21 provides the address and control signals which activate the outputs of programmable peripheral interfaces 52, 54 and 56. Specifically, the XD0-XD7 outputs of processor 21 provide data for interfaces 52, 54 and 56, while the XA9 through XA11 outputs of processor 21 determine which interface 52, 54 or 56 is to be enabled. For example, if interface 54 is to be enabled the XA10 output of processor 54 goes active low, that is logic zero. This logic zero is supplied to the /CS input of interface 54 enabling interface 54. Interface 54 includes three registers which are addressed by the XA0-AX1 outputs of digital signal processor 21. If the EW_OSM_EN output of interface 54 is to be enabled, logic zeros will be provided from the XA0 and XA1 outputs of processor 21 to the A0 and A1 inputs of interface 54 and the D0 input of interface 54 will be provided a logic one. Similarly, if the IPL_1 output of interface 54 is to be enabled, a logic one will be provided from the XA0 output of processor 21 and a logic zero will be provided XA1 output of processor 21 respectively to the A0 and A1 inputs of interface 54 and the D4 input will be provided the logic level of one to enable IPL_1. Likewise, if the IPL_FAIL_1 input of interface 54 is to be read by digital signal processor 21, a logic zero will be provided from the XA0 output of processor 21 and a logic one will be provided XA1 output of processor 21 respectively to the A0 and A1 inputs of interface 54 and the D0 input will be provided the logic level of one to enable IPL_FAIL_1.

The read and write signals for interfaces 52, 54 and 56 are provided by programmable array logic device 24. The read and write inputs to interfaces 52, 54 and 56 are active low, that is for digital signal processor to read a logic signal provided to a programmable interface 52, 54 or 56 requires a logic zero at the /RD input of the interface, while a logic zero at the /WR input transfers the logic zeros and ones at D0-D7 inputs of the interface to the PA0-PA7, PB0-PB7 or PC0-PC7 outputs of the interface depending upon the logic signals at the A0 and A1 inputs of the interface.

Referring now to FIG. 16b, the read (/RD), the write (/WR) and the EEPROM select (/EEPROM) signals are provided by programmable array logic device 24 to the four 64K × 8 bit EEPROMs 240, 241, 244 and 246 of EEPROM 23 and the read (/RD), the write (/WR) and the memory card select (MCS) signals to IC memory card 22 are provided by programmable array logic device 24. The read, the write and the EEPROM select signals provided to EEPROM 23 are active logic zero signals. The read and the write signals provided to IC memory card 22 are active logic zero signals, while the memory card select signal provided to IC memory card 22 is an active logic one signal. Addressing for IC memory card 22 is provided by digital signal processor 22 through the A0-A22 inputs of IC memory card 22, while digital information is either read from or written into IC memory card 22 through the D0-D7 terminals of IC memory card 22. Similarly, addressing for EEPROMs 240, 241, 244 and 246 is provided by digital signal processor 22 through A0-A15 inputs of EEPROMs 240, 241, 244 and 246, while digital information is either read from or written into through the D0-D7 terminals of EEPROMs 240, 241, 244 and 246. The /WPOUT signal provided by IC memory card 22 is supplied to the IN8 input of programmable array logic device 24 and the PC1 input of interface 56. This signal, which is active at the logic zero state, is used to prevent information from being written into IC memory card 22. When supplied to programmable array logic device 24 the /WPOUT signal prevents the /WR signal from going to the active zero state when the MCS signal is active logic one so that information may not be written into IC Memory Card 22. The CST output of IC memory card 22 indicates the presence or absence of the IC memory card 22. When the CST output is low card 22 is absent, when the CST input is high card 22 is present. The ROM/RAM output of IC memory card 22 indicates whether IC memory card 22 is a ROM or a RAM device. When the ROM/RAM output is at the logic one state a ROM is being utilized with interface/rapid reprogramming terminal 20 while a logic zero indicates that a RAM is being utilized.

The BAT/VPP output of IC memory card indicates whether or not the battery for IC memory card 22 is sufficiently charged to operate properly. When this output exceeds 2.5 volts, the output of comparator 248 provides a logic one to the PC0 input of interface 56 indicting the battery in IC memory card 22 is charged.

The memory card write enable (MCWEN) signal provided by interface 56 when at the logic zero state prevents an inadvertent write to IC memory card 22 by insuring that the WR signal supplied by programmable array logic device 24 remains at the logic one state. When the memory card write enable (MCWEN) signal provided by interface 56 is at the logic one state data may be written into IC memory card 22. It should be noted that the MCWEN signal is under rapid reprogramming terminal software control.

The H1 signal provided by digital signal processor 21 to the IN1 input of programmable array logic device 24 is a 14 MHZ clock signal provided by digital signal processor 21. The A22 output of digital signal processor 21 provides a logic signal to the IN2 input of programmable array logic device 24 which determines whether IC memory card 22 or EEPROM 23 is being selected for a read or write operation with a logic zero indicating that the EEPROM 23 is selected and a logic one indicating that the IC memory card 22 is selected. The R/W signal provided by digital signal processor 21 to the IN3 input of programmable array logic device 24 indicates whether a read (logic one) or write (logic zero) operation is to be preformed by IC memory card 22 or EEPROM 23. The /STRB signal provided by digital signal processor 21 to the IN4 input of programmable array logic device 24 indicates whether the A22 and R/W signals are valid and is active at the logic zero state. Similarly, the /IOSTRB signal provided by digital signal processor 21 to the IN5 input of programmable array logic device 24 indicates whether the XR/W signal is valid and is active at the logic zero state. The XR/W signal which is provided by digital signal processor 21 to the IN6 input of programmable array logic device 24 indicates whether a read or write operation is to be performed by programmable peripheral interfaces 52, 54 and 56 and universal asynchronous receiver transceiver (UART) circuits 37 and 38. When the XR/W signal is a logic one a read operation is to be performed and when the XR/W signal is a logic zero a write operation is to be performed.

Figure 16C:
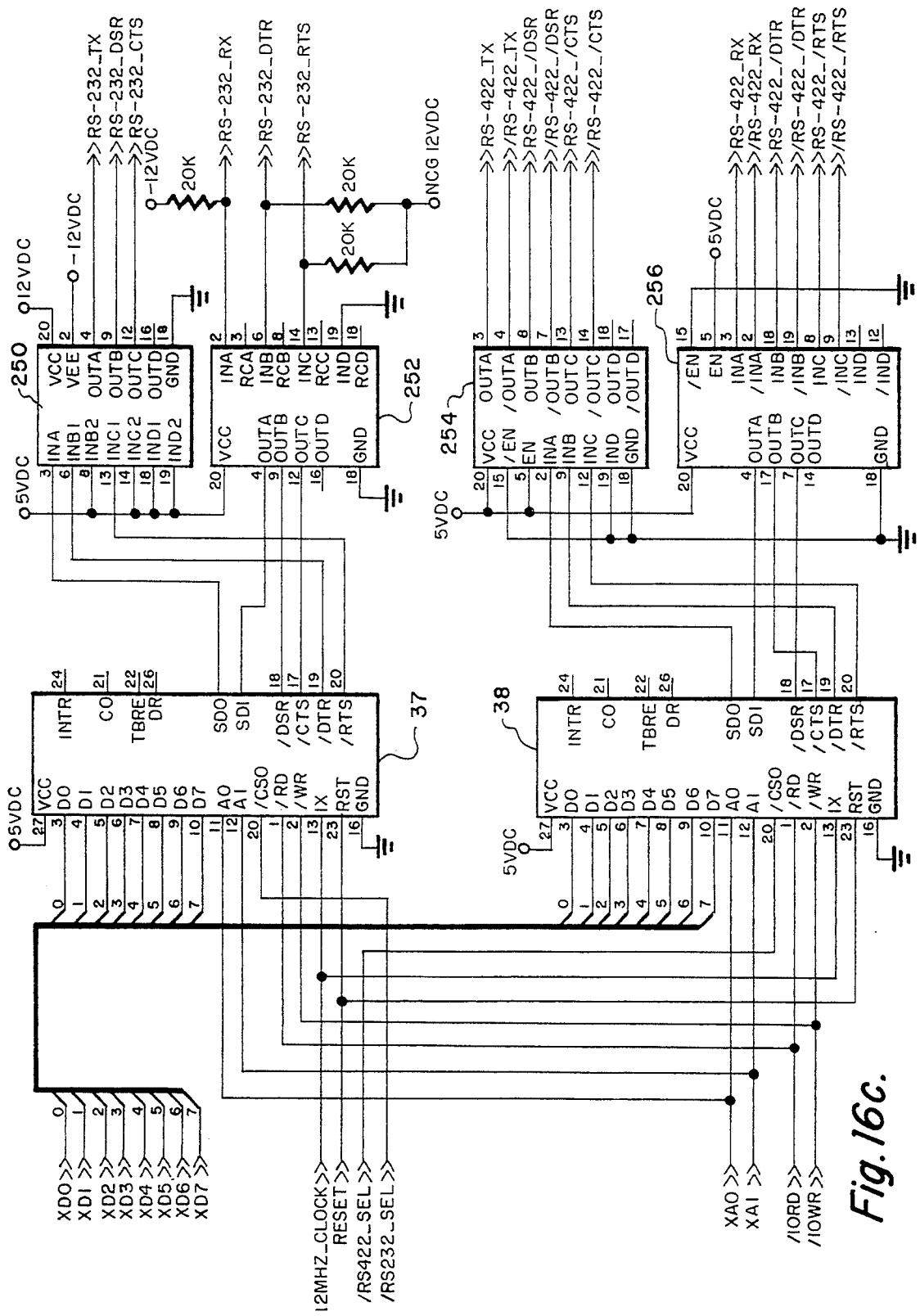

Referring now to FIGS. 3 and 16c, there is shown the universal asynchronous receiver transceiver (UART) circuits 37 and 38 which in the preferred embodiment of the present invention are model number 82C52 CMOS serial control interfaces manufactured by Harris Corporation although it should be understood that any controller interface which is compatible with standard RS-232-C baud rates may be used as UARTS 37 and 38. UARTS 37 and 38 are used to communicate with devices external to rapid reprogramming terminal such as computer 66 via the standard RS-232 and RS-422 serial communications protocol.

Digital data is supplied from the SD0 output of UART 37 through differential line driver 250 to computer 66 via the RS_232_TX data transmission line. Similarly, digital data is supplied from computer 66 via the RS_232_RX data receive line through differential line receiver 252 to the SDI input of UART 37. When interface/rapid reprogramming terminal 20 is turned on, a data set ready signal (active logic one) is provided from the /DSR output of UART 37 through driver 250 via the RS_232_DSR data line to computer 66 indicating to computer 66 that interface/rapid reprogramming terminal 20 is powered up. Computer 66 provides a data terminal ready signal (active logic one) via RS_23-2_DTR data line through receiver 252 to the /DTR input of UART 37 which indicates to interface/rapid reprogramming terminal 20 that computer 66 is operational and ready to send or receive data. When computer 66 is ready to send data, computer 66 provides a request to send signal (active logic one) via RS_23-2_RTS data line through receiver 252 to the /DSR input of UART 37 which indicates to interface/rapid reprogramming terminal 20 that computer 66 is ready to transmit data. Interface/rapid reprogramming terminal 20 responds with a clear to send signal provided from the /CTS output of UART 37 through driver 250 via the RS-232_CTS data line to computer 66. When digital data from interface/rapid reprogramming terminal 20 is to be provided to computer 66 the only signal required is that the data terminal ready signal be at the logic one state indicating that computer 66 is ready to receive data. The transmission of data to and from interface/rapid reprogramming terminal 20 via the RS-422 data bus is similar to the transmission of data via the RS-232 data bus and therefore will not be discussed in detail.

UARTS 37 and 38 include read (/RD) and write (/WR) inputs and a chip select (/CS0) input. The read signal is provided by programmable array logic device 24 to UARTS 37 and 38 to read the receiver registers of UARTS 37 and 38, while the write signal is provided by programmable array logic device 24 to UARTS 37 and 38 to write data into the transmitter register of UARTS 37 and 38. The /CS0 input when at the logic zero state acts as an enable signal for the read and write operations of UARTS 37 and 38. The read operation for UARTS 37 and 38 reads the digital data stored in the UART into digital signal processor 21, while the write operation writes digital data from digital signal processor 21 into the UART. UARTS 37 and 38 also receive a 12 MHZ clock signal provided by an oscillator 255. It should also be noted that UARTS 37 and 38 are provided logic signals to the A0 and A1 inputs thereof which when decoded address four internal registers within UARTS 37 and 38. Specifically, when A1, A0 is 0,0 the buffer register which receives and sends data is addressed; when A1, A0 is 0,1 the control register (write only register which configures the UART transmitter and receiver circuits) is addressed with a write and the status register (read only register that is examined by the UART to determine errors) is addressed with a read; when A1, A0 is 1,0 the modem control register is addressed and when A1, A0 is 1,1 the baud rate is selected with a write operation and the modem status register is addressed with a read operation.

Interface/rapid reprogramming terminal 20 also has four terminals EMU0-EMU3 for communicating with an emulator 67 connected to external computer 66. Emulator 67 may be used for debugging interface/rapid reprogramming terminal 20 and for the initial loading of the RRT software program into the EEPROM 23 of interface/rapid reprogramming terminal 20. It should be noted that the emulator used in the preferred embodiment of the present invention is a Texas Instrument Model No. TMS 320C30 XDS500 Emulator, although any IBM PC-XT/AT compatible TMS320C30 emulator may be used in the preferred embodiment of the present invention. It should be further noted that external computer 66 may be any IBM PC-XT/AT compatible computer.

Figure 16D:
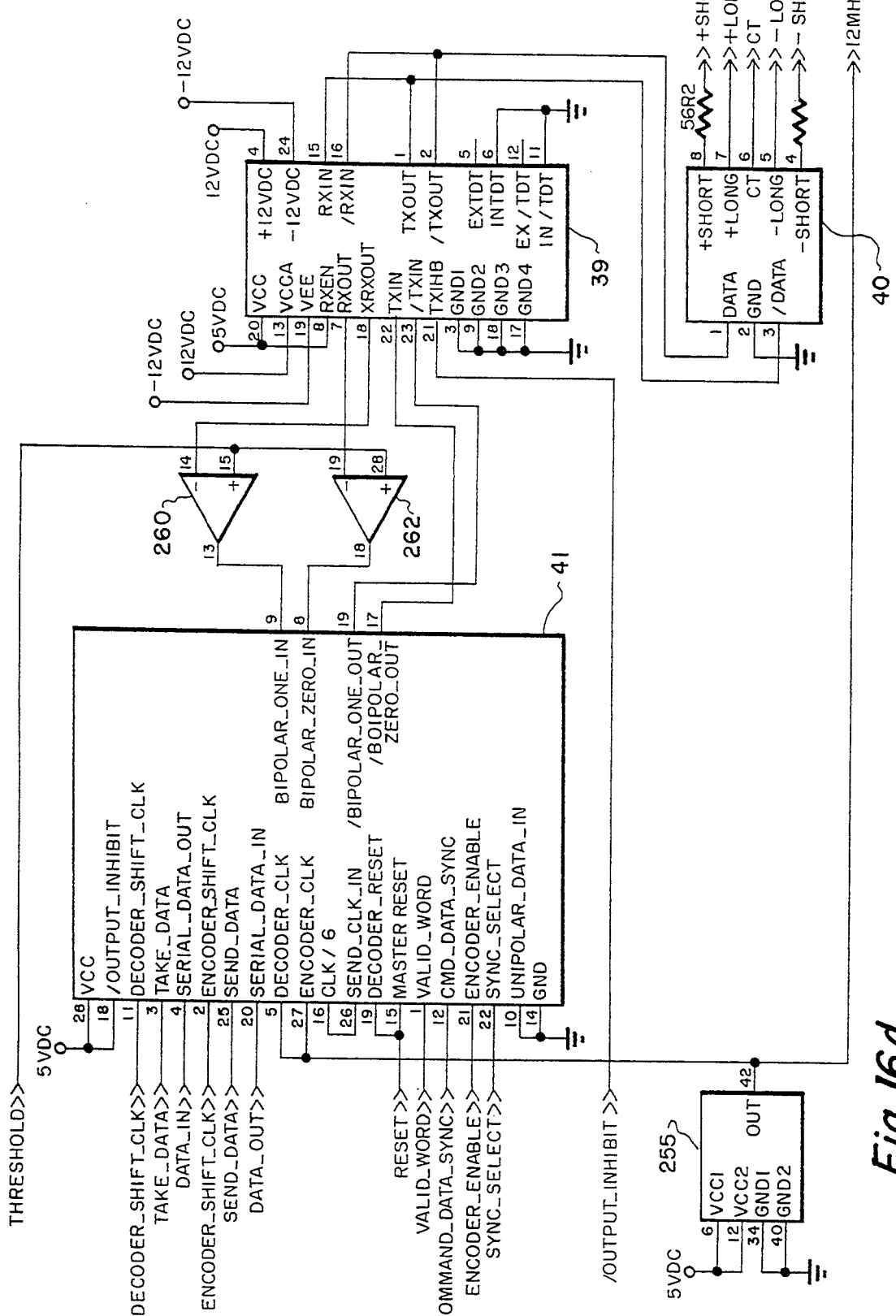

Referring to FIG. 16d, the encoder shift clock is a one megahertz clock signal provided by encoder 41 to digital signal processor 21 to allow for communication with the digital signal processor 21 during data transfer from processor 21 to encoder 41. Encoder 41 also provides a send data signal (active logic one) to digital signal processor 21 to allow for gating of digital data from processor 21 to encoder 41. The Data Out line between processor 21 and encoder 41 transfers the data from processor 21 to encoder 41.

The decoder shift clock is a one megahertz clock signal provided by decoder 41 to digital signal processor 21 to allow for communication with the digital signal processor 21 during data transfer from decoder 41 to processor 21. Decoder 41 also provides a take data signal (active logic one) to digital signal processor 21 to allow for gating of digital data from decoder 41 to processor 21. The Data In line between processor 21 and encoder 41 transfers the data from decoder 41 to processor 21.

Decoder 41 provides a valid word signal (logic one) to digital signal processor 21 which is a parity check (active high) for each sixteen bit word transmitted between decoder 41 and digital signal processor 21. A Command Data Sync signal is provided from decoder 41 to digital signal processor 21 to inform the digital signal processor whether the word received by the decoder 41 via the 1553 multiplex data bus 42 is a command or status word (logic one) or is a data word (logic zero). When the encoder enable signal provided by digital signal processor 21 is a logic one, encoder 41 is informed that digital data is ready to be transmitted from digital signal processor 21 to encoder 41. A sync select signal is provided by digital signal processor 21 to encoder 41 which when at the logic one state indicates that a command data word is being sent by digital signal processor 21 to encoder 41 and when at the logic zero state indicates that a data word is being sent by processor 21 to encoder 41.

Comparators 260 and 262 are used as high speed inverters which allow Manchester encoded data to be transferred from transceiver 39 to encoder/decoder 41.

Referring again to FIG. 16(B), the control signals provided by programmable array logic device 24 are generated in accordance with the following boolean equations:

$$/IOWR = xR/W \cdot /IOSTRB \quad (1)$$

$$/IORD = xR/W \cdot /IOSTRB \quad (2)$$

$$MCS = A22 \cdot /STRB + A22 \cdot R/W \quad (3)$$

$$/EEPROM = A22 \cdot /STRB + A22 \cdot R/W \quad (4)$$

$$/WR = R/W \cdot /STRB \cdot A22 + R/W \cdot /STRB \cdot A22 \cdot M\text{-}CWEN \cdot /WPOUT \quad (6)$$

$$/RD = R/W \cdot /STRB \quad (6)$$

Equations 1 and 2 are the write and read signals for UARTS 37 and 39 and the programmable peripherial interfaces 52, 54, and 56. Equation 3 provides the enable for IC memory card 22. Equation 4 is the enable for the read and write EEPROM 23. Equation 5 and 6 are the write and read signals for EEPROM 23 and the IC memory card 22.

Figure 18A:
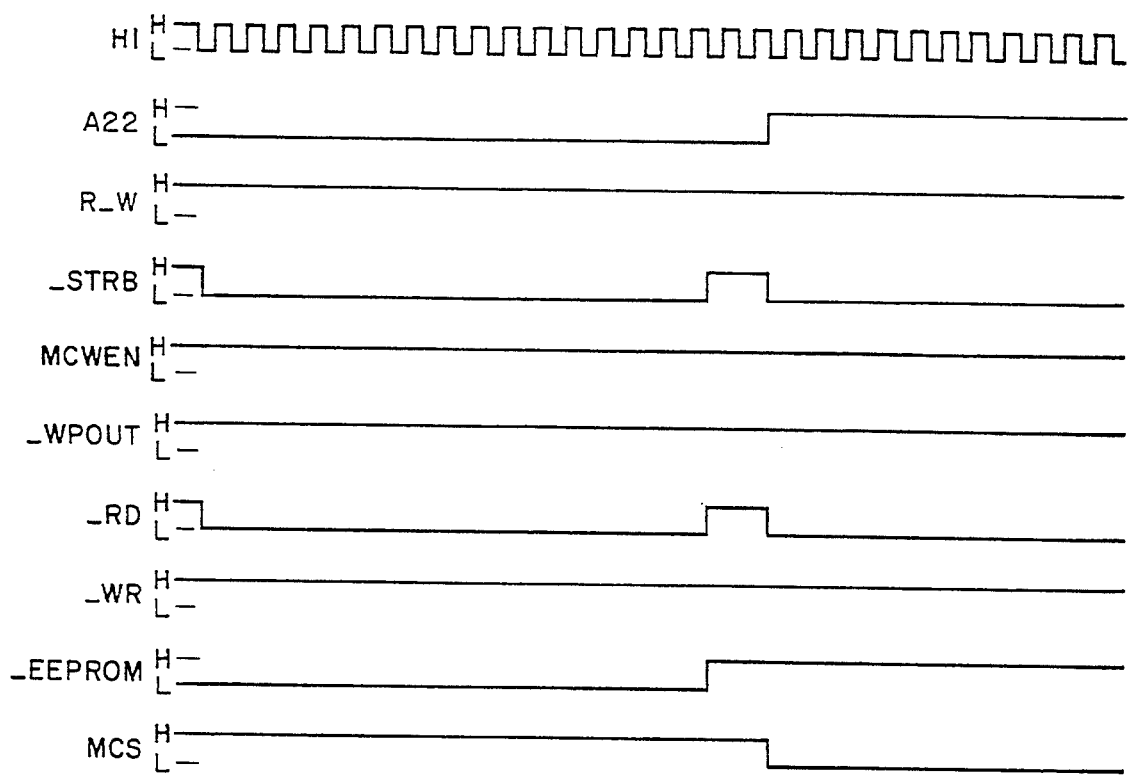
FIGS. 18a, 18b, 18c, 18d, 18e, 18f, 18g illustrates read and write timing signals for certain electrical devices of the present invention.
Figure 18B:
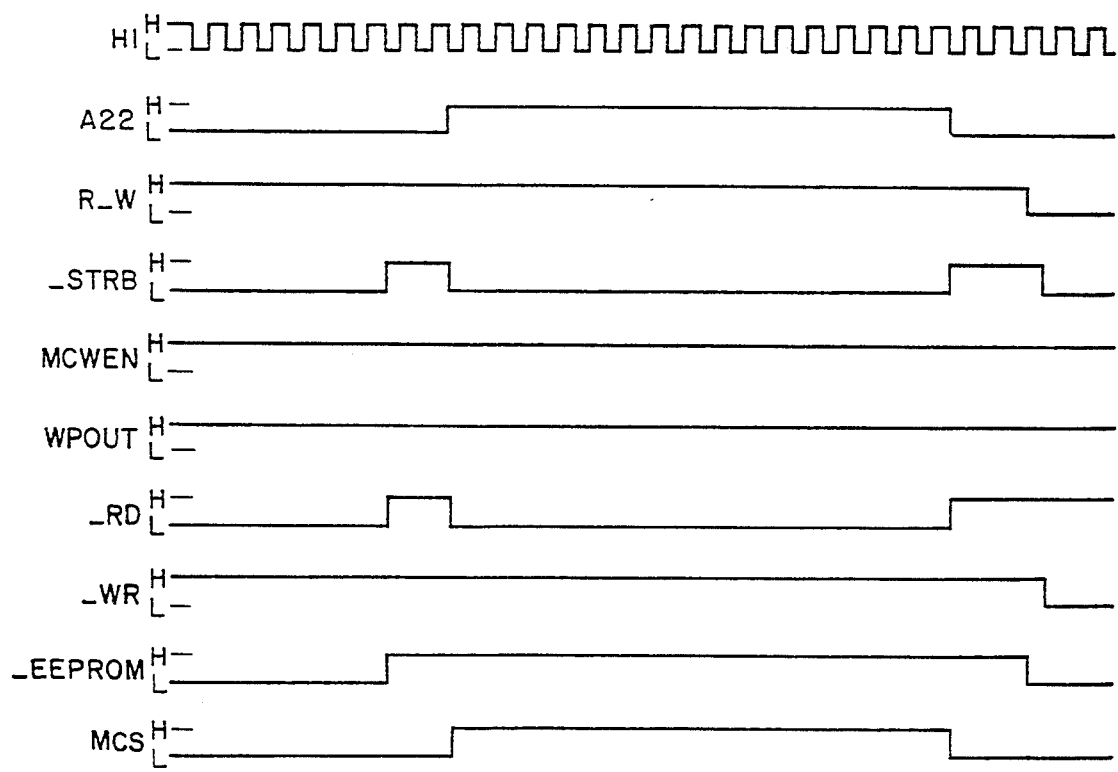
Figure 18C:
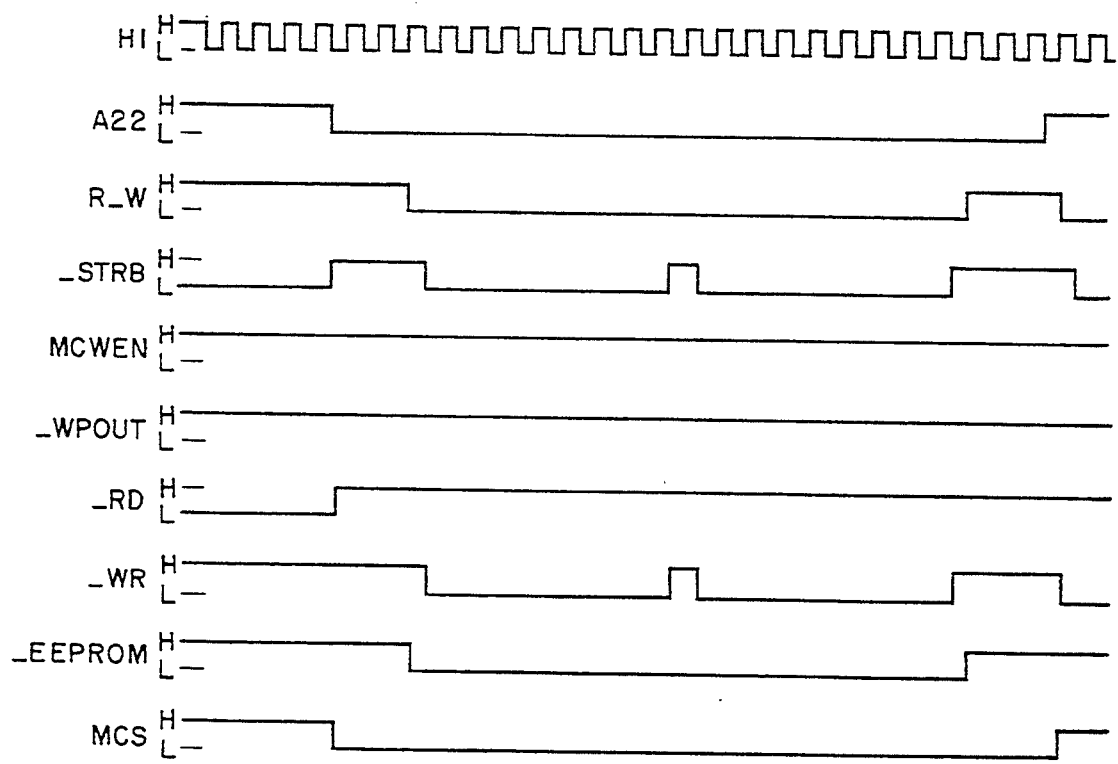
Figure 18D:
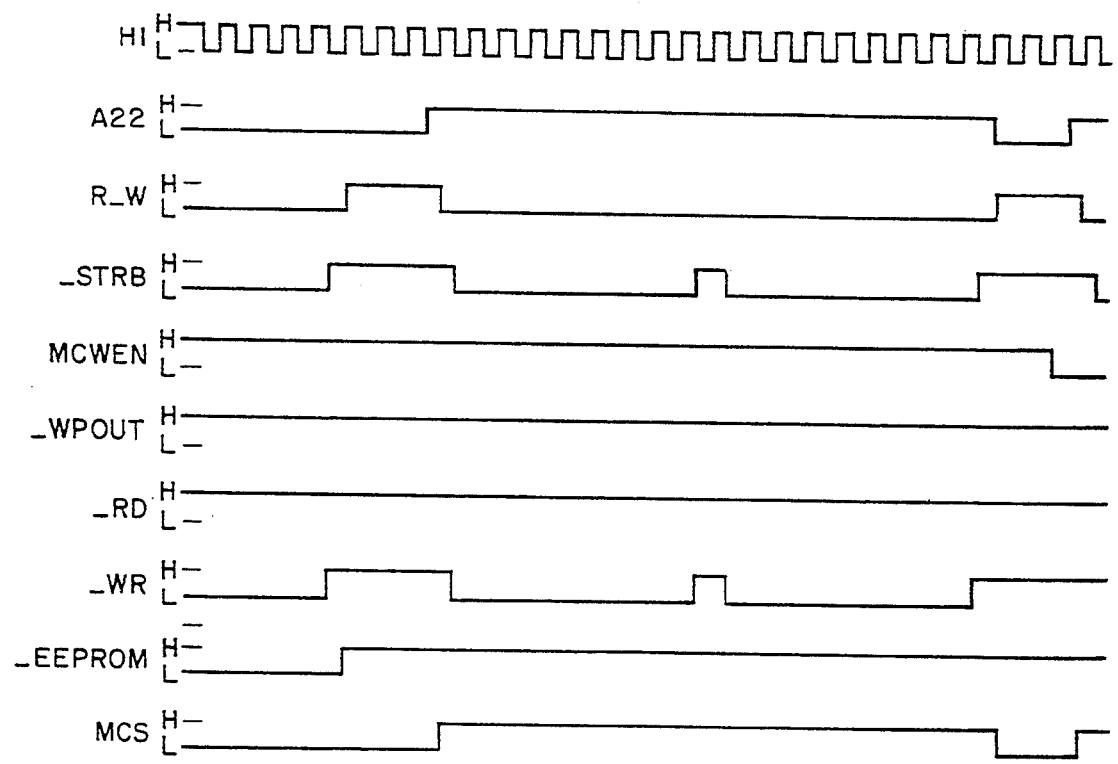
Figure 18E:
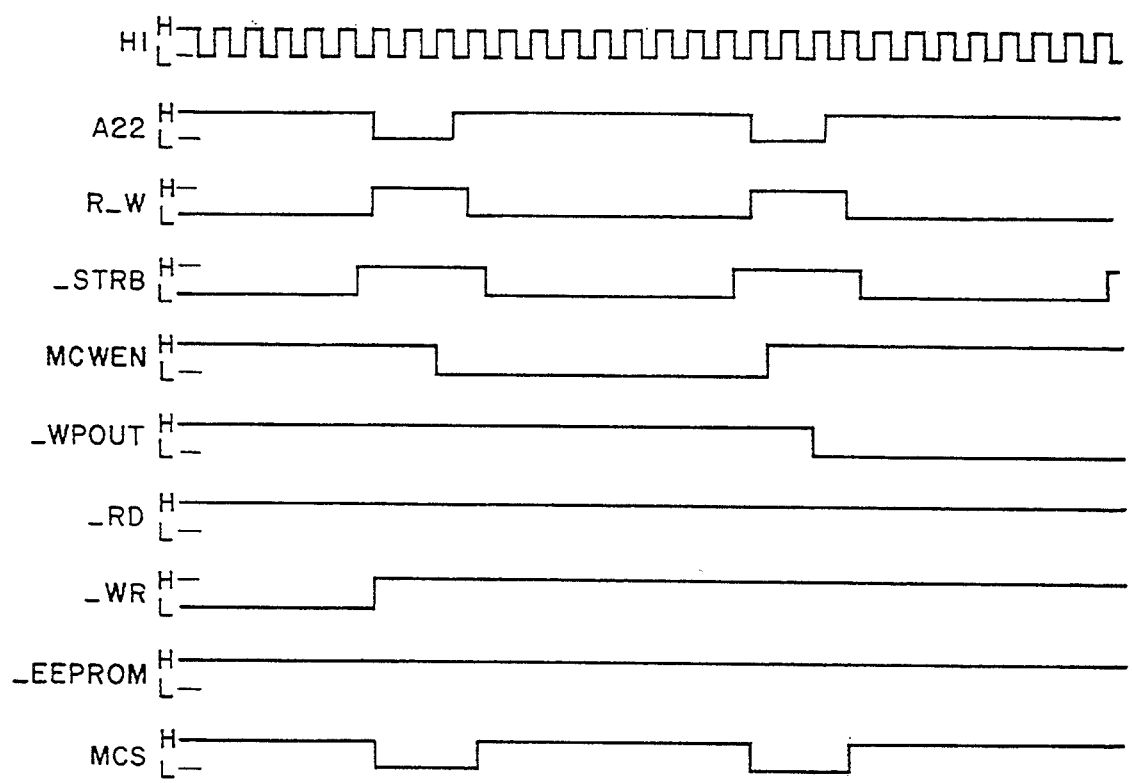
Figure 18F:
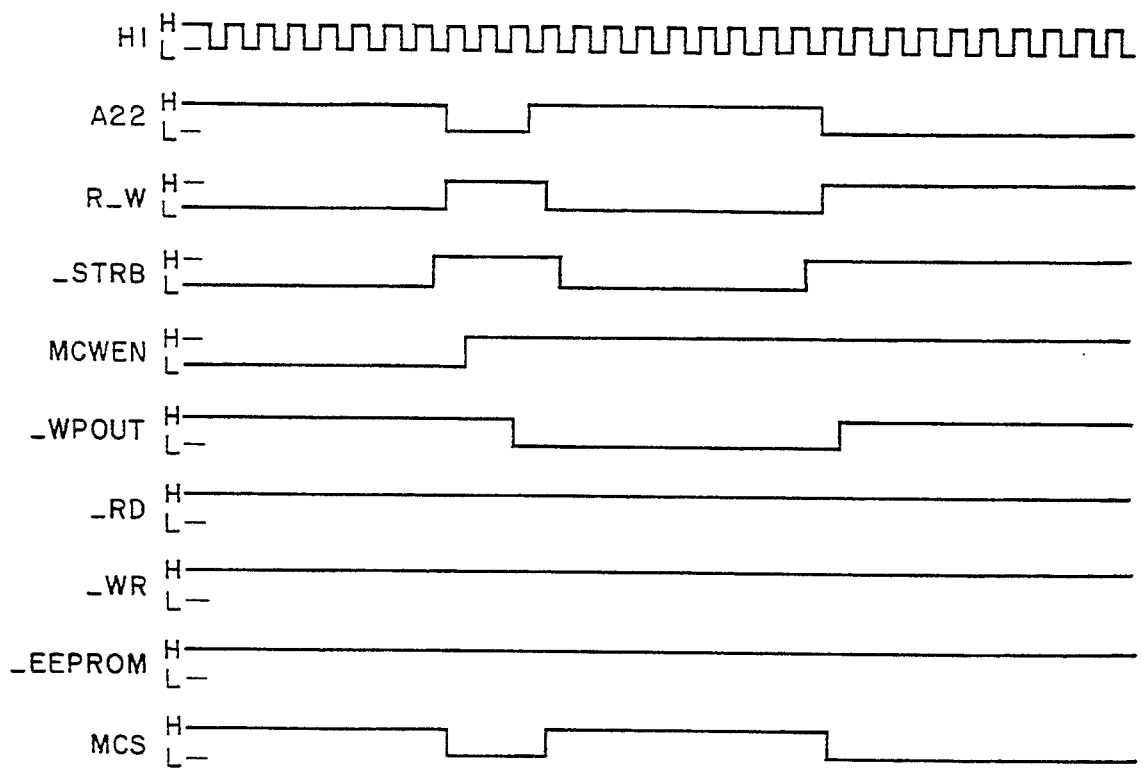
Figure 18G:
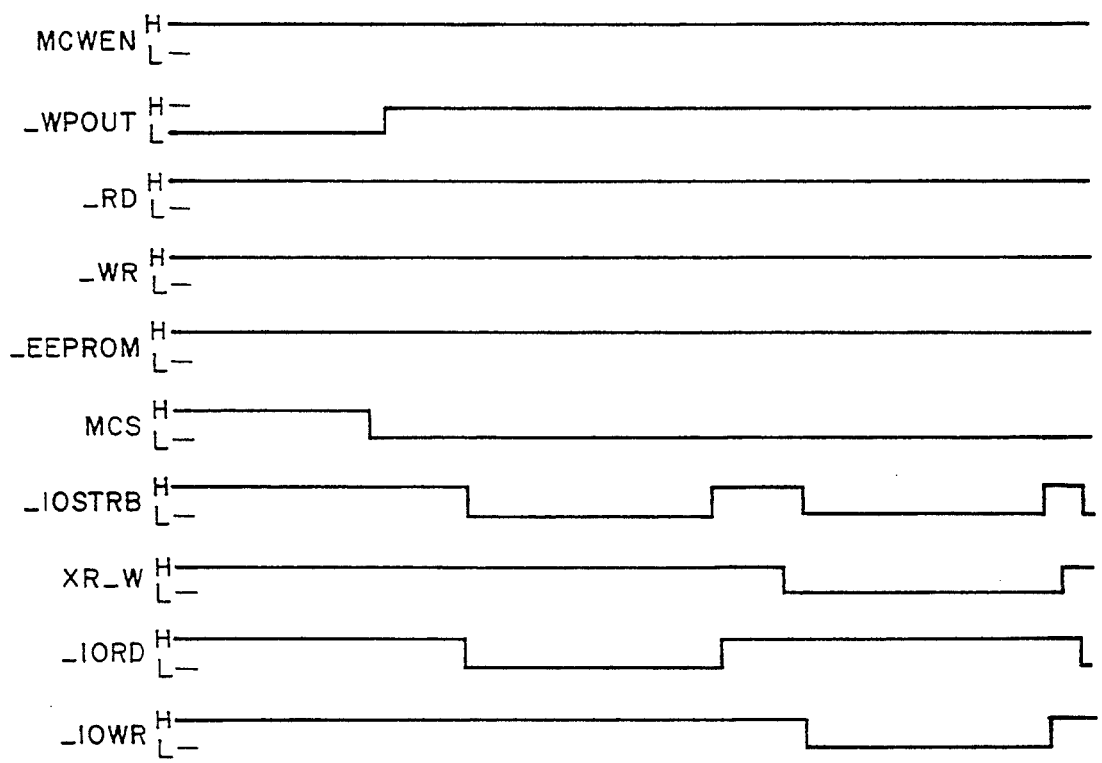

Referring to FIGS. 18a–18g, there is shown the timing diagrams for the read, write, protect and enable control signals for certain components of interface/rapid reprogramming terminal 20. Specifically, FIG. 18a illustrates the timing of the read signal for EEPROM 23, while FIG. 18c illustrates the timing of the write signal for EEPROM 23. Likewise, FIG. 18b illustrates the timing of the read signal for IC memory card 22, while FIG. 18d illustrates the timing of the write signal for IC memory card 22. FIG. 18e illustrates the timing of the memory card select signal for IC memory card 22. FIG. 18f illustrates the timing of the write protect signal for IC memory card 22. FIG. 18g illustrates the read and write timing signals for programmable peripheral interfaces 52, 54 and 56 and universal asynchronous receiver transceiver (UART) circuits 37 and 38 of interface/rapid reprogramming terminal 20.

Referring to FIG. 19a–19i there is shown a flow chart for the software used by interface/rapid reprogramming terminal 20 to reprogram bus controllers 55 and remote terminals 53 connected to the 1553 multiplex data bus 42.

Figure 19H:
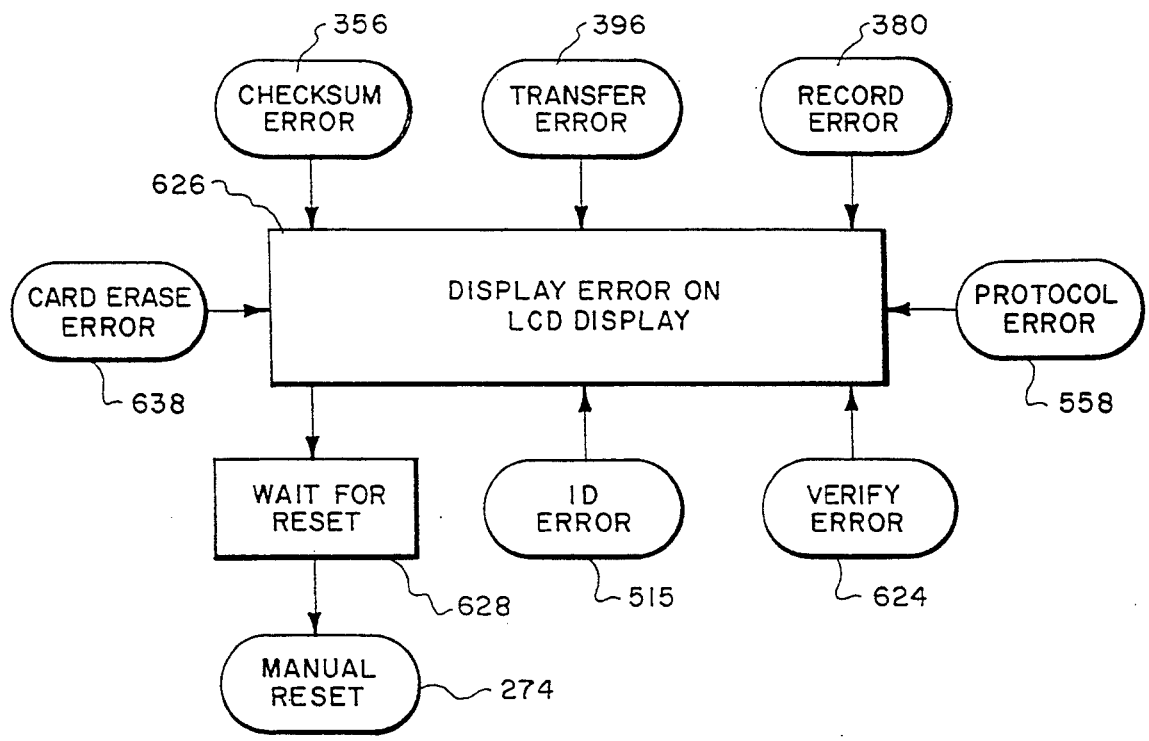
Figure 19B:
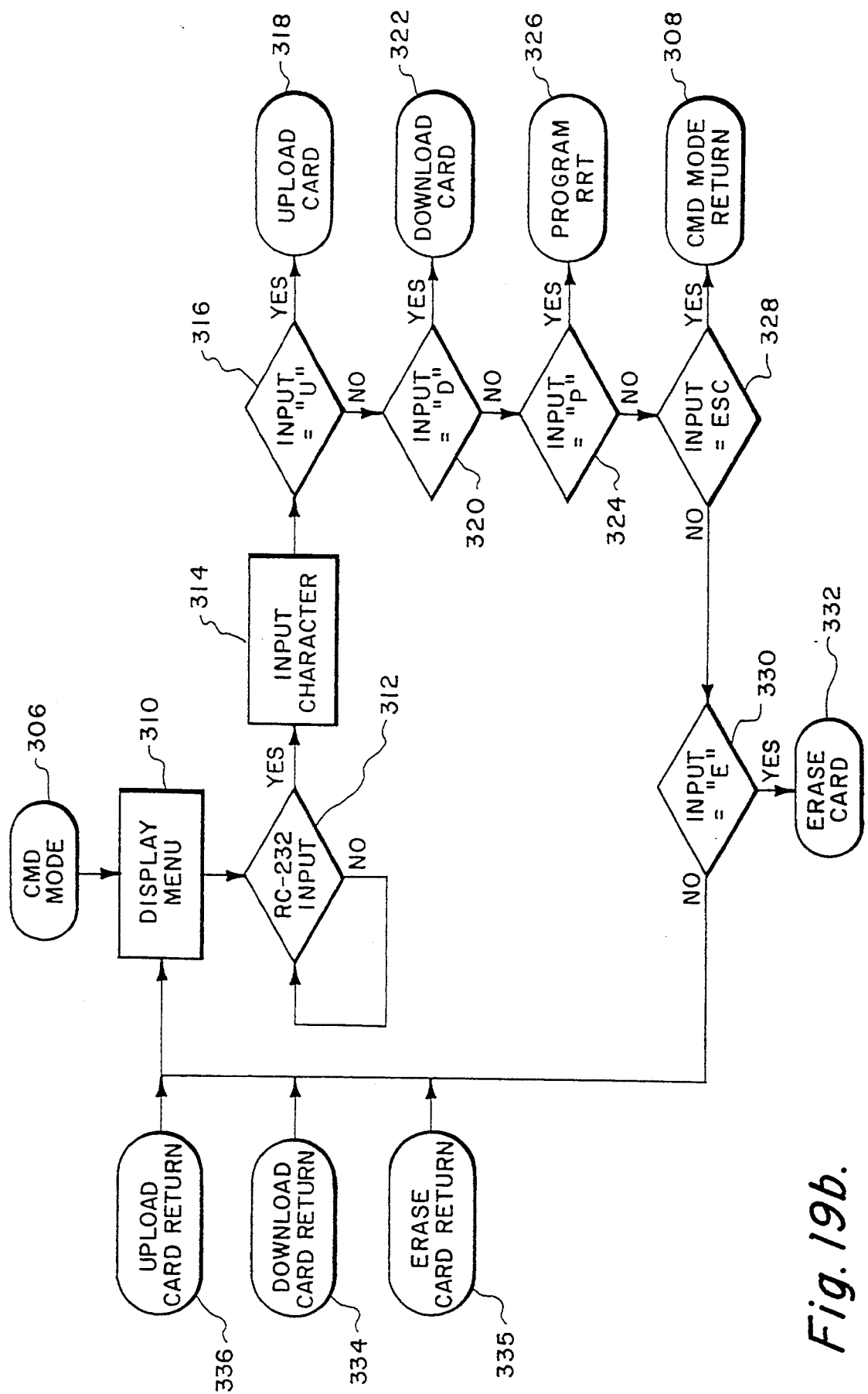

Referring to FIGS. 19a and 19b power to interface/rapid reprogramming terminal 20 is turned on by activating switch 163 (program step 272), rapid reprogramming terminal 20 including digital signal processor 21 is initialized during program step 272 and 278. A built in test is performed by rapid reprogramming terminal 20 during program step 280. An operator then enters "+++" via keyboard 62 to enter the command mode (program steps 282–306). The command menu is displayed on display screen 69 (program step 310). From the command mode menu, the operator has the option to upload the IC memory card 22 by typing the letter "U" on keyboard 62 (program steps 316–318) or download the IC memory card 22 by typing the letter "D" on keyboard 62 (program steps 320–322). From the command menu, the operator may also reprogram rapid reprogramming terminal 20 by typing the letter "P" on keyboard 62 (program steps 324–326) or erase IC memory card 22 by typing the letter "E" on keyboard 62 (program steps 330–332). The operator may also escape the command mode by striking the escape key on keyboard 62 (program step 308).

Figure 19C:
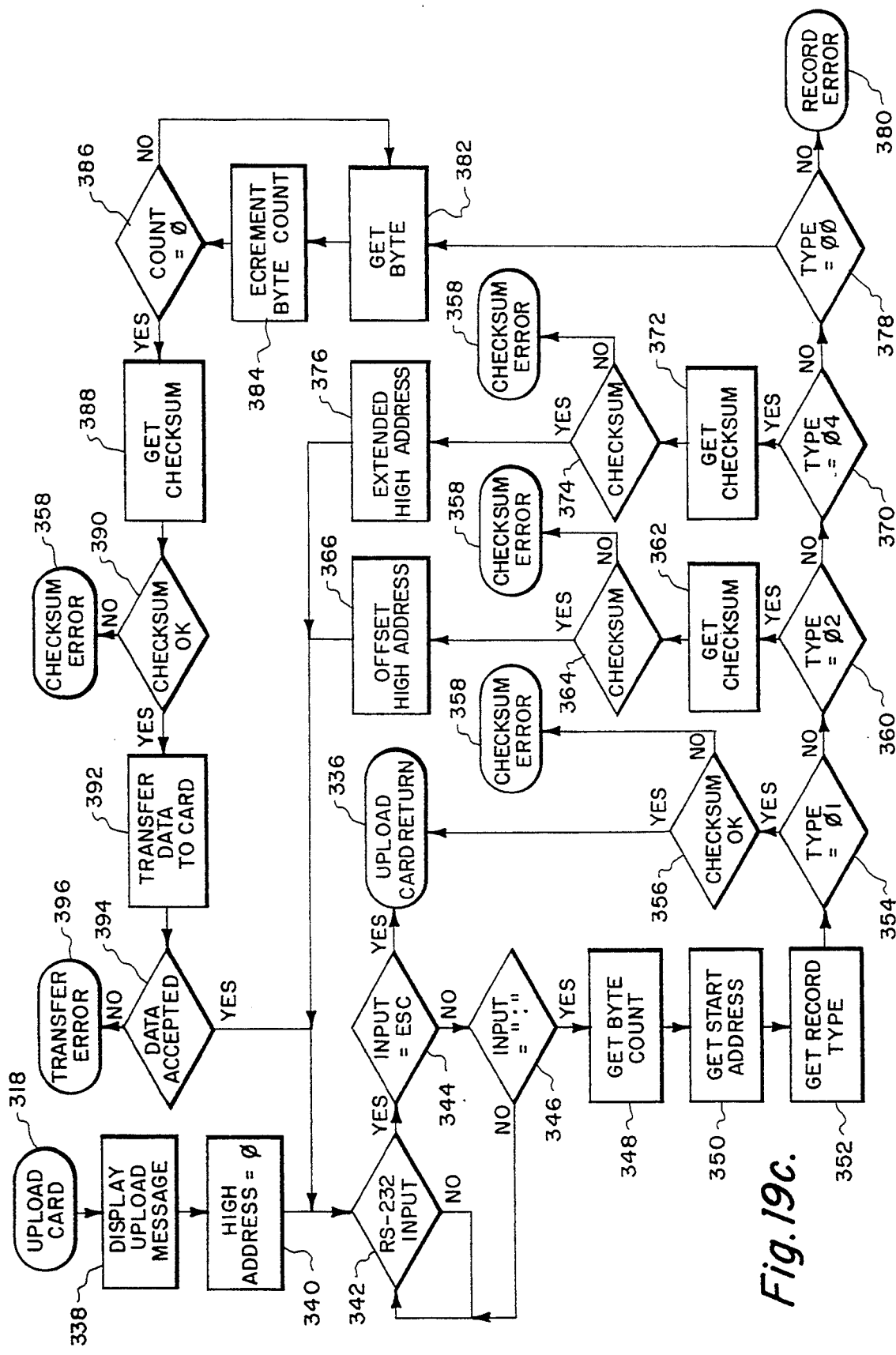

Referring to FIGS. 19b and 19c, the operator enters the upload card module of RRT software by typing the letter "U" on keyboard 62 (program steps 316–318). A message is displayed on liquid crystal display 57 and screen 69 which indicates to the operator that data from computer 66 is to be loaded into IC memory card 22 via the RS-232 communications bus 71. Program step 340 of the upload card routine initializes the address to zero which is the starting address in IC memory card 22 where data is to be stored (program step 340). The RRT software then looks for an input from computer 66 via the RS-232 communications bus 71 (program step 242). It should be noted that the format of the information transferred from personnel computer 66 to IC memory card 22 is in the Intel 32 bit Hexadecimal Object File Record Format of FIG. 5.

Digital signal processor 21 next looks for a ":" (colon) which indicates information is to be transferred from computer 66 to IC memory card 22 via the RS-232 communications bus 71 (program steps 346). If digital signal processor 21 does not detect a colon the operator may strike the escape key to return to the command mode (program steps 344 and 336).

If digital signal processor 21 detects a colon then digital signal processor looks for the byte count, that is the total byte count of the data in the record (program step 348); start address, that is the starting address at which the data from computer 66 is to be stored in IC memory card 22 (program step 350) and record type (program step 352). In the preferred embodiment of the present invention, the upload card routine includes four of the six record types of the format of FIG. 5: data record (type 00); end of file record (type 01); offset high address/extended segment address record (type 02) and extended high address/extended linear address record (type 04).

Once digital signal processor 21 determines the type of record, digital signal processor 21 processes the record. For example, if digital signal processor 21 determines that the record type is type 04 (program step 370) then digital signal processor 21 processes the data to determine the extended high address (program step 376) which is utilized when the memory address count exceeds 64K, that is one page of memory which can store 64K eight bit bytes. It should be noted that while the format of FIG. 5 provides for 65,000 pages of memory storage capability, IC memory card 22 is limited to eight megabytes of memory storage capability. It should further be noted that the preferred embodiment of the present invention utilizes only the type 04 record to extend the address beyond 64K address locations in memory.

When the checksum is not verified as being valid (program step 356), the RRT software checksum error (program step 358) is utilized to enter the error routine of FIG. 9H being utilized by interface/rapid reprogramming terminal 20.

Program steps 378-394 of the upload card routine transfer the data from computer 66 to IC memory card 22 with temporary storage in RAM of digital signal processor 21. Once the checksum is verified as being valid (program step 390) data is transferred from RAM in digital signal processor 21 to IC memory card 22 (program step 392) and accepted by IC memory card 22 (program step 394). When transfer of data is complete, the RRT software proceeds to program step 354 which is the end of the file record and then exits the upload card routine (program step 336) to the command mode.

Figure 19D:
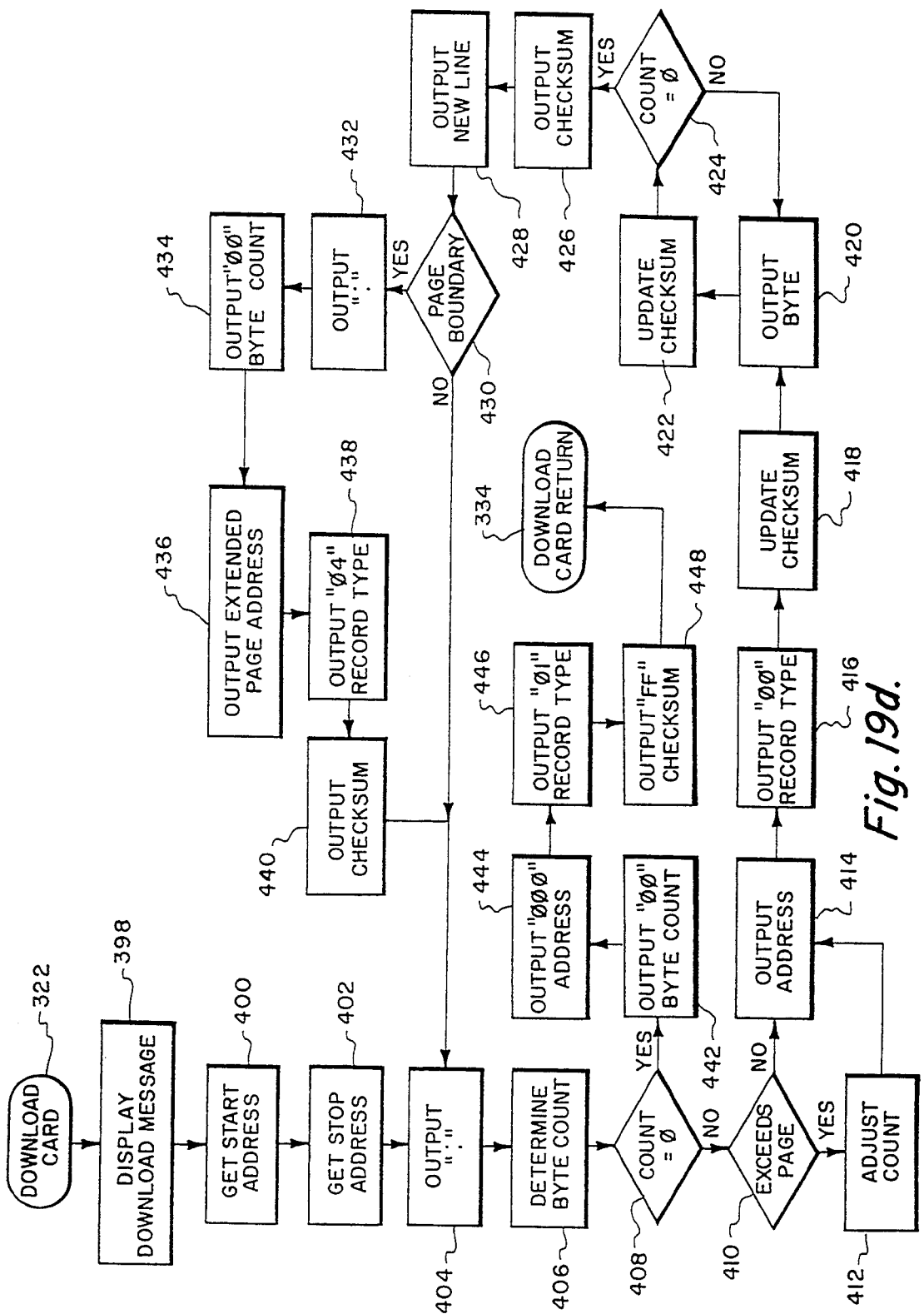

The download card routine of FIG. 19d is similar to the upload card routine of FIG. 19c and therefore will not be discussed in detail. During the download card routine data is down loaded from IC memory card 22 into personnel computer 66 with digital signal processor 21 formatting the data in the Intel 32 bit Hexadecimal Object File Record Format of FIG. 5. When the operator enters the download routine by typing the letter "D" on the keyboard 62, a message is displayed on the screen 69 and the liquid crystal display 57. This message request that the operator provide via keyboard 62 the start address and the stop address or last address of the data to be down loaded from IC memory card 22. Rapid reprogramming terminal then downloads the data stored between the start and stop addresses via the RS-232 communications bus into personnel computer 66 (program steps 400-448).

Figure 19E:
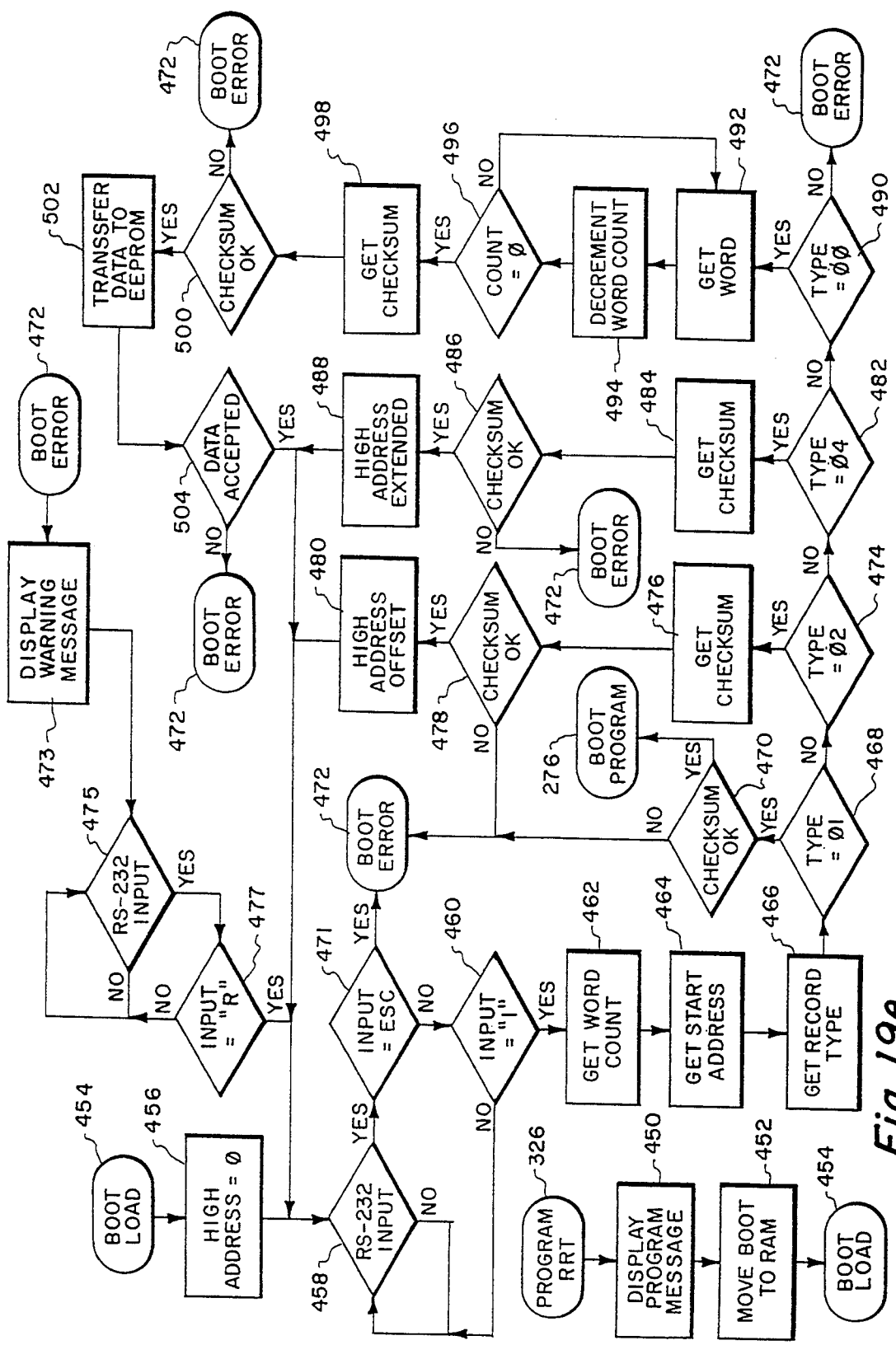

Referring to FIG. 19e the program RRT routine (program step 326) is entered when the operator types the letter "R" on keyboard 62. A message is displayed on screen 69 and liquid crystal display 57 indicating that the RRT software is the program RRT routine (program step 450). The BOOT.C module is next moved from EEPROM 23 into RAM of digital signal processor 21 for execution to allow for the loading of data into EEPROM 23. The boot load routine is entered (program step 454) which allows rapid reprogramming terminal to be reprogrammed from computer 66 via the RS-232 communications bus 71. When interface/rapid reprogramming terminal 20 is being reprogrammed, the transfer of data from computer 66 to EEPROM 23 is similar to the transfer of data from computer 66 to IC memory card 22 during the upload card routine of FIG. 19c. During the boot load routine data from computer 66 is temporarily stored in RAM of digital signal processor 21 and then permanently stored in EEPROM 23 in four byte words at each address in EEPROM 23. This is different from the transfer of data during the upload card routine during which data is stored in IC memory card 22 in eight bit bytes at each address in IC memory card 22. The boot load routine includes four of the six record types of the format of FIG. 5: data record (type 00); end of file record (type 01); offset high address/extended segment address record (type 02) and extended high address/extended linear address record (type 04) for the transfer of data from computer 66 to EEPROM 23.

During the boot error routine (program step 472) a message is provided to the operator via screen 69 (program step 473) indicating that an error has occurred in reprogramming interface/rapid reprogramming terminal 20. Digital signal processor 21 then looks for the letter "R" entered by the operator using keyboard 62. If the digital signal processor 21 detects an "R" (program step 477) then boot load routine is repeated.

At this time it should be noted that the only modules transferred to RAM of digital signal processor 21 for execution are the BOOT.C module and the MS1553.C module. Digital signal processor 21 can, in turn, execute programs faster out of RAM than out of EEPROM 23.

Figure 19F:
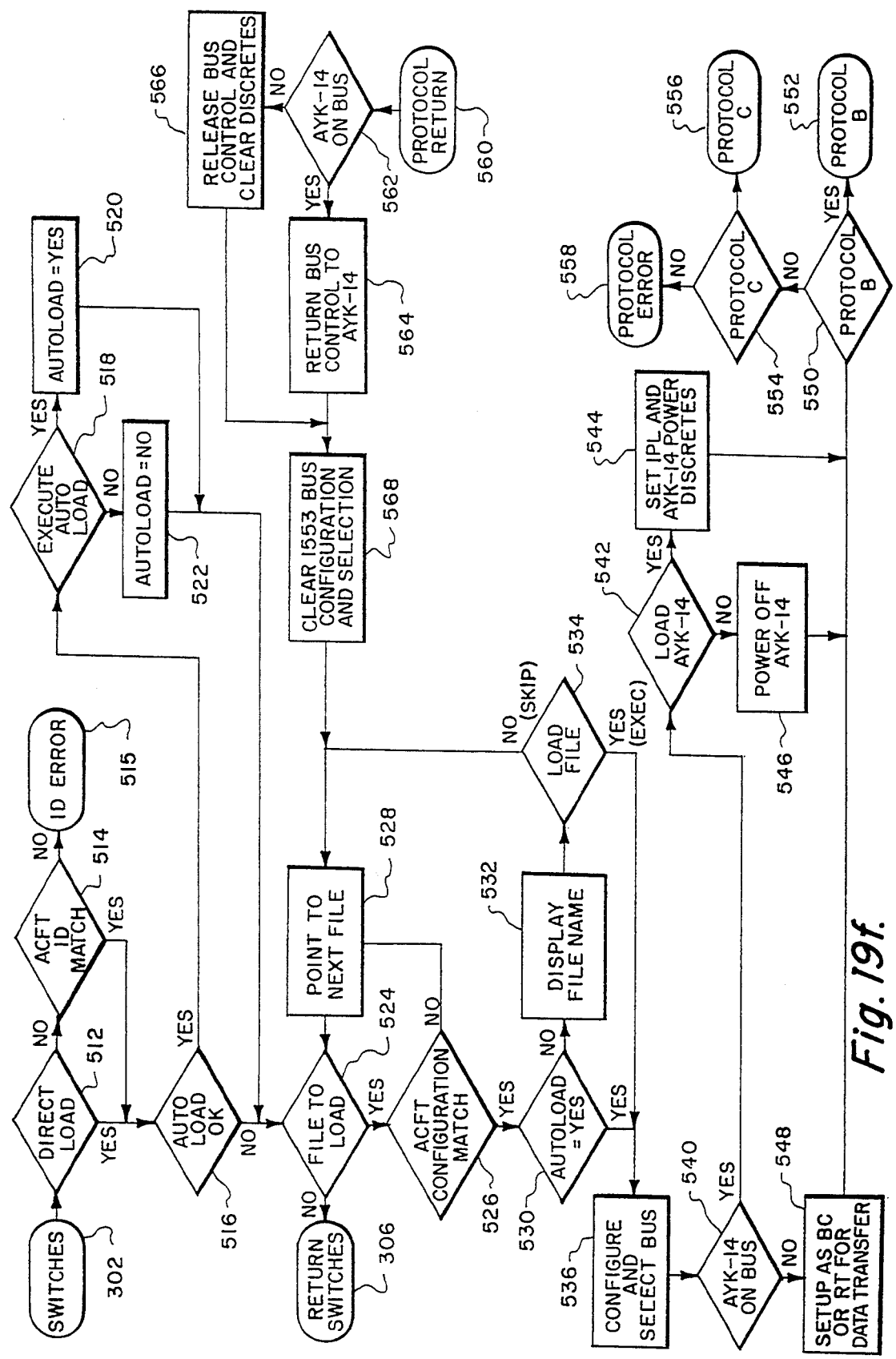
Figure 19G:
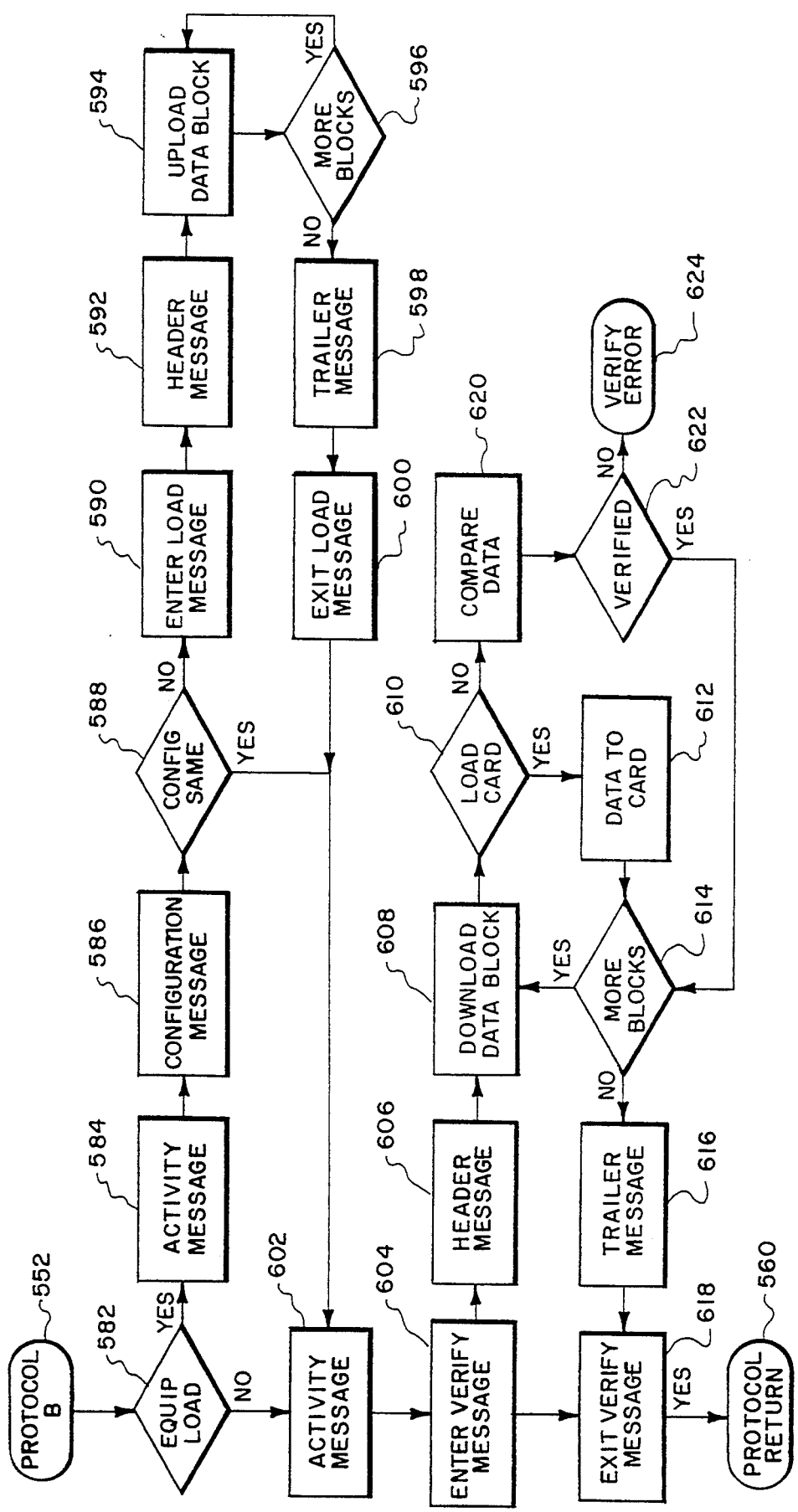

Referring to FIG. 19(F) the switches module (program step 302) is the module which allows for the execution of PROTOCOL B (program step 552) or PROTOCOL C (program step 556). Program step 512 is a test to determine whether a direct load is to be performed. For example, the AN/ALQ-165 radar jammer is an electronic warfare bus controller which may be reprogrammed either in the aircraft or when removed from the aircraft which is a direct load. If it is determined that the data load is to occur via the 1553 multiplex data bus 42 the aircraft identification is checked in program step 514. Program step 516 determines whether the data load is to be an auto load. A data bit in the card header for the remote terminal 53 or bus controller 55 being reprogrammed indicates whether or not an auto load is permitted (program step 518). If an auto load is permitted (program step 520) a message is provided to the operator via video screen 69 that an auto load is permitted. The operator may press the switch 49 to the execute position for auto load or the skip position for a manual load (program steps 520 and 522). Program step 524 test the most significant bit in the data file to be loaded from IC memory card 22 and if there is a file to load then the RRT software proceeds to program step 526 to determine whether there is a match between the aircraft configuration and the hardware configuration for the file to be loaded from IC memory card 22.

If an auto load is not permitted, the file name for the remote terminal 53 or the bus controller 55 to be reprogrammed is displayed (program step 532) on the liquid crystal display 57. The operator may then press switch 49 to the execute position or the skip position (program step 534). If the operator presses switch 49 to the skip position the RRT software proceeds to program step 528 which points to the next file in IC memory card 22.

If the operator presses switch 49 to the execute position the RRT software proceeds to program step 536 during which interface/rapid reprogramming terminal 20 selects and configures the 1553 multiplex data bus 42 for reprogramming of a remote terminal 53 or bus controller 55 in accordance with the data contained in the lookup table for the remote terminal 53 or bus controller 55 to be reprogrammed. If a remote terminal 53 on the avionics 1553 bus is to be reprogrammed, the RRT software proceeds through program steps 540 and 542 to program step 546 during which power to the AN/AYK-14 computer/bus controller 55 is turned off to allow for reprogramming of the remote terminal 53. The RRT proceeds to Protocol B (program step 552).

If an AN/AYK-14 computer is to be reprogrammed the appropriate power discretes are set (the Initiate Program Load (IPL), and Power Off/On (PWR_OFF_/ON) discretes, which are used to control an AN/AYK-14 for reprogramming). For example if the AN/AYK-14 on avionics bus number one is to be reprogrammed PWR_OFF/ON_1 and the IPL_1 discretes, FIG. 17, are set at a logic one. The PWR_OFF/ON_1 discrete is next set to logic zero to allow reprogramming of the AN/AYK-14 on bus number one (program step 544). Program step 548 provides for the conversion of interface/rapid reprogramming terminal 20 to a bus controller for the purpose of reprogramming a remote terminal 53 or for the conversion of interface/rapid reprogramming terminal 20 to a remote terminal for the purpose of reprogramming a bus controller 55 when an AN/AYK-14 is not on the bus.

Referring to FIGS. 9A-9J and 19g program step 552 is the PROTOB.C module of the RRT software which is used when a remote terminal 53 or a bus controller 55 which reverts to a remote terminal is being reprogrammed. Program step 582 determines whether interface/rapid reprogramming terminal 20 will perform a data upload to remote terminal 53. If it is determined that an upload is to be performed interface/rapid reprogramming terminal 20 will use the messages of FIGS. 9A-9J (program steps 584-600) to upload the data from IC memory card 22 into the remote terminal 53 being reprogrammed. When the load is complete, interface/rapid reprogramming terminal 20 provides an activity message (program step 604), FIG. 9A to enter the verify procedure. The load procedure includes a program step 588 which determines whether the data in the remote terminal 53 is the same as the data in IC memory 22. If the data is identical a load procedure is not performed by interface/rapid reprogramming terminal 20.

During the verify procedure each data block in the remote terminal 53 is down loaded into RAM in digital signal processor 21 using the message format of FIG. 9A (program steps 604-608). The data in RAM of processor 21 is compared (program step 620) and verified (program step 622) with the data in IC memory card 22. When the data in remote terminal 53 is verified RRT software proceeds through program steps 616 and 618 exiting the verify procedure. If the data is different a verify error message is provided for display by liquid crystal display 57 (program step 624). It should be noted that the verify procedure provides for a load card routine (program step 612) which allows data to be transferred from RAM in digital signal processor 21 to IC memory card 22.

When interface/rapid reprogramming terminal 20 completes reprogramming of the remote terminal 53 the RRT software proceeds through a protocol return (program step 560) to program step 562 which determines whether there is an AN/AYK-14 on the bus 42 (program step 562). If there is an AN/AYK-14 on the bus 42 then control of the bus 42 is returned to the AN/AYK-14 by interface/rapid reprogramming terminal 20. If the bus 42 is for example the electronic warfare bus then bus control is released by interface/rapid reprogramming terminal 20 and the discretes associated with reprogramming a remote terminal 53 or a bus controller 55 on the bus 42 are cleared (program step 566). Program step 568 clears the 1553 multiplex data bus 42 which was configured for reprogramming of a remote terminal 53 or bus controller 55 by RRT software during program step 536. The RRT software then proceeds to the next file in IC memory card 22.

Referring now to FIG. 19h, there is shown the flow chart for the checksum error, card erase error, record error, transfer error, protocol error, verify error and ID error. Each error is displayed on liquid crystal display 57 (program step 626). After a programmed wait time period (program step 628) the operator may again initialize digital signal processor 21 by pressing reset switch 45 (program steps 274 and 276).

Referring to FIG. 19(I), there is shown the erase card routine (program step 630) of the RRT software. During program step 632 interface/rapid reprogramming terminal 20 writes 00 hexadecimal into the memory of IC memory card 22 (program step 632). Interface/rapid reprogramming terminal 20 then reads all memory in IC memory card 22 (program step 636). If the memory in IC memory card 22 is not all 00 hexadecimal then an erase card error is declared (program step 638). If IC memory card 22 is completely erased a message will be provided via liquid crystal display 57 (program step 640).

In the best mode presently contemplated for the present invention, the program listings for the software modules of Table I are attached hereto and set forth as Appendix A. The Appendix A program listings are written in the C program language, a common, very popular and often used programming langauge.

From the foregoing description, it may readily be seen that the subject invention comprises a new, unique and exceedingly useful multipurpose bus interface for communicating with the MS-1553 multiplex data bus aboard an aircraft as well as providing a communications interface for personal computers and the like which constitutes a considerable improvement over the known prior art. Obviously many modifications and variations of the present invention are possible in light of the above teachings. It is, therefore, to be understood that within the scope of the appended claims, that the invention may be practiced otherwise than as specifically described. 10/999

What is claimed is:

1. A multipurpose bus interface circuit for interfacing a first communications bus to a second communications bus, said second communications bus being a Manchester encoded time division multiplexed serial data bus having first, second, third and fourth primary avionics buses and an electronic warfare bus, said multipurpose bus interface circuit comprising:

an integrated circuit memory card;
first transceiver means for receiving data from and transmitting data to said first communications bus, said first transceiver means formatting the data received thereby to a digital format;

programmable array logic means for receiving a plurality of read/write control signals, and for decoding said read/write control signals so as to control the transfer of said digital data between said first communications bus and said integrated circuit memory card;

digital signal processor means for providing said plurality of read/write control signals and a plurality of eight bit control words, said digital signal processor means having direct access to said integrated circuit memory card such that data to or from said first communications bus is transferred between said integrated circuit memory card and said first communications bus via said first transceiver means and said digital signal processor means and data to or from said second communications bus is transferred between said integrated circuit memory card and said second communications bus via said digital signal processor means;

an electrically erasable programmable read only memory electrically coupled to said digital signal processor means, said electrically erasable programmable read only memory containing software for said digital signal processor means, said software controlling the handling of data to and from said first communications bus and said software controlling the handling of data to and from said second communications bus by enabling the operation of said digital signal processor means according to bus standards and data protocols and formats of Military Standard 1553;

means for encoding digital data from said integrated circuit memory card so as to provide Manchester encoded data and for decoding Manchester encoded data so as to provide digital data, said encoding and decoding means providing an interface between said digital signal processor means and said second communications bus;

second transceiver means for transmitting the Manchester encoded data provided by said encoder and decoder means to said second communications bus and for receiving from said second communications bus Manchester encoded data for decoding by said encoder and decoder means;

transformer means for electrically isolating said second communications bus from said digital signal processing means;

programmable peripheral interface means for receiving said eight bit control words from said digital signal processor means and decoding said eight bit control words to provide a first avionics bus enable signal, a second avionics bus enable signal, a third avionics bus enable signal, a fourth avionics bus enable signal and an electronic warfare bus enable signal;

a first driver circuit electrically coupled to said programmable peripheral interface means to receive said first, second, third and fourth avionics bus enable signals;

a first relay electrically coupled to said transformer means, said first driver circuit and said first primary avionics bus;

a second relay electrically coupled to said transformer means, said first driver circuit and said second primary avionics bus;

a third relay electrically coupled to said transformer means, said first driver circuit and said third primary avionics bus;

a fourth relay electrically coupled to said transformer means, said first driver circuit and said fourth primary avionics bus;

said first driver circuit responsive to said first, second, third and fourth avionics bus enable signals selectively enabling one of said first, second, third and fourth relays to allow for a first transfer of said Manchester encoded data between said encoder and decoder means and one of said first, second, third and fourth primary avionics buses through the one of said first, second, third and fourth relays selectively enabled by said first driver circuit;

a second driver circuit electrically coupled to said programmable peripheral interface means for receiving said electronic warfare bus enable signal; and a fifth relay electrically coupled to said transformer means, said second driver circuit and said electronic warfare bus;

said second driver circuit responsive to said electronic warfare bus enable signal enabling said fifth relay to allow for a second transfer of said Manchester encoded data between said encoding and decoding means and said electronic warfare bus.

2. The multipurpose bus of claim 1 wherein said first communications bus is an RS-232 data bus.

3. The multipurpose bus of claim 1 wherein said second communications bus is a Military Standard 1553 multiplex data bus.

4. A multipurpose bus interface circuit for interfacing a first communications bus to a second communications bus, said second communications bus being a Manchester encoded time division multiplexed serial data bus having first, second, third and fourth primary avionics buses; first, second, third and fourth secondary avionics buses and an electronic warfare bus, said multipurpose bus interface circuit comprising:

an integrated circuit memory card;

first transceiver means for receiving data from and transmitting data to said first communications bus, said first transceiver means formatting the data received thereby to a digital format;

programmable array logic means for receiving a plurality of read/write control signals, and for decoding said read/write control signals so as to control the transfer of said digital data between said first communications bus and said integrated circuit memory card;

digital signal processor means for providing said plurality of read/write control signals and a plurality of eight bit control words, said digital signal processor means having direct access to said integrated circuit memory card such that data to or from said first communications bus is transferred between said integrated circuit memory card and said first communications bus via said first transceiver means and said digital signal processor means and data to or from said second communications bus is transferred between said integrated circuit memory card and said second communications bus via said digital signal processor means;

en electrically erasable programmable read only memory electrically coupled to said digital signal processor means, said electrically erasable programmable read only memory containing software for said digital signal processor means, said software controlling the handling of data to and from said first communications bus and said software controlling the handling of data to and from said second communications bus by enabling the operation of said digital signal processor means according to bus standards and data protocols and formats of Military Standard 1553;

means for encoding digital data from said integrated circuit memory card so as to provide Manchester encoded data and for decoding Manchester encoded data so as to provide digital data, said encoding/decoding means providing an interface between said digital signal processor means and said second communications bus;

second transceiver means for transmitting the Manchester encoded data provided by said encoding/decoding means to said second communications bus and for receiving from said second communications bus Manchester encoded data for decoding by said encoding/decoding means;

transformer means for electrically isolating said second communications bus from said digital signal processing means;

programmable peripheral interface means for receiving said eight bit control words from said digital signal processor means and decoding said eight bit control words to provide first, second, third and fourth avionics bus enable signals, a secondary/primary avionics bus signal having first and second logic states and an electronic warfare bus enable signal;

first driver circuit means electrically coupled to said programmable peripheral interface means for receiving said first, second, third and fourth avionics bus enable signals and said secondary/primary avionics bus signals;

a first primary avionics bus relay electrically coupled to said transformer means, said first driver circuit means and said fist primary avionics bus;

a second primary avionics bus relay electrically coupled to said transformer means, said first driver circuit means and said second primary avionics bus;

a third primary avionics bus relay electrically coupled to said transformer means, said first driver circuit means and said third primary avionics bus;

a fourth primary avionics bus relay electrically coupled to said transformer means, said first driver circuit means and said fourth primary avionics bus;

a first secondary avionics bus relay electrically coupled to said transformer means, said first driver circuit means and said first secondary avionics bus;

a second secondary avionics bus relay electrically coupled to said transformer means, said first driver circuit means and said second secondary avionics bus;

a third secondary avionics bus relay electrically coupled to said transformer means, said first driver circuit means and said third secondary avionics bus;

a fourth secondary avionics bus relay electrically coupled to said transformer means, said first driver circuit means and said fourth secondary avionics bus;

said first driver circuit means responsive to said first, second, third and fourth avionics bus enable signals and said secondary/primary avionics bus signal selectively enabling one of said first, second, third and fourth primary avionics bus relays when said secondary/primary avionics bus signal is at said first logic state allowing for a first transfer of said Manchester encoded data between said encoding/decoding means and one of said first, second, third and fourth primary avionics buses through the one of said first, second, third and fourth primary avionics bus relays selectively enabled by said first driver circuit means;

said first driver circuit means responsive to said first, second, third and fourth avionics bus enable signals and said secondary/primary avionics bus signal selectively enabling one of said first, second, third and fourth secondary avionics bus relays when said secondary/primary avionics bus signal is at said second logic state allowing for a second transfer of said Manchester encoded data between said encoding/decoding means and one of said first, second, third and fourth secondary avionics buses through the one of said first, second, third and fourth secondary avionics bus relays selectively enabled by said first driver circuit means;

second driver circuit means electrically coupled to said programmable peripheral interface means for receiving said electronic warfare bus enable signal; and an electronic warfare bus relay electrically coupled to said transformer means, said second driver circuit means and said electronic warfare bus;

said second driver circuit means responsive to said electronic warfare bus enable signal enabling said electronic warfare bus relay to allow for a third transfer of said Manchester encoded data between said encoding/decoding means and said electronic warfare bus.

5. A multipurpose bus interface circuit for interfacing a first communications bus to a second communications bus, said second communications bus being a Manchester encoded time division multiplexed serial data bus having first, second, third and fourth primary avionics buses; first, second, third and fourth secondary avionics buses and an electronic warfare bus, each of said first, second, third and fourth primary avionics buses; said first, second, third and fourth secondary avionics buses and said electronic warfare bus providing for a transformer coupling between said multipurpose bus interface circuit and said second communications bus and a direct coupling between said multipurpose bus interface circuit and said second communications bus, said multipurpose bus interface circuit comprising:

an integrated circuit memory card;

first transceiver means for receiving data from and transmitting data to said first communications bus, said first transceiver means formatting the data received thereby to a digital format;

programmable array logic means for receiving a plurality of read/write control signals, and for decoding said read/write control signals so as to control the transfer of said digital data between said first communications bus and said integrated circuit memory card;

digital signal processor means for providing said plurality of read/write control signals and a plurality of eight bit control words, said digital signal processor means having direct access to said integrated circuit memory card such that data to or from said first communications bus is transferred between said integrated circuit memory card and said first communications bus via said first transceiver means and said digital signal processor means and data to or from said second communications bus is transferred between said integrated circuit memory card and said second communications bus via said digital signal processor means;

an electrically erasable programmable read only memory electrically coupled to said digital signal processor means, said electrically erasable programmable read only memory containing software for said digital signal processor means, said software controlling the handling of data to and from said first communications bus and said software controlling the handling of data to and from said second communications bus by enabling the operation of said digital signal processor means according to bus standards and data protocols and formats of Military Standard 1553;

means for encoding digital data from said integrated circuit memory card so as to provide Manchester encoded data and for decoding Manchester encoded data so as to provide digital data, said encoding/decoding means providing an interface between said digital signal processor means and said second communications bus;

second transceiver means for transmitting the Manchester encoded data provided by said encoding/decoding means to said second communications bus and for receiving from said second communications bus Manchester encoded data for decoding by said encoding/decoding means;

isolation transformer means for electrically isolating said second communications bus from said digital signal processing means;

programmable peripheral interface means for receiving said eight bit control words from said digital signal processor means and decoding said eight bit control words to provide first, second, third and fourth avionics bus enable signals, a direct/transformer coupling signal, a secondary/primary avionics bus signal and an electronic warfare bus enable signal;

first driver circuit means electrically coupled to said programmable peripheral interface means for receiving said first, second, third and fourth avionics bus enable signals and said secondary/primary avionics bus signals;

second driver circuit means electrically coupled to said programmable peripheral interface means for receiving said electronic warfare bus enable signal and said direct/transformer coupling signal;

a direct/transformer coupling relay connected to said isolation transformer means;

said second driver circuit means responsive to said direct/transformer coupling signal energizing said direct/transformer coupling relay allowing for said direct coupling between said multipurpose bus interface circuit and said second communications bus and de-energizing said direct/transformer coupling relay allowing for said transformer coupling between said multipurpose bus interface circuit and said second communications bus a first primary avionics bus relay electrically coupled to said direct/transformer coupling relay, said first driver circuit means and said first primary avionics bus;

a second primary avionics bus relay electrically coupled to said direct/transformer coupling relay, said first driver circuit means and said second primary avionics bus;

a third primary avionics bus relay electrically coupled to said direct/transformer coupling relay, said first driver circuit means and said third primary avionics bus;

a fourth primary avionics bus relay electrically coupled to said direct/transformer coupling relay, said first driver circuit means and said fourth primary avionics bus;

a first secondary avionics bus relay electrically coupled to said direct/transformer coupling relay, said first driver circuit means and said first secondary avionics bus;

a second secondary avionics bus relay electrically coupled to said direct/transformer coupling relay, said first driver circuit means and said second secondary avionics bus;

a third secondary avionics bus relay electrically coupled to said direct/transformer coupling relay, said first driver circuit means and said third secondary avionics bus;

a fourth secondary avionics bus relay electrically coupled to said direct/transformer coupling relay, said first driver circuit means and said fourth secondary avionics bus;

said first driver circuit means responsive to said first, second, third and fourth avionics bus enable signals and said secondary/primary avionics bus signal selectively enabling one of said first, second, third and fourth primary avionics bus relays when said secondary/primary avionics bus signal is at a first logic state allowing for a first transfer of said Manchester encoded data between said encoding/decoding means and one of said first, second, third and fourth primary avionics buses through the one of said first, second, third and fourth primary avionics bus relays selectively enabled by said first driver circuit means;

said first driver circuit means responsive to said first, second, third and fourth avionics bus enable signals and said secondary/primary avionics bus signal selectively enabling one of said first, second, third and fourth secondary avionics bus relays when said secondary/primary avionics bus signal is at a second logic state allowing for a second transfer of said Manchester encoded data between said encoding/decoding means and one of said first, second, third and fourth secondary avionics buses through the one of said first, second, third and fourth secondary avionics bus relays selectively enabled by said first driver circuit means; and an electronic warfare bus relay electrically coupled to said direct/transformer coupling relay, said second driver circuit means and said electronic warfare bus;

said second driver circuit means responsive to said electronic warfare bus enable signal enabling said electronic warfare bus relay to allow for a third transfer of said Manchester encoded data between said encoding/decoding means and said electronic warfare bus.

* * * * *